United States Patent
Nayar et al.

(10) Patent No.: US 8,610,789 B1
(45) Date of Patent: Dec. 17, 2013

(54) METHOD AND APPARATUS FOR OBTAINING HIGH DYNAMIC RANGE IMAGES

(75) Inventors: Shree K. Nayar, New York, NY (US); Tomoo Mitsunaga, Kawasaki (JP)

(73) Assignees: The Trustees of Columbia University in the City of New York, New York, NY (US); Sony Corporation, Tokyo (JP)

( * ) Notice: Subject to any disclaimer, the term of this patent is extended or adjusted under 35 U.S.C. 154(b) by 50 days.

(21) Appl. No.: 13/104,606

(22) Filed: May 10, 2011

Related U.S. Application Data

(62) Division of application No. 10/959,679, filed on Oct. 5, 2004, now Pat. No. 7,999,858, which is a division of application No. 09/511,469, filed on Feb. 23, 2000, now Pat. No. 7,084,905.

(51) Int. Cl.
*H04N 5/228* (2006.01)

(52) U.S. Cl.
USPC .................. 348/222.1; 348/221.1; 348/231.3; 348/234

(58) Field of Classification Search
USPC ................ 348/187, 188, 221.1, 222.1, 229.1, 348/230.1, 231.6, 231.99, 234, 241, 246, 348/247, 362; 358/521, 523, 524; 382/300
See application file for complete search history.

(56) References Cited

U.S. PATENT DOCUMENTS

| | | | |
|---|---|---|---|
| 4,479,062 A | 10/1984 | Kawasaki et al. | |
| 4,590,367 A | 5/1986 | Ross et al. | |
| 4,623,928 A | 11/1986 | Handy | |
| 4,652,916 A | 3/1987 | Suzaki et al. | |
| 4,868,649 A | 9/1989 | Gaudin | |
| 4,873,561 A | 10/1989 | Wen | |
| 4,918,534 A | 4/1990 | Lam et al. | |
| 4,996,600 A | 2/1991 | Nishida et al. | |
| 5,010,504 A | 4/1991 | Lee et al. | |
| 5,030,985 A | 7/1991 | Bryant | |

(Continued)

FOREIGN PATENT DOCUMENTS

| | | |
|---|---|---|
| DE | 4305807 | 10/1994 |
| DE | 4420637 | 12/1995 |
| DE | 19618476 | 11/1997 |
| EP | 0503103 | 9/1992 |
| EP | 0840502 | 5/1998 |
| EP | 0912047 | 4/1999 |
| EP | 0981245 | 2/2000 |

(Continued)

OTHER PUBLICATIONS

U.S. Appl. No. 09/511,469, Jun. 26, 2006 Response to Supplemental Notice of Allowance.

(Continued)

*Primary Examiner* — Aung S Moe
*Assistant Examiner* — Chriss Yoder, III
(74) *Attorney, Agent, or Firm* — Baker Botts L.L.P.

(57) ABSTRACT

The application provides techniques for obtaining a relatively high dynamic range image of a scene using a relatively low dynamic range image sensor exposed to incident light from the scene for capturing an image. The image sensor has a multiplicity of light-sensing elements in an array and each light sensing element has a particular one of a plurality of sensitivity levels to incident light in accordance with a predetermined sensitivity pattern for the array of light-sensing elements and has a response function. Each light sensing element is responsive to incident light from the scene for producing a captured image brightness value at a corresponding one of a multiplicity of pixel positions of a pixel position array. Each one of the multiplicity of pixel positions corresponds to a particular one of the plurality of sensitivity levels of the light sensing elements.

77 Claims, 38 Drawing Sheets

(56) References Cited

U.S. PATENT DOCUMENTS

| | | | |
|---|---|---|---|
| 5,138,458 A | 8/1992 | Nagasaki et al. |
| 5,185,671 A | 2/1993 | Lieverman et al. |
| 5,193,016 A | 3/1993 | Cornuejols |
| 5,282,063 A | 1/1994 | Deacon et al. |
| 5,289,286 A | 2/1994 | Nakamura et al. |
| 5,309,243 A | 5/1994 | Tsai |
| 5,331,420 A | 7/1994 | Yamano et al. |
| 5,373,322 A | 12/1994 | Laroche et al. |
| 5,386,228 A | 1/1995 | Okino |
| 5,416,611 A | 5/1995 | Tandon |
| 5,420,635 A | 5/1995 | Konishi et al. |
| 5,455,621 A | 10/1995 | Morimura |
| 5,469,216 A | 11/1995 | Takahashi et al. |
| 5,592,219 A | 1/1997 | Nakagawa |
| 5,638,118 A | 6/1997 | Takahashi et al. |
| 5,638,119 A | 6/1997 | Cornuejols |
| 5,668,596 A | 9/1997 | Vogel |
| 5,670,280 A | 9/1997 | Lawandy |
| 5,703,677 A | 12/1997 | Simoncelli et al. |
| 5,751,352 A | 5/1998 | Ogawa |
| 5,767,987 A | 6/1998 | Wolff et al. |
| 5,789,737 A | 8/1998 | Street |
| 5,801,773 A | 9/1998 | Ikeda |
| 5,812,191 A | 9/1998 | Orava et al. |
| 5,828,793 A | 10/1998 | Mann |
| 5,990,950 A | 11/1999 | Addison |
| 5,990,952 A | 11/1999 | Hamazaki |
| 6,028,299 A | 2/2000 | Hirama et al. |
| 6,122,408 A | 9/2000 | Fang et al. |
| 6,124,974 A | 9/2000 | Burger |
| 6,211,915 B1 | 4/2001 | Harada |
| 6,366,318 B1 | 4/2002 | Smith et al. |
| 6,501,504 B1 | 12/2002 | Tatko et al. |
| 6,753,909 B1 | 6/2004 | Westerman et al. |
| 6,771,312 B2 | 8/2004 | Kamishima et al. |
| 6,831,692 B1 | 12/2004 | Oda |
| 6,864,916 B1 | 3/2005 | Nayar et al. |
| 6,933,971 B2 | 8/2005 | Bezryadin |
| 6,995,791 B2 | 2/2006 | Skow |
| 7,084,905 B1 | 8/2006 | Nayar et al. |
| 7,924,321 B2 | 4/2011 | Nayar et al. |
| 7,999,858 B2 | 8/2011 | Nayar et al. |
| 2002/0027189 A1 | 3/2002 | Murakami et al. |
| 2002/0050518 A1 | 5/2002 | Roustaei |
| 2002/0126209 A1 | 9/2002 | Yamada et al. |

FOREIGN PATENT DOCUMENTS

| | | |
|---|---|---|
| FR | 2687265 | 8/1993 |
| GB | 2 255 465 | 11/1992 |
| GB | 2 331 426 | 5/1999 |
| JP | 59217358 | 12/1984 |
| JP | 6070225 | 3/1994 |
| JP | 06-141229 | 5/1994 |
| JP | 6-153089 | 5/1994 |
| JP | 06141229 | 5/1994 |
| JP | 07-077700 | 3/1995 |
| JP | 07-115643 | 5/1995 |
| JP | 7-254965 | 10/1995 |
| JP | 07254965 | 10/1995 |
| JP | 07254966 | 10/1995 |
| JP | 7264488 | 10/1995 |
| JP | 8154201 | 6/1996 |
| JP | 08223491 | 8/1996 |
| JP | 08-340486 | 12/1996 |
| JP | 08331461 | 12/1996 |
| JP | 08340486 | 12/1996 |
| JP | 9219824 | 8/1997 |
| JP | 10069011 | 3/1998 |
| JP | 1-0270673 | 10/1998 |
| JP | 10-304235 | 11/1998 |
| JP | 3074967 | 8/2000 |
| WO | WO 90/01844 | 2/1990 |
| WO | WO 93/14595 | 7/1993 |
| WO | WO94/18801 | 8/1994 |
| WO | WO 97/05742 | 2/1997 |
| WO | WO00/79784 | 12/2000 |

OTHER PUBLICATIONS

U.S. Appl. No. 09/511,469, Jun. 12, 2006 Supplemental Notice of Allowance.
U.S. Appl. No. 09/511,469, Apr. 18, 2006 Amendment after Notice of Allowance.
U.S. Appl. No. 09/511,469, Feb. 6, 2006 Notice of Allowance.
U.S. Appl. No. 09/511,469, Sep. 8, 2005 Issue Fee Payment.
U.S. Appl. No. 09/511,469, Jun. 16, 2005 Notice of Allowance.
U.S. Appl. No. 09/511,469, May 9, 2005 Response to Ex-Parte Quayle Action.
U.S. Appl. No. 09/511,469, Apr. 7, 2005 Ex-Parte Quayle Action.
U.S. Appl. No. 10/959,679, Jul. 13, 2011 Issue Fee Payment.
U.S. Appl. No. 10/959,679, Apr. 15, 2011 Notice of Allowance.
U.S. Appl. No. 10/959,679, Jan. 10, 2011 Amendment and Request for Continued Examination (RCE).
U.S. Appl. No. 10/959,679, Jul. 9, 2010 Final Office Action.
U.S. Appl. No. 10/959,679, Apr. 1, 2010 Response to Non-Final Office Action.
U.S. Appl. No. 10/959,679, Dec. 30, 2009 Non-Final Office Action.
U.S. Appl. No. 10/959,679, Sep. 28, 2009 Response to Non-Final Office Action.
Mann et al,, "On Being 'Undigital' With Digital Cameras: Extending Dynamic Range by Combining Differently Exposed Pictures", M.I.T. Media Lab Perceptual Computing Section, p. 422-428, May 1995.
Debevec et al, "Recovering High Dynamic Range Maps from Photographs", SIGGRAPH '97 Conference Proceedings, Aug. 1997.
Lee et al, "Scattered Date Interpolation with Multilevel B-Splines", IEEE Transactions on Visualization and Computer Graphics, vol. 3, No. 3, p. 228-244, Jul.-Sep. 1997.
Mitsunaga et al., "Radiometric Self Calibration", IEEE Conference on Computer Vision and Pattern Recognition (CVPR 99), p. 374-380, Jun. 1999.
U.S. Appl. No. 10/959,679, Jun. 26, 2009 Non-Final Office Action.
Pattanaik, et al., A Multiscale Model of Adaptation and Spatial Vision for Realistic Image Display:, In Proceedings of the 25th Annual Conference on Computer Graphics (SIGGRAPH '98), Orlando, FL, US, Jul. 19-24, 1998, pp. 278-298.
Yamada, et al., "Effectiveness of Video Camera Dynamic Range Expansion for Lane Mark detection", In Proceedings of the IEEE conference of intelligent Transportation System (ITSC '97), Boston, MA, US, Nov. 9-12, 1997, pp. 584-588.
Brajovic, et al., "A sorting Image Sensor: an example of Massively Parallel Intensity-to-Time Processing for Low-Latency Computational Sensors", *Proceedings of the 1996 IEEE International Conference of Robotics and Automation*, pp. 1638-1643 (1996).
Burt, et al., "A Multiresolution Spline with Application to Image Mosiacs", *ACM Transactions on Graphics*, 2(4):217-236 (1983).
Burt, et al., "Enhanced Image Capture through Fusion", *Proceedings of International Conference on Computer Vision (ICCV)*, pp. 173-182 (1993).
Chang, et al., "RGB Calibration for Color Image Analysis in Machine Vision", *IEEE Transactions Image Process.*, 5(10):1414-1422 (1996).
Fujifilm, "Fujifilm Announces Super CCD EXR", Press Release, Sep. 22, 2008, available at http://www.dpreview.com/news/2008/9/22/fujifilmEXR (downloaded on Feb. 13, 2013).
Madden, "Extended Intensity Range Imaging", *Technical Report MS-CIS-93-96, Grasp Laboratory 366, University of Pennsylvania*, (1993).
Milgram, "Computer Methods for Creating Photomosiacs", *IEEE Transaction on Computers*, 24(11):1113-1119 (1975).
Nayar, et al., "High Dynamic Range Imaging: Spatially Varying Pixel Exposures", *IEEE Conference on Computer Vision and Pattern Recognition (CVPR)*, 1:472-479 (2006).
Peleg, et al., "Panoramic Mosaics by Manifold Projection", *IEEE Computer Vision and Pattern Recognition (CVPR 97)*, pp. 338-343 (1997).

|        |        |        |        |
|--------|--------|--------|--------|
| 0.043  | -0.661 | -0.661 | 0.043  |
| -0.661 | 10.28  | 10.28  | -0.661 |
| -0.661 | 10.28  | 10.28  | -0.661 |
| 0.043  | -0.661 | -0.661 | 0.043  |

2700

| 0.0037 | 0.0101 | 0.0166 | 0.0166 | 0.0101 | 0.0037 |
|--------|--------|--------|--------|--------|--------|
| 0.0101 | 0.0275 | 0.0452 | 0.0452 | 0.0275 | 0.0101 |
| 0.0166 | 0.0452 | 0.0743 | 0.0743 | 0.0452 | 0.0166 |
| 0.0166 | 0.0452 | 0.0743 | 0.0743 | 0.0452 | 0.0166 |
| 0.0101 | 0.0275 | 0.0452 | 0.0452 | 0.0275 | 0.0101 |
| 0.0037 | 0.0101 | 0.0166 | 0.0166 | 0.0101 | 0.0037 |

FIG. 33  3300

| 0 | 1 |
|---|---|
| 0 | 0 |

3400
FIG. 34

| 0.043 | -0.618 | -1.322 | -0.618 | 0.043 |
| --- | --- | --- | --- | --- |
| -0.618 | 9.001 | 19.238 | 9.001 | -0.618 |
| -1.322 | 19.238 | 41.12 | 19.238 | -1.322 |
| -0.618 | 9.001 | 19.238 | 9.001 | -0.618 |
| 0.043 | -0.618 | -1.322 | -0.618 | 0.043 |

| 1.0 | 7.7 | 7.7 | 1.0 |

5600

5700

| -0.96 | 13.44 | 13.44 | -0.96 |

5800

| 0.1 | 3.6 | 10.0 | 3.6 | 0.1 |

6100

METHOD AND APPARATUS FOR OBTAINING HIGH DYNAMIC RANGE IMAGES

CROSS REFERENCE TO RELATED APPLICATIONS

This application is a divisional of U.S. patent application Ser. No. 10/959,679, filed Oct. 5, 2004 now U.S. Pat. No. 7,999,858, which is a divisional of U.S. patent application Ser. No. 09/511,469, filed Feb. 23, 2000 now U.S. Pat. No. 7,084,905, both of which are incorporated herein by reference in their entirety.

STATEMENT REGARDING FEDERALLY SPONSORED RESEARCH

This invention was made with government support under grant number N00014-97-1-0553 awarded by the Office of Naval Research. The government has certain rights in the invention.

BACKGROUND OF INVENTION

The present invention relates to method and apparatus for capturing an image of a scene, and, more particularly, to method and apparatus for capturing a relatively high dynamic range image using a relatively low dynamic range image sensor.

Virtually any real world scene produces a very large range of brightness values. By contrast, known image sensing devices have very limited dynamic ranges. For example, it is typical for a video image sensor to provide only 8-bits or less of grey-scale or color information. In the case of grey-scale images, 8-bits allows only 256 discrete grey-scale levels, which is not sufficient to capture the fine details of most real life scenes.

A known solution to the problem of capturing high dynamic range images with a low dynamic range image sensor is to capture multiple images of each local area of the scene while varying the exposure to light from the scene. There are three general variations of this solution: (1) temporal variation of the exposure while capturing a sequence of images, (2) using multiple image sensors having different sensitivities to light from the scene and (3) spatial variation of the exposure.

Typically, temporal exposure variation involves sequentially capturing multiple images of the scene with different exposures and then combining the multiple captured images into a single high dynamic range image. The use of temporal exposure variation is disclosed, for example, in: Japanese Patent No. 08-331461 entitled "Driving Method for Solid-State Image Pickup Device" to Hamazaki, issued December 1996; Japanese Patent No. 07-254965 entitled "Electronic Image Pickup Device" to Saito, issued February 1995; U.S. Pat. No. 5,420,635 entitled "Video Camera, Imaging Method Using Video Camera, Method of Operating Video Camera, Image Processing Apparatus and Method, and Solid-State Electronic Imaging Device" to Konishi et al., issued May 1995; U.S. Pat. No. 5,455,621 entitled "Image Method for a Wide Dynamic Range and an Imaging Device for a Wide Dynamic Range" to Morimura, issued October 1993; Japanese Patent No. 06-141229 entitled "Image Picking Up and Synthesizing Method and Image Pickup Device with High Dynamic Range" to Morimura, issued May 1994; U.S. Pat. No. 5,801,773 entitled "Image Data Processing Apparatus for Processing Combined Image Signals in Order to Extend Dynamic Range" to Ikeda, issued September 1998; U.S. Pat. No. 5,638,118 entitled "Image Device with Diverse Storage Times Used in Image Composition" to Takahashi et al. issued June 1997; U.S. Pat. No. 5,309,243 entitled "Method and Apparatus for Extending the Dynamic Range of an Electronic Imaging System" to Tsai issued May 1994; Mann and Picard, "Being 'Undigital' with Digital Cameras: Extending Dynamic Range by Combining Differently Exposed Pictures," Proceedings of IST's 48th Annual Conference, pp. 422-428, May 1995; Debevec and Malik, "Recording High Dynamic Range Radiance Maps for Photographs," Proceedings of the ACM SIGGRAPH, 1997, pp. 369-378, August 1997; and Mitsunaga and Nayar, "Radiometric Self Calibration," IEEE Conference on Computer Vision and Pattern Recognition (CVPR 99), pp. 374-380, June 1999. However, known temporal exposure variation techniques all have the fundamental problem in that changes in the scene may take place during the sequential image capture at different exposures. Consequently, these techniques are useful only for static scenes where the radiance from the scene remain constant and where the position and orientation of the image sensor, and its geometric characteristics remain unchanged during sequential image capture at different exposures.

Another known technique for capturing multiple images of a scene for high dynamic range imaging uses multiple optically aligned image sensors and a beam splitter for providing incident light from the same view of the scene to the multiple image sensors. The image sensors having different sensitivities so that multiple images are simultaneously captured at different exposures. The multiple images captured by the image sensors are then combined to form a single high dynamic range image. Such techniques, for example, are described in: Japanese Patent No. 08-22341 entitled "Image Sensor" to Doi et al., issued August 1986; Japanese Patent No. 07-25495 entitled "Electronic Image Pickup Device" to Saito, issued February 1995; Japanese Patent No. 07-254966 entitled "Electronic Image Pickup Device" to Saito, issued October 1995; Japanese Patent No. 08-340486 entitled "Electronic Image Pickup Device to Saito, issued December 1996; Japanese Patent No. 10-069011 entitled "Image Pickup Device" to Kimura, issued March 1998; and U.S. Pat. No. 5,801,773 entitled "Image Data Processing Apparatus for Processing Combined Image Signals in Order to Extend Dynamic Range" To Ikeda, issued September 1998. The multiple image sensor techniques have the drawback in that they require high precision optics and a plurality of image sensors so that it is difficult to build compact and inexpensive imaging systems using these techniques.

Known spatial exposure variation techniques for high dynamic range imaging typically use a special image sensor having more than one (typically two) light-sensing elements having different sensitivities for each pixel. The light-sensing elements for each pixel are simultaneously exposed and their respective output signals are combined to derive a brightness value for the pixel. Such techniques are described, for example, in: U.S. Pat. No. 5,789,737 entitled "High Dynamic Range Segmented Pixel Sensor Array" to Street et al., issued August 1998; U.S. Pat. No. 4,623,928 entitled "High Dynamic Range CCD Detector/Imager" to Handy, issued November 1986; U.S. Pat. No. 4,873,561 entitled "High Dynamic Range Charge Coupled Device" to Wen, issued October 1989; Japanese Patent No. 08-331461 entitled "Driving Method for Solid-State Image Pickup Device" to Hamazaki, issued December 1996; Japanese Patent No. 59-217358 entitled "Charge Coupling Image Pickup Device" to Murakoshi, issued December 1994; and U.S. Pat. No. 5,420,635 entitled "Video Camera Imaging Method Using Video Camera, Method of Operating Video Camera, Image Processing Apparatus and Method, and Solid-State Electronic Imaging Device" to Konishi et al., issued May 1995. However, known spatial exposure variation techniques for high dynamic range imaging have the drawback of providing lower spatial resolution (typically a factor of two lower in the vertical direction) than the resolution of ordinary image sensors having the same number of light-sensing elements.

Accordingly, there exists a need for a method and apparatus for capturing a relatively high dynamic range images using a relatively low dynamic range image sensor, which overcomes the problems of the prior art as discussed above.

SUMMARY OF THE INVENTION

In accordance with one aspect of the present invention, there is provided a method for capturing a relatively high dynamic range image of a scene using a relatively low dynamic range image sensor exposed to incident light from the scene. The image sensor has a multiplicity of light-sensing elements in a linear or two-dimensional array, and each light-sensing element has a respective one of a plurality of sensitivity levels to incident light in accordance with a predetermined sensitivity pattern for the array of light-sensing elements. Each of the light-sensing elements in the array in response to incident light from the scene produces a captured image brightness value at a corresponding one of a multiplicity of pixel positions of a pixel position array, which may be a linear array having regularly spaced pixel positions in a row or a rectangular array having pixel positions at respective intersections of regularly spaced orthogonal pixel rows and pixel columns. In this manner each pixel position corresponds to a respective one of the plurality of sensitivity levels. The method comprises the step of estimating respective off-grid brightness values at a multiplicity of off-grid positions from the captured image brightness values at the multiplicity of pixel positions of the pixel position array, the off-grid positions being located in a regular array at respective interstices of the pixel position array. The method further comprises the step of deriving pixel brightness values of a relatively high dynamic range image of the scene from the estimated off-grid brightness values at the multiplicity of off-grid positions. Where the pixel position array is a linear array in which the brightness value at each pixel position is captured by a corresponding light-sensing element of a linear image sensor, the off-grid positions are in a regular linear array, and the relatively high dynamic range image is a linear image represented by a regular linear array of pixel brightness values. Where the pixel position array is defined by respective intersections of regularly spaced orthogonal pixel rows and pixel columns, the brightness values of the pixel positions in the array may be captured by corresponding light-sensing elements of a two-dimensional image sensor or may be a concatenation of the brightness values at pixel positions of linear pixel position arrays representing line images of a scanned scene successively captured by a linear image sensor.

In accordance with an exemplary embodiment of the method of the present invention, the off-grid positions are in a regular linear or rectangular array and the step of deriving pixel brightness values of a relatively high dynamic range image comprises using the estimated off-grid brightness values as the pixel brightness values of the relatively high dynamic range image.

According to another exemplary embodiment of the method of the present invention, the step of deriving pixel brightness values of the relatively high dynamic range image comprises resampling the estimated off-grid brightness values at the multiplicity of off-grid positions to derive respective resampled brightness values at the multiplicity of pixel positions of the pixel position array to thereby obtain the pixel brightness values of the relatively high dynamic range image.

In accordance with still another exemplary embodiment of the method of present invention, the step of estimating respective off-grid brightness values at the multiplicity of off-grid positions from the captured image brightness values at the multiplicity of pixel positions comprises the steps of estimating a sensitivity level off-grid brightness value for each individual one of the plurality of sensitivity levels at each one of the off-grid positions using only the captured image brightness values at pixel positions corresponding to the individual one of the sensitivity levels. The sensitivity level off-grid brightness value for each individual one of the sensitivity levels at each one of the off-grid positions is multiplied by a predetermined weighting factor for the individual one of the sensitivity levels to derive respective weighted sensitivity level off-grid brightness values for the different ones of the sensitivity levels at each one of the off-grid positions. The respective weighted sensitivity level off-grid brightness values for the different ones of the sensitivity levels at each one of the off-grid positions are added together to derive a weighted sum sensitivity level brightness value at each one of the off-grid positions. The weighted sum sensitivity level brightness value at each one of the off-grid positions is compensated by the inverse of a combined response function of the light-sensing elements to derive the respective estimated off-grid brightness values at the off-grid positions. The combined response function of the light-sensing elements is the sum of weighted response functions of light-sensing elements having different ones of the sensitivity levels, each weighted response function being a response function of a light-sensing element having a respective one of the sensitivity levels multiplied by a predetermined weighting factor for the respective one of the sensitivity levels.

According to yet another exemplary embodiment of the method of the present invention, the step of estimating respective off-grid brightness values at the multiplicity of off-grid positions from the captured image brightness values at the multiplicity of pixel positions comprises estimating an off-grid brightness value at each individual one of the off-grid positions by first compensating the captured image brightness value at each individual one of a predetermined group of pixel positions that are nearest neighbors to the individual one of the off grid positions by the inverse of the response function of a light-sensing element having a sensitivity level corresponding to the individual one of the nearest neighbor pixel positions. The compensated captured image brightness values at the nearest neighbor pixel position are then each compared with a predetermined low threshold value and a predetermined high threshold value, and a sum is taken of the compensated nearest neighbor pixel position brightness values that are greater than the predetermined low threshold value and less than the predetermined high threshold value. The sum is then divided by the number of compensated nearest neighbor pixel position brightness values included in the sum to derive an estimated off-grid brightness value for the individual one of the off-grid positions.

According to a further exemplary embodiment of the method of the present invention, interpolated on-grid brightness values at respective pixel positions of the pixel position array are derived directly from the captured image brightness values using an on-grid interpolation filter. The interpolated on-grid brightness value at each individual one of the pixel positions is derived by computing the product of the captured image brightness values at a predetermined group of pixel positions that are nearest neighbors to the individual one of the pixel positions and an on-grid interpolation filter kernel, the predetermined group of pixel positions having the same dimensions as the filter kernel. The interpolated on-grid brightness values are then each compensated by the inverse of a combined response function of light-sensing elements having different sensitivity levels to derive the pixel brightness values of the relatively high dynamic range output image.

In accordance with another aspect of the present invention, there is provided a system for capturing a relatively high dynamic range image of a scene using a relatively low dynamic range image sensor adapted to be exposed to incident light from the scene. The system comprises an image sensor having a multiplicity of light-sensing elements in a linear or two-dimensional array. Each light-sensing element in the array having a respective one of a plurality of sensitivity levels to incident light in accordance with a predetermined sensitivity pattern for the array of light-sensing elements. Each light-sensing element being responsive to incident light from the scene for producing a captured image brightness value at a corresponding one of a multiplicity of pixel positions of a pixel position array, which may be a linear array having regularly spaced pixel positions in a row or a rectangular array having pixel positions located at respective intersections of regularly spaced orthogonal pixel rows and pixel columns. In this manner, each pixel position corresponds to a respective one of the plurality of sensitivity levels of the light-sensing elements. The system further comprises a captured image memory for storing the respective captured image brightness values at the multiplicity of pixel positions produced by the light-sensing elements, and an off-grid estimator for deriving from the captured image brightness values in the captured image memory respective estimated off-grid brightness values at a multiplicity of off-grid positions located in a regular array at respective interstices of the pixel position array. The system further includes an output image generator for deriving pixel brightness values of a relatively high-dynamic range output image from the estimated off-grid brightness values, and an output image memory for storing the pixel brightness values of the output image. Where the pixel position array is a linear array and the captured image memory stores brightness values captured by corresponding light-sensing elements of a linear image sensor, the off-grid positions are in a regular linear array and the output image is a linear image represented by a regular array of pixel brightness values. Where the pixel position array is a rectangular array defined by respective intersections of regularly spaced orthogonal pixel rows and pixel columns, the captured image memory may store brightness values captured by corresponding light-sensing elements of a two-dimensional image sensor or a concatenation of linear pixel position array brightness values of line images of a scanned scene successively captured by a linear image sensor. In the latter instance, the off-grid positions are in a regular two-dimensional array and the output image is a two-dimensional image represented by a regular two-dimensional array of pixel brightness values.

According to an exemplary embodiment of the system of the present invention, the output image generator provides the estimated off-grid brightness values derived by the off-grid estimator to the output image memory as the pixel brightness values of the output image.

According to another exemplary embodiment of the system of the present invention, the system includes an off-grid brightness value memory for storing the respective estimated off-grid brightness values derived by the off-grid estimator at the off-grid positions, and an on-grid resampler for deriving from the estimated off-grid brightness values in the off-grid brightness value memory respective resampled brightness values at the pixel positions of the pixel position array. The resampled brightness values are then provided to the output image memory for storage therein as the pixel brightness values of the output image.

According to still another exemplary embodiment of the system of the present invention, the off-grid estimator include an off-grid position generator for providing the multiplicity of off-grid positions and a sensitivity pattern memory for storing the respective sensitivity levels corresponding to the pixel positions. The off-grid estimator also includes a plurality of sensitivity level off-grid brightness value estimators, each corresponding to a respective one of the plurality of sensitivity levels of the light-sensing elements, for receiving off-grid positions from the off-grid position generator and sensitivity level data from the sensitivity pattern memory, and for deriving from the captured image brightness values in the captured image memory a plurality of sensitivity level off-grid brightness values each corresponding to a different one of the plurality of sensitivity levels at each one of the off-grid positions received from the off-grid position generator. The off-grid estimator also includes an accumulator for receiving the sensitivity level off-grid brightness values derived by the plurality of sensitivity level off-grid brightness value estimators at each one of the off-grid positions. The accumulator comprises a weighting factor memory for storing respective ones of a plurality of predetermined weighting factors each corresponding to a respective one of the plurality of sensitivity levels, and a plurality of multipliers each for computing the product of the sensitivity level off-grid brightness value corresponding to a respective one of the plurality of sensitivity levels and the weighting factor corresponding to the same sensitivity level to provide a respective weighted sensitivity level off-grid brightness value corresponding to the respective one of the sensitivity levels at each one of the off-grid positions received from the off-grid position generator. The accumulator further includes an adder for summing the weighted sensitivity level off-grid brightness values corresponding to respective ones of the sensitivity levels at each one of the received off-grid positions computed by the plurality of multipliers to derive a respective weighted sum sensitivity level off-grid brightness value at each one of the received off-grid positions. The off-grid estimator further comprises a response function compensator for compensating each one of the weighted sum sensitivity level off-grid brightness values by the inverse of a combined response function of light-sensing elements to derive the respective estimated off-grid brightness values at the off-grid positions. The combined response function of the light-sensing elements is the sum of weighted response functions of light-sensing elements having different ones of the sensitivity levels, each one of the weighted response functions being a response function of a light-sensing element having a respective one of the plurality of sensitivity levels multiplied by a predetermined weighting factor corresponding to the respective one of the plurality of sensitivity levels.

In yet another exemplary embodiment of the system of the present invention, the off-grid estimator comprises a pixel position generator for providing the multiplicity of pixel positions, a sensitivity pattern memory for storing respective sensitivity levels corresponding to the multiplicity of pixel positions, and a response function compensator coupled to receive pixel positions from the pixel position generator and corresponding sensitivity levels from the sensitivity pattern memory. The response function compensator also receives captured image brightness values from the captured image memory at the pixel positions received from the pixel position generator and compensates the received captured image brightness values by the inverse of the response functions of light-sensing elements having sensitivity levels corresponding to the received pixel positions to provide respective compensated captured image brightness values at the pixel positions received from the pixel position generator. The off-grid estimator also includes a compensated on-grid brightness value memory for storing respective compensated captured image brightness values at respective pixel positions, an off-grid position generator for providing the multiplicity of off-grid positions and a pseudoinverse estimator. The pseudoinverse estimator receives off-grid positions from the off-grid position generator and derives from the compensated captured image brightness values in the compensated on-grid brightness value memory the respective estimated off-grid brightness values at the received off-grid positions.

In a further exemplary embodiment of the system of the present invention where the system includes an off-grid brightness value memory for storing the respective estimated off-grid brightness values derived by the off-grid estimator at the multiplicity of off-grid positions and an on-grid resample for deriving from the estimated off-grid brightness values in the off-grid brightness value memory respective resampled brightness values at the multiplicity of pixel positions of the pixel position array, the on-grid resampler comprises a pixel position generator for providing the multiplicity of pixel positions, an interpolator for receiving pixel positions from the pixel position generator and deriving a respective resampled brightness value for each one of the received pixel positions by computing the product of the estimated off-grid brightness values at a predetermined number of off-grid positions that are nearest neighbors to the received pixel positions and an interpolation kernel having the same dimensions as the predetermined number of nearest neighbor off-grid positions.

In a still further exemplary embodiment of the system of the present invention, there is provided a system for capturing a relatively high dynamic range image of a scene using a relatively low dynamic range image sensor adapted to be exposed to incident light from the scene. The system comprising an image sensor having a multiplicity of light-sensing elements in a linear or two-dimensional array, each light-sensing element having a respective one of a plurality of sensitivity levels in accordance with a predetermined sensitivity pattern for the light-sensing element array, and being responsive to incident light from the scene for producing a captured image brightness value at a corresponding one of a multiplicity of pixel positions, where the pixel position array is rectangular, the captured image brightness values may be produced by corresponding light-sensing elements of a two-dimensional image sensor, or may be a concatenation of linear brightness value arrays of line images of a scanned scene successively captured by image sensor. The system further comprises a captured image memory for storing the captured image brightness values produced by the light-sensing elements at respective pixel positions of a pixel position array, which may be a linear array having regularly spaced pixel positions in a row or a rectangular array having pixel positions located at respective intersections of regularly spaced orthogonal pixel rows and pixel columns. The system also comprises a pixel position generator for providing the pixel positions of the pixel position array and an on-grid interpolation filter receiving pixel positions from the pixel position generator for deriving from the captured image brightness values in the captured image memory interpolated on-grid brightness values at the pixel positions received from the pixel position generator. The filter computes the product of respective captured image brightness values at a predetermined number of nearest neighbor pixel positions to each pixel position received from the pixel position generator and an on-grid interpolation filter kernel to derive an interpolated on-grid brightness value at each pixel position received from the pixel position generator, the dimensions of the on-grid interpolation filter being the same as the dimensions of the predetermined number of nearest neighbor pixel positions. Also included in the system is a response function compensator for compensating the interpolated on-grid brightness value at each one of the received pixel positions by the inverse of a combined response function of the light-sensing elements to derive a compensated interpolated on-grid brightness value at the received pixel position, and an output image memory for storing the compensated interpolated on-grid brightness values at the respective pixel positions of the pixel position array as the pixel brightness values of a high dynamic range output image. The combined response function of the light-sensing elements is the sum of weighted response functions of light-sensing elements having different ones of the plurality of sensitivity levels, each one of the weighted response functions being the response function of a light-sensing element having a respective one of the plurality of sensitivity levels multiplied by a predetermined weighting factor for the respective one of the plurality of sensitivity levels.

BRIEF DESCRIPTION OF DRAWINGS

For a more complete understanding of the nature and benefits of the present invention, reference should be made to the following detailed description taken in conjunction with the accompanying drawings, in which:

FIG. 33 shows an example of a 6×6, 2-dimensional Gaussian interpolation filter kernel;

FIG. 34 shows an example of a simple shift filter kernel;

Throughout the figures of the drawings the same reference numerals and characters are used to designate common features, components, parts, processes and steps.

DETAILED DESCRIPTION

Figure 1:
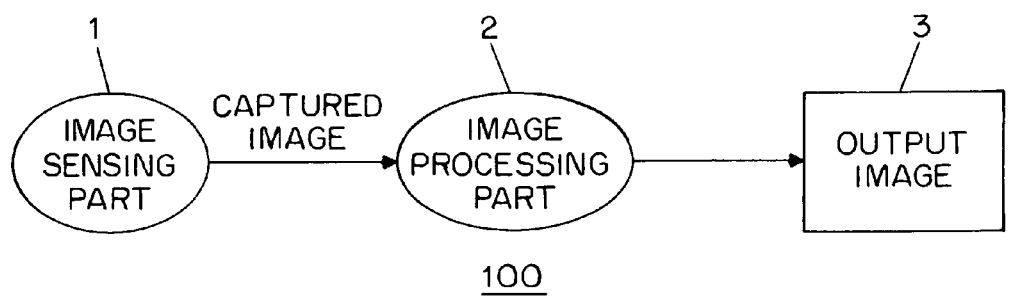
FIG. 1 is a data flow diagram representing a system for obtaining high dynamic range images according to the present invention.

Referring to FIG. 1, there is shown a data flow diagram 100 of a system for capturing relatively high dynamic range images using a relatively low dynamic range image sensor in accordance with the present invention. The system has an image sensing part 1 that includes a relatively low dynamic range image sensor (not shown in FIG. 1) having a multiplicity of light-sensing elements in an array (not shown). The term "light" as used in the specification and claims shall mean electromagnetic radiation whose wavelength may be anywhere in the spectrum from the far infrared to x-rays. The array of light-sensing elements of the image sensor may have any arrangement, including without limitation rectangular, linear, circular and hexagonal grids, and the light-sensing elements in the array need not be uniformly disposed. The array of light-sensing elements has a predetermined spatially varying sensitivity pattern to incident light, and each light-sensing element of the image sensor produces in response to incident light from a scene a captured image brightness value at a corresponding one of a multiplicity of pixel positions of a pixel position array defined by respective intersections of a plurality of regularly spaced pixel rows and a plurality of regularly spaced pixel columns orthogonal to the pixel rows (not shown in FIG. 1). The captured image brightness values at respective pixel positions produced by the light-sensing elements are stored in a captured image memory (not shown in FIG. 1) in the image processing part 2 of the system. The image processing part 2 serves to remove the variation in image brightness caused by the spatially varying sensitivity pattern of the image sensor in the image sensing part 1 and provides resampled brightness values at respective pixel positions, representing a relatively high dynamic range output image, to the output image memory 3.

Figure 2:
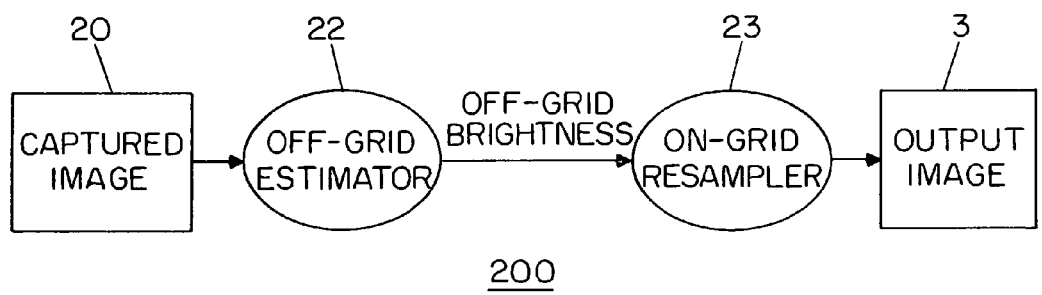
FIG. 2 is a data flow diagram representing the image processing part of the data flow diagram of FIG. 1 according to an exemplary embodiment of the present invention.

Turning to FIG. 2, there is shown a dataflow diagram 200 of the image processing part 2 of the data flow diagram of FIG. 1. The captured image brightness values at respective pixel positions of the pixel position array, as provided by the image sensor, are stored in a captured image memory 20. The captured image brightness values in the captured image memory 20 are used by an off-grid estimator 22 to derive estimated off-grid brightness values at off-grid positions located at respective interstices of the pixel position array. The estimated off-grid brightness values at respective off-grid positions are then resampled by an on-grid resampler 23 to derive resampled brightness values at respective pixel positions. The resampled brightness values are stored in an output image memory 21 as the pixel brightness value representing the relatively high dynamic range image. Because the brightness value produced by each one of the light-sensing elements of the image sensor is not combined with the brightness value produced by any other light-sensing element, there is no reduction in the resolution of the image captured by the image sensor. Also, because the brightness values at respective off-grid positions are estimated from the captured image brightness values at respective pixel positions and the resampled brightness values at respective pixel positions are derived by resampling of the estimated off-grid brightness values at the off-grid positions, the captured image brightness value produced by any one of the light-sensing elements can contribute to any one of the resampled brightness values. Consequently, the resampled output image in the output image memory 21 has almost the same resolution as the captured image in the captured image memory 20.

Figure 3:
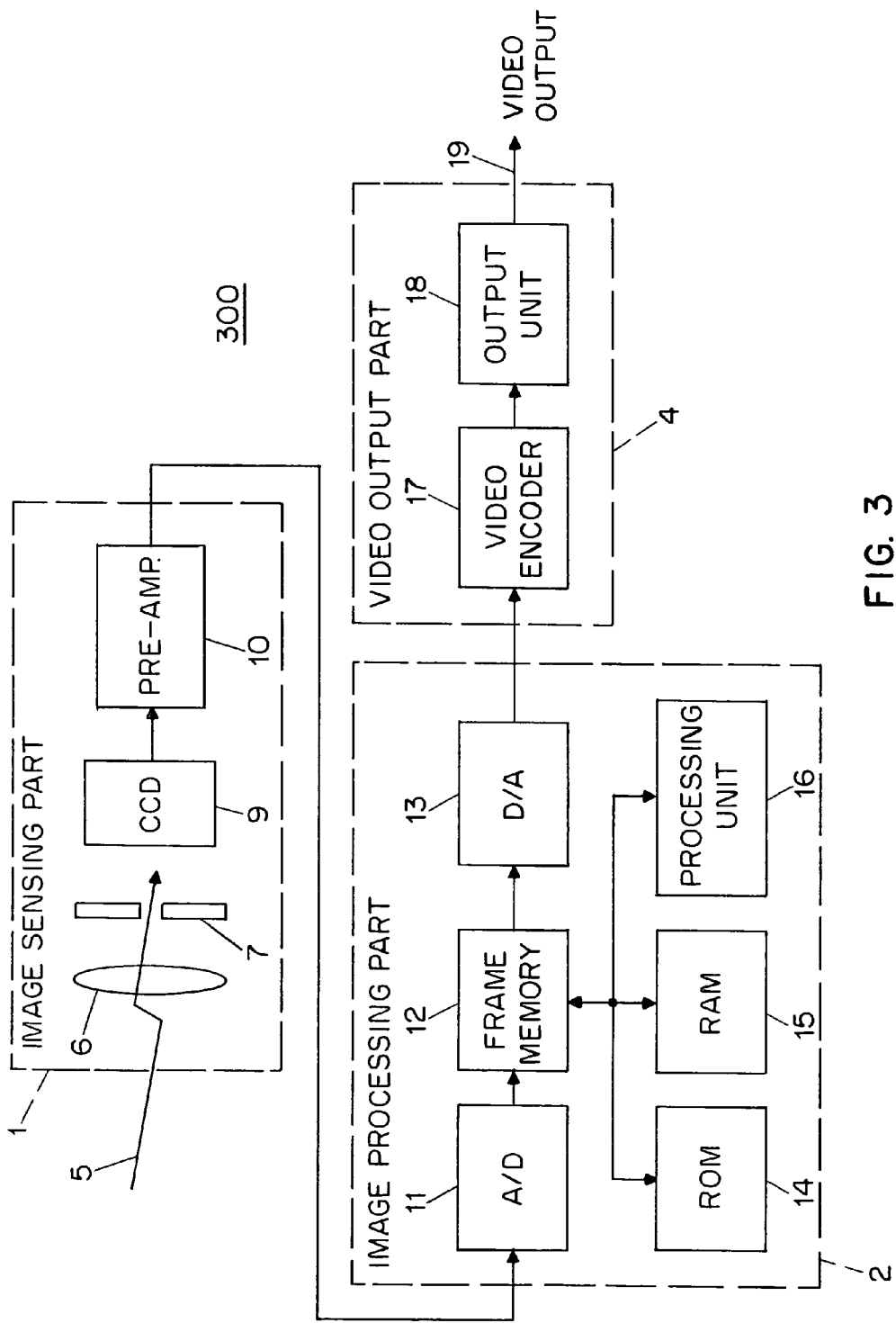
FIG. 3 is a block diagram depicting the hardware components of an exemplary system in accordance with the present invention.

Referring to FIG. 3, there is shown a block diagram of the hardware components of a system 300 according to an exemplary embodiment of the present invention. The system 300 has an image sensing part 1, an image processing part 2 and video output part 4. A scene is captured by the image sensing part 1 with an image sensor having a predetermined spatially varying sensitivity pattern. The image sensing part 1 provides an image signal representing the captured image to the image processing part 2. The image processing part removes the variations in brightness of the image caused by the spatially varying sensitivity pattern of the image sensor and provides an output image signal to the video output part 4. The video output part 4 is not a part of the present invention but is included here for the purpose of showing a complete video imaging system that provides an output video signal representing relatively high dynamic range images.

The image sensing part 1 includes a lens system 6, an aperture 7, a charge coupled device (CCD) image sensor 9 and a preamplifier 10. Incident light 5 from a scene passes through the lens system 6 and the aperture 7 before reaching the CCD image sensor 9. The CCD image sensor 9 has a predetermined spatially varying sensitivity pattern according to which the sensitivity level of each of the light-sensing elements (not shown) of the image sensor 9 is determined. Different exemplary ways of providing a spatially varying sensitivity pattern for the CCD image sensor 9 are described hereinbelow. The preamplifier 10 consists of a group of several analog circuits which are typically used in video cameras, such as an automatic gain control circuit for adjusting the amplitude of the CCD image sensor output and a correlated double sampling circuit for reducing noise.

The image sensing part 2 has an analog-to-digital (A/D) converter 11, a frame memory 12, a digital-to-analog (D/A) converter 13, a read-only memory (ROM) 14, a random-access memory (RAM) 15 and a processor unit 16. The A/D converter 11 digitizes the image signal from the image sensing part 1, and the digitized image data (captured image brightness values at respective pixel positions) are stored in the frame memory 12. Computations in the image processing part 2 are performed by the processing unit 16, which has access to the data in the frame memory 12, the ROM 14 and the RAM 15. Predefined data and programs to be used by the processing unit 16 to perform its computations are stored in the ROM 14. A portion of the RAM 15 is used for temporary storage of data during computations by the processing unit 16. Computed resampled brightness values at respective pixel positions, which are stored in the frame memory 12, are converted to an analog image signal by the D/A converter 13 and provided to the video output part 4.

The video output part 4 comprises a video encoder 17 and an output unit 18. The analog image signal from the image processing part 2 is encoded to a video signal by the video encoder 17, and the output unit 18 outputs the video output signal 19.

Image Sensing Part

Figure 4:
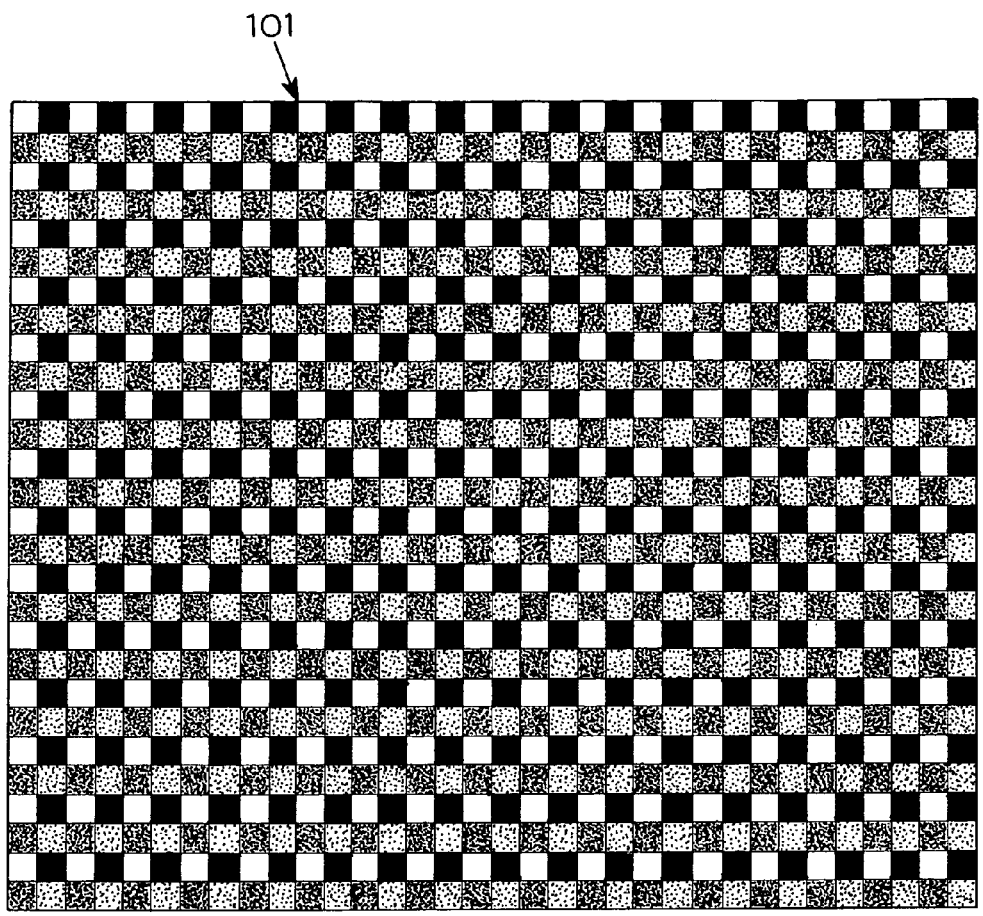
FIG. 4 depicts an illustrative mask having a spatial repetition of groups of four cells where each cell of each group has a different transparency in a common predetermined positional order.
Figure 5:
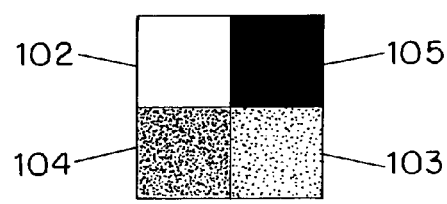
FIG. 5 is a group of four cells having different transparencies in a predetermined positional order of the mask of FIG. 4.

The spatially varying sensitivity pattern of the CCD image sensor 9 may be implemented by using a fixed pattern mask or by on-chip techniques. Turning now to FIG. 4, there is shown an example of a fixed pattern mask 101 having a predetermined spatially varying exposure pattern. In this example, the fixed pattern mask 101 is a plate having a two-dimensional array of cells of different transparencies (attenuations). The exposure pattern of the mask 101 is defined by a repetitive pattern of identical groups of four nearest neighbor cells each having a different transparency. An example of such a group of four nearest neighbor cells is shown in FIG. 5. The group has a most transparent cell 102, a transparent cell 103, a less transparent cell 104 and a least transparent cell 105 arranged in a predetermined positional order common to all groups of cells of the mask 101. Each cell of the mask 101 is used to control the sensitivity level of a respective light-sensing element of the image sensor. In the case of a CCD image sensor, the mask 101 may be fabricated on the same substrate as the CCD device by forming a transparent layer over the photosensitive region of the device and forming the cells of different transparencies by patterning the layer using known photolithography and etching techniques to form a mask with a desired exposure pattern. Alternatively, the light-sensing surfaces of the light-sensing elements themselves may be subjected to masked etching operations to alter the photosensitivities of preselected light-sensing elements to desired levels. By using the fixed pattern mask 101, each local area of a captured image exposed through one of the groups of four neighboring cells 102, 103, 104 and 105 will have four different exposures. In this manner, every such local area of the captured image will have a relatively high dynamic range resulting from the use of four different exposures (i.e., four light-sensing elements having different sensitivity levels).

Figure 6:
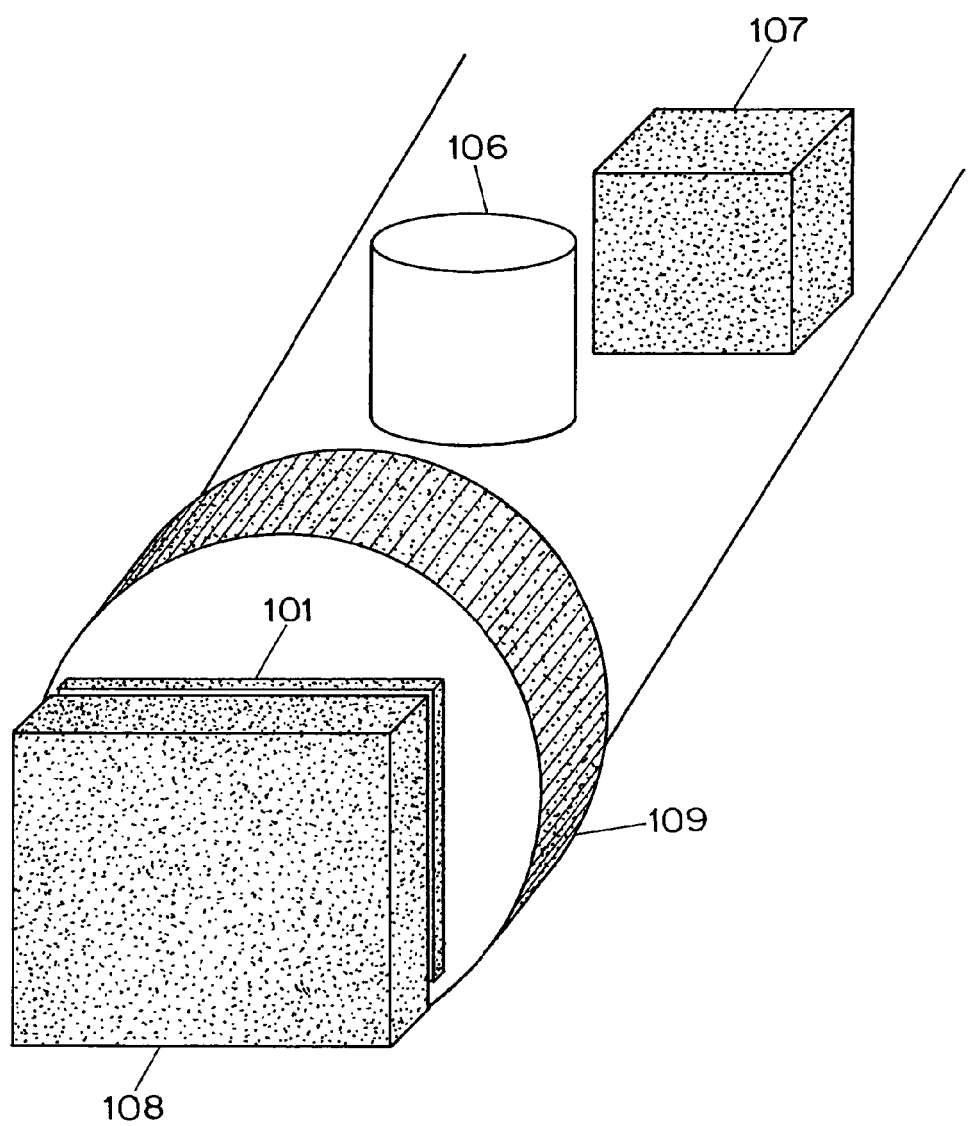
FIG. 6 illustrates the capture of a scene having a bright object and a dark object using a masked image sensor in accordance with the present invention.

Referring to FIG. 6, there is illustrated an arrangement for capturing the image of a scene using the fixed pattern mask 101. As shown in the figure, the fixed pattern mask 101 is placed directly in front of an image sensor 108. The mask 101 is aligned with the image sensor 108 so that each cell of the mask 101 is positioned directly in front of a corresponding light-sensing element (not shown) of the image sensor 108. Incident light from the scene passes through the camera optics 109 and is then focused onto the image plane of the image sensor 108 through the mask 101. The brightness of the incident light which is detected by each light-sensing element of the image sensor 108 is determined by the transparency of the mask cell which is in front of that light-sensing element. In the scene which is being captured in FIG. 6, there is a bright object 106 and dark object 107.

Figure 7:
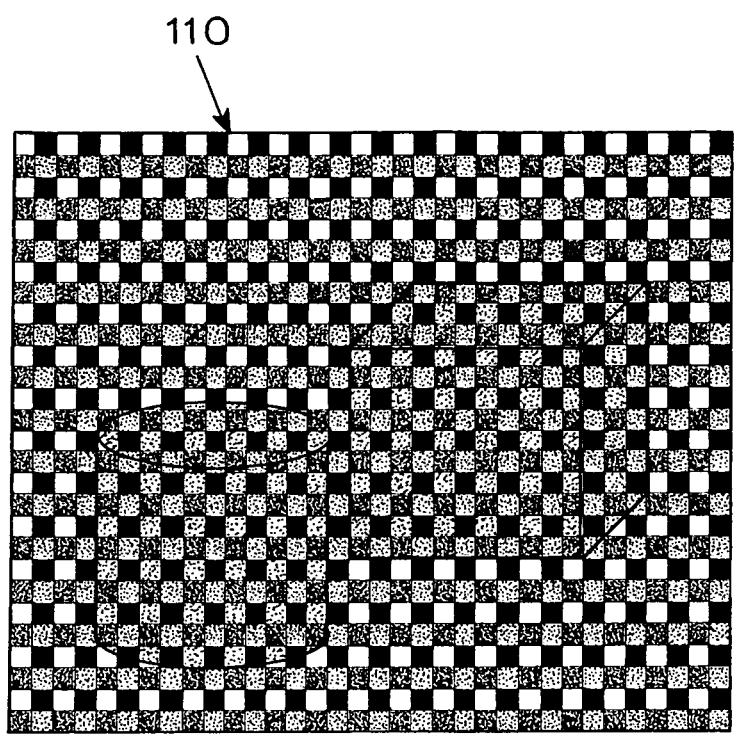
FIG. 7 is an illustrational representation of a captured image of a scene by a masked image sensor in accordance with the present invention.

Turning to FIG. 7, there is shown a representation 110 of the image of the scene in FIG. 6 as captured by the image sensor 108 through the fixed pattern mask 101. It is noted in FIG. 7 that even if pixels of brighter exposure have saturated brightness values in an area of the bright object 106, pixels of darker exposure in the same area have non-saturated brightness values. Similarly, even if pixels of darker exposure have brightness values below the noise level of the light-sensing elements receiving incident light from the area of the dark object 107 in FIG. 6, pixels of brighter exposure receiving incident light from the same area will have brightness values above the noise level.

Figure 8:
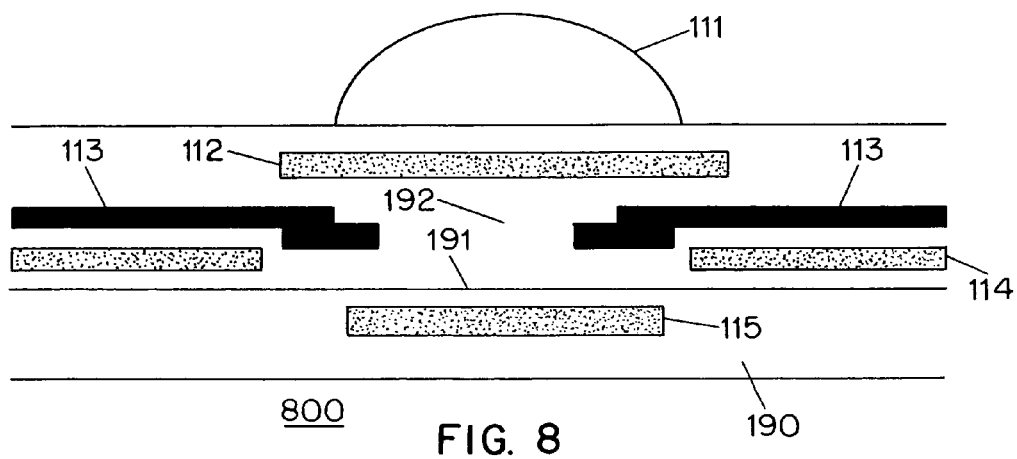
FIG. 8 is a schematic representation of the cross section of a light-sensing element and associated structure of a typical charge couple device image sensor.

Referring to FIG. 8, there is shown in schematic representation 800 of the cross section of a light-sensing element and associated structure of a typical CCD image sensor, which is the preferred type of image sensor for implementing a system according to the present invention. The light-sensing element comprises a photodiode consisting of an n-type region 115 formed within a p-well region 190. The photodiode has a light-sensing surface 191 adapted to be exposed to incident light and is operatively biased (n-type region 115 being reverse biased with respect to the p-well region 190) to form a potential well in the p-well region for storing photogenerated charge therein. Associated with the photodiode is a transfer gate electrode 114, which upon the application of an appropriate voltage signal thereto creates a channel for the photogenerated charge stored in the photodiode to pass to a vertical shift register (not shown in FIG. 8), as will be further explained hereinbelow. An opaque light shield layer 113 is formed to prevent incident light from reaching regions other than the light-sensing surfaces of the photodiodes of the CCD image sensor. An aperture 192 is formed in the light shield layer 113 to expose the light-sensing surface 191 of each one of the photodiodes in the CCD image sensor. An on-chip micro lens 111 may be formed above the light-sensing surface 191 of the photodiode to concentrate incident light onto the light-sensing surface 191. Especially for color CCD image sensors, there is formed an on-chip optical filter 112 between the on-chip micro lens 111 and the light-sensing surface 191 of the photodiode.

Figure 9:
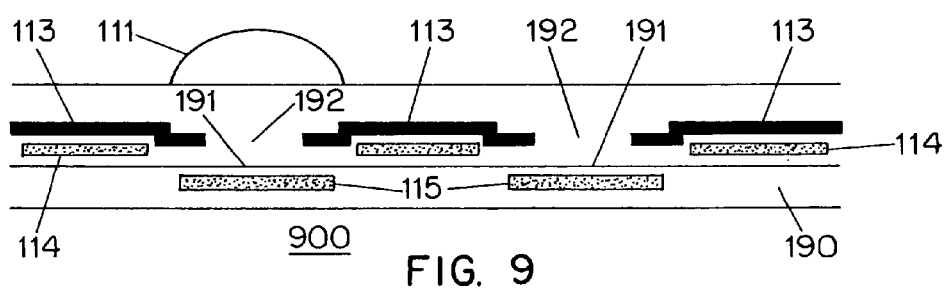
FIG. 9 is a schematic representation of the cross section of two adjacent light-sensing elements and associated structure of a charge coupled device image sensor illustrating one technique for providing the light-sensing elements with different sensitivity levels.

Turning to FIG. 9, there is shown a schematic representation 900 of the cross section of two adjacent light-sensing elements and associated features of a CCD image sensor, in which the two light-sensing elements have different sensitivity levels. The light-sensing element on the left of the figure has an on-chip micro lens 111 for concentrating incident light onto the light sensitive surface 191 of photodiode, while the light-sensing element on the right does not have an on-chip micro lens above the light-sensing surface 191 of its photodiode. Therefore, the light-sensing element on the left will receive a greater intensity of incident light at its light-sensing surface 191 than the light-sensing element on the right. In this manner the light-sensing element on the left is fabricated to have a higher sensitivity level than the light-sensing element on the right. By forming an on-chip micro lens 111 above preselected light-sensing elements of the image sensor a predetermined spatially varying sensitivity pattern having two sensitivity levels is attained for the CCD image sensor.

Figure 10:
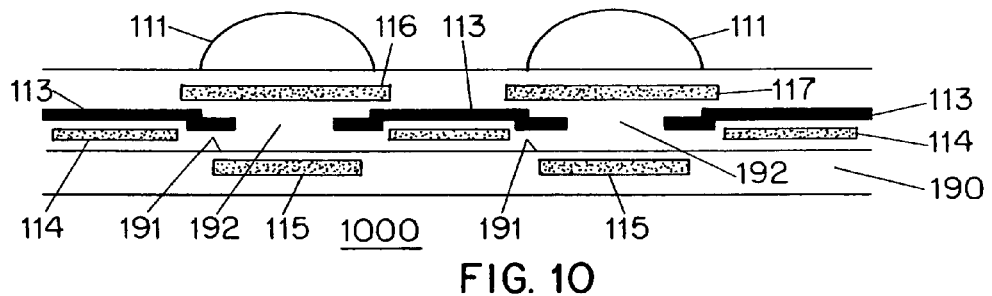
FIG. 10 is a schematic representation of the cross section of two adjacent light-sensing elements and associated structure of a charge coupled device image sensor illustrating another technique for providing the light-sensing elements with different sensitivity levels.

Turning to FIG. 10, there is shown a schematic representation 1000 of the cross section of two adjacent light-sensing elements and associated structure of a CCD image sensor, illustrating an alternative technique for providing the light-sensing elements with different sensitivity levels. Respective on-chip filters 116 and 117 are formed between the on-chip micro lenses 111 and the light-sensing surfaces 191 of the right and left photodiodes, respectively. The filters 116 and 117 are formed to have different transparencies to incident light, thus causing the light-sensing elements on the right and left to have different sensitivity levels. By forming the filters above the photosensitive surfaces 191 of respective photodiodes of the CCD image sensor to have predetermined transparencies, a predetermined spatially varying sensitivity pattern is attained for the CCD image sensor.

Figure 11:
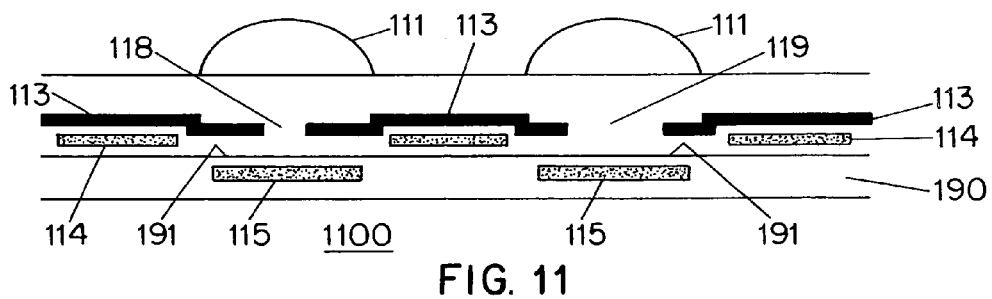
FIG. 11 is a schematic representation of the cross section of two adjacent light-sensing elements and associated structure of a charge coupled device image sensor illustrating yet another technique for providing the light-sensing elements with different sensitivity levels.

Referring to FIG. 11, there is shown a schematic representation 1100 of the cross section of two adjacent light-sensing elements and associated structure of a CCD image sensor. The light shields layer 113 has respective apertures 118 and 119 above the photosensitive surfaces 191 of the left and right light-sensing elements. The apertures 118 and 119 in the light shield layer 113 are formed to have different sizes so as to allow different amounts of incident light to reach the light-sensing surfaces 191 of the left and right photodiodes. By forming the apertures above the light-sensing surfaces 191 of respective light-sensing elements of the image sensor to have predetermined sizes, a predetermined spatially varying sensitivity pattern is attained for the image sensor.

Figure 12:
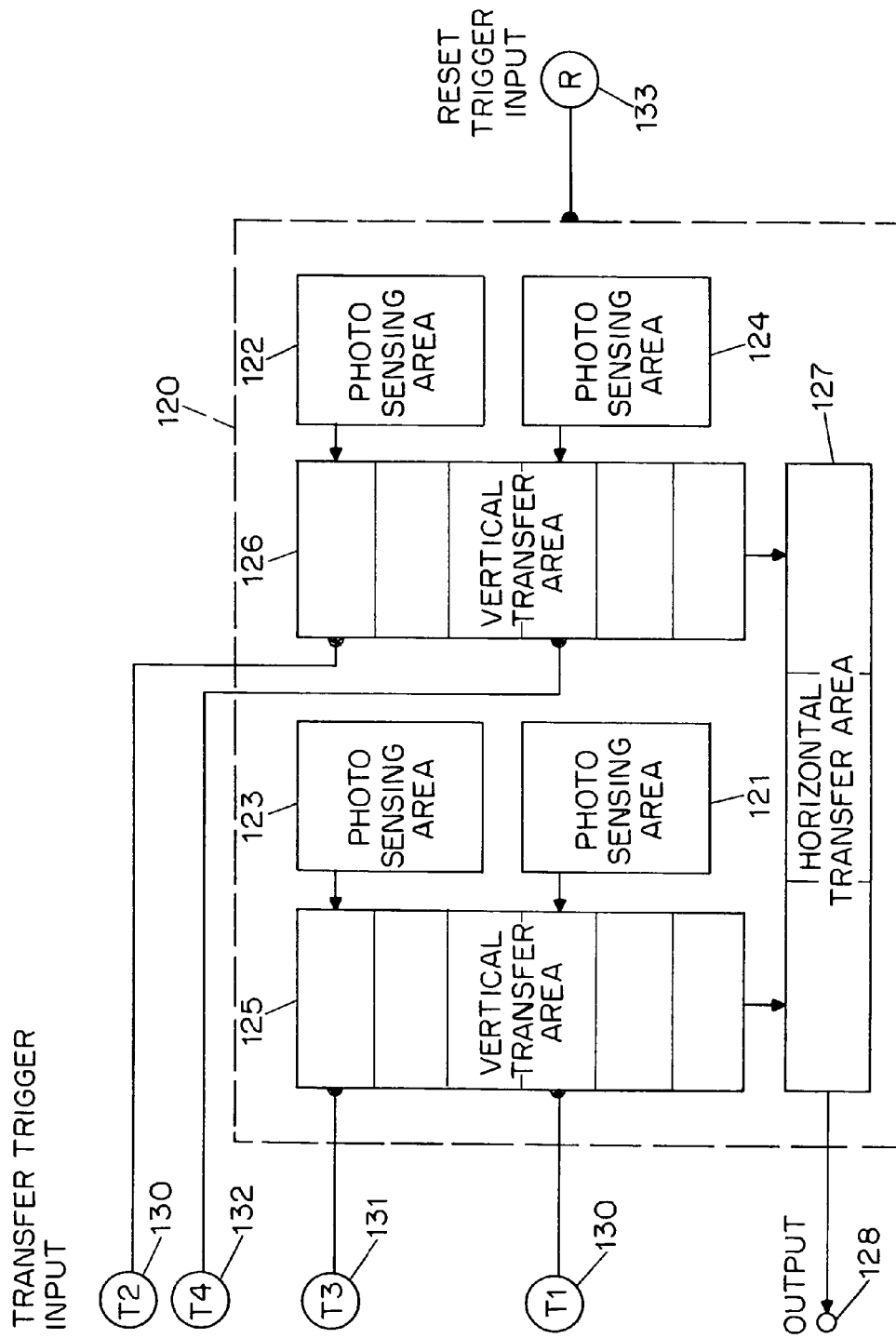
FIG. 12 is a schematic representation of a simplified charge coupled device image sensor having an interline structure showing terminals for applying reset trigger pulses and transfer trigger pulses for respective light-sensing elements to provide the light-sensing elements with different sensitivity levels.

Referring to FIG. 12, there is shown a schematic layout diagram 1200 representing a simplified CCD image sensor having four photodiodes 121, 122, 123 and 124, and an interline structure in which each column of photodiodes 121 and 123, and 124 and 122 is located adjacent a corresponding vertical shift register 125 and 126, respectively. As explained above in connection with FIG. 8, each photodiode has an associated transfer gate electrode 114. When an appropriate voltage transfer trigger signal is applied to the transfer gate electrode 114 associated with a photodiode, photogenerated charge stored in the photodiode is allowed to pass to a respective stage of the corresponding vertical shift register and is accumulated therein for the duration of an exposure period. The diagram of FIG. 12 shows four transfer trigger inputs 129, 130, 131 and 132 for applying transfer trigger signals to the transfer gate electrodes associated with photodiodes 121, 122, 123 and 124, respectively, to transfer photogenerated charge stored in the photodiodes 121, 122, 123 and 124 to respective stages of corresponding shift registers 125 and 126. At the end of each exposure period stored photogenerated charge transferred from the photodiodes and accumulated in respective stages of the vertical shift registers are shifted in each vertical shift register 125 and 126 by a three-phase clock (not shown) to respective stages of a horizontal shift register 127. Once in the horizontal shift register 127, the accumulated photogenerated charge from each one of the photodiodes 121, 122, 123 and 124 are shifted out sequentially by a two phase clock (not shown) to an output terminal 128 where the respective charge packets are detected as voltage signal proportional to the magnitude of the accumulated photogenerated charge packet reaching the output terminal 128.

Figure 13:
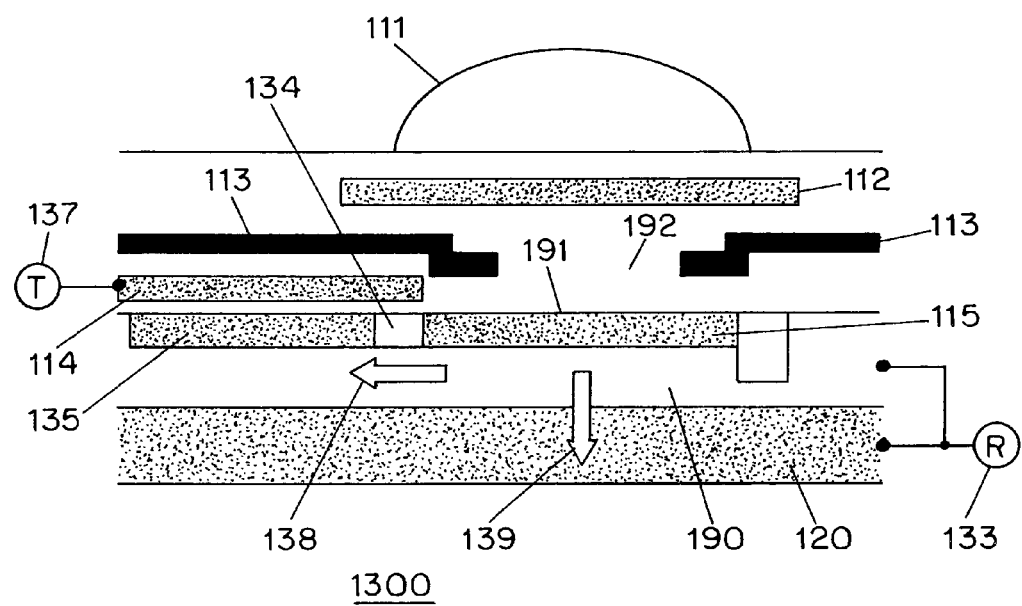
FIG. 13 is a schematic representation of the cross section of a light-sensing element, its associated structure and a stage of a corresponding vertical shift register of a typical charge coupled device image sensor having an interlined structure illustrating the sinking of stored photogenerated charge upon the application of a reset trigger signal and the transfer of stored photogenerated charge to a respective shift register stage upon the application of a transfer trigger signal.

Turning to FIG. 13, there is shown a schematic representation 1300 of the cross section of a photodiode formed by n-type region 115 and p-well region 190, a stage of the corresponding vertical shift register formed by n-type region 135 and p-well region 190, a p-type barrier region 134 separating the photodiode and the shift register stage, and the transfer gate electrode 114 associated with the photodiode connected to a transfer trigger input 137. The shift register stage comprises an n-type region 135 which is appropriately biased with respect to the p-well 190 to form a potential well (not shown) for receiving and accumulating photogenerated charge transferred to the shift register stage. When a transfer trigger pulse signal is applied to terminal 137, photogenerated charge stored in the potential well of the photodiode form by n-type region 115 and the p-well 190 is allowed to pass through a channel beneath the barrier region 134 to the potential well of the shift register stage, as indicated by the arrow 138.

In addition to the periodic application of a transfer trigger pulse to transfer trigger input 137, the photogenerated charge stored in each photodiode is periodically discharged by the periodic application of a reset pulse signal to a reset input 133. The application of each reset pulse voltage signal appropriately biases the junction between the p-well and a heavily doped n-type charge sink region 120 to cause substantially all of the photogenerated charge stored in the potential well of each photodiode of the CCD image sensor to be transferred to the charge sink region 120, as indicated by the arrow 139.

Figure 14:
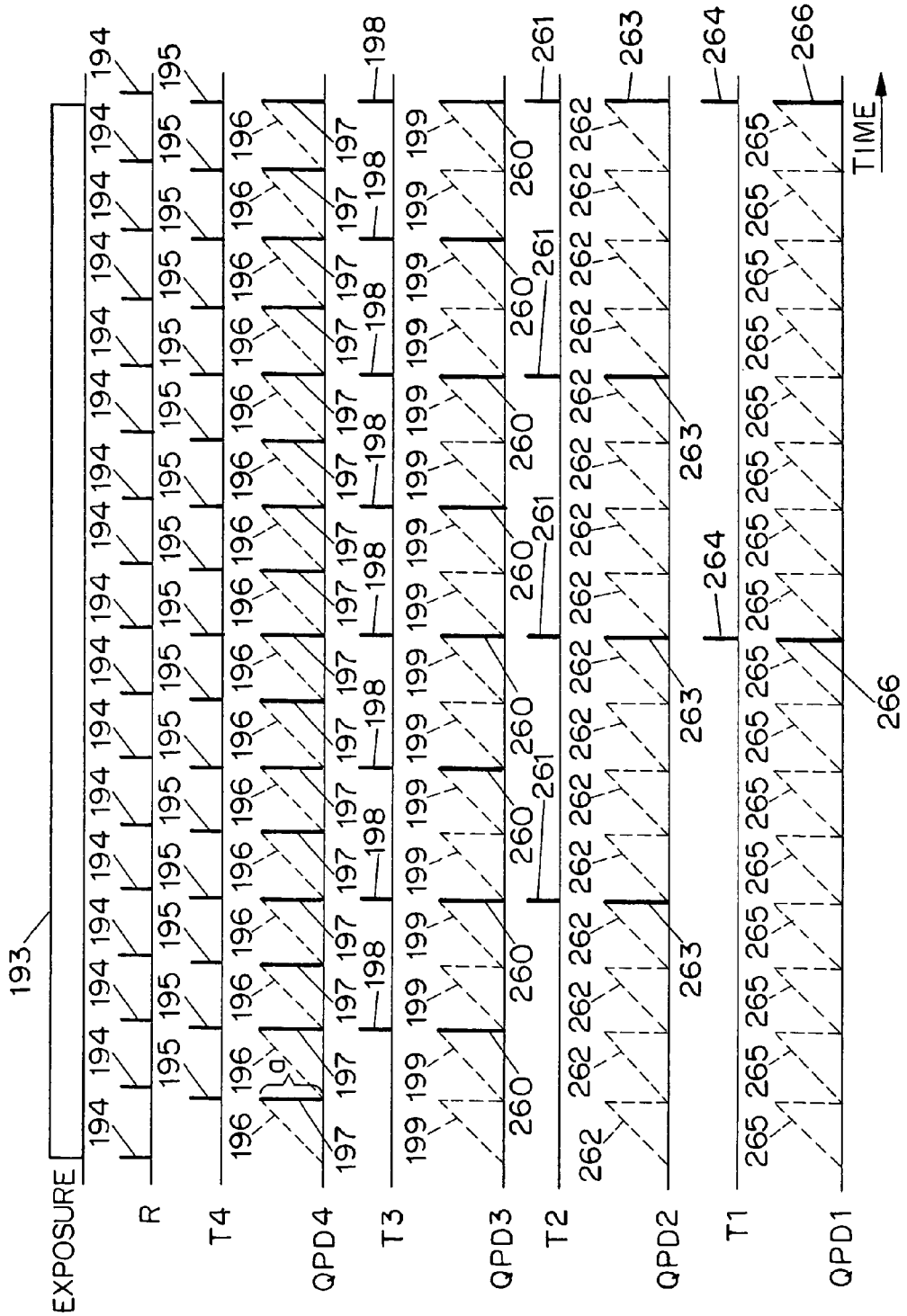
FIG. 14 show timing diagrams depicting waveforms of an exposure pulse, reset trigger pulses, transfer trigger pulses for four photodiodes and the magnitude of charge stored in each of the four photodiodes for the simplified charge coupled device image sensor depicted in FIG. 13 to provide different sensitivity levels for the four light-sensing elements of the image sensor.

Turning now to FIG. 14, there are shown timing diagrams of an exposure pulse 193, reset trigger pulses 194, transfer trigger pulses 195, 198, 261 and 264 associated with the four photodiodes of the exemplary CCD image sensor of FIG. 12, and the magnitudes of the stored photogenerated charge 196, 199, 262 and 265 in the four photodiodes PD4, PD3, PD2 and PD1, respectively, of the exemplary CCD image sensor. The duration of the exposure period for capturing an image is determined by the width of the exposure pulse 193. Each time a reset pulse 194 is applied to the reset trigger input 133 of the CCD image sensor, the photogenerated charge stored in each photodiode of the image sensor goes to zero for reasons explained hereinabove. Because all photodiodes in the CCD image sensor are exposed to incident light the magnitude of the photogenerated charge, as represented by waveforms 196, 199, 262 and 265, increases between reset pulses 194. As explained above, each time a transfer trigger pulse is applied to the transfer gate electrode associated with a photodiode, photogenerated charge stored in the photodiode is transferred to a respective stage of a corresponding vertical shift register. In the case of photodiode PD4, transfer trigger pulses 195 are applied to its associated transfer gate electrode at the same frequency as the reset pulses 194 but with the phase shifted so that each transfer trigger pulse 195 immediately precedes the next reset pulse 194. The application of each transfer trigger pulse 195 causes an amount of charge represented by a corresponding blackened region 197 to be transferred to a respective stage of a corresponding vertical shift register, and the transferred charge is accumulated therein for the duration of the exposure pulse 193.

Transfer trigger pulses 198, which have the same width as transfer trigger pulses 195, are applied to the transfer gate electrode associated with photodiode PD3 at half the frequency as that of transfer trigger pulses 195. The phase of the transfer trigger pulses 198 is such that each transfer trigger pulse 198 immediately precedes the next reset pulse 194. The application of each transfer trigger pulse 198 causes an amount of photogenerated charge stored in photodiode PD3 represented by the corresponding blackened region 260 to be transferred to a respective stage of a corresponding vertical shift register, and the transferred charge is accumulated therein for the duration of the exposure pulse 193. Because transfer trigger pulses 198 occur at half the frequency of the transfer trigger pulses 195, the photogenerated charge accumulated in the vertical shift register stage receiving photogenerated charge from photodiode PD3 over the exposure duration will be half of that which is accumulated in the vertical shift register stage that receives photogenerated charge from photodiode PD4 over the same exposure duration. Operated in this manner, the effective sensitivity level of photodiode PD3 will be half that of photodiode PD4.

Transfer trigger pulses 261, which have the same width as the transfer trigger pulses 198 and 195, are applied to the transfer gate electrode associated with photodiode PD2. The phase of the transfer trigger pulses 261 is such that each transfer trigger pulse 261 immediately precedes the next reset pulse 194. The application of each transfer trigger pulse 261 causes the transfer of an amount of photogenerated charge stored in photodiode PD2 represented by the corresponding blackened region 263 to a respective stage of a corresponding vertical shift register, and the transferred charge is accumulated therein for the duration of the exposure pulse 193. Because the frequency of the transfer trigger pulses 261 is half that of the transfer trigger pulses 198 and one-quarter of that of the transfer trigger pulses 195, the total amount of photogenerated charge accumulated in the shift register stage that receives stored photogenerated charge from photodiode PD2 over the duration of the exposure pulse 193 will be half of that which is accumulated in the vertical shift register stage that receives stored photogenerated charge from photodiode PD3 and one-quarter of that which is accumulated in the shift register stage that receives stored photogenerated charge from photodiode PD4 over the same exposure duration. Consequently, the effective sensitivity level of photodiode PD2 is half of the effective sensitivity level of photodiode PD3 and one-quarter of the effective sensitivity level of photodiode PD4.

Transfer trigger pulses 264, which have the same width as transfer trigger pulses 261, 198 and 195, are applied to the transfer gate electrode associated with photodiode PD1 at half the frequency of that of transfer trigger pulses 261. The phase of the transfer trigger pulses 264 is such that each transfer trigger pulse 264 immediately precedes the next reset pulse 194. The application of each transfer trigger pulse 264 causes an amount of photogenerated charge stored in photodiode PD1 represented by the corresponding blackened region 266 to be transferred to a respective stage of a corresponding vertical shift register, and the transferred charge is accumulated therein for the duration of the exposure pulse 193. Because the frequency of the transfer trigger pulses 264 is half of that of transfer trigger pulses 261, one-quarter of that of transfer trigger pulses 198 and one-eighth of that of transfer trigger pulses 195, the total photogenerated charge accumulated in the vertical shift register stage receiving stored photogenerated charge from photodiode PD1 over the duration of the exposure pulse 193 is one-half of that which is accumulated in the shift register stage receiving stored photogenerated charge from photodiode PD2, one-quarter of that which is accumulated in the shift register stage receiving stored photogenerated charge from photodiode PD3 and one-eighth of that which is accumulated in the vertical shift register stage which receives stored photogenerated charge from photodiode PD4 over the same exposure duration. Consequently, the effective sensitivity level of photodiode PD1 is one-half of that of photodiode PD2, one-quarter of that photodiode PD3 and one-eighth of that photodiode PD4. Accordingly, different effective sensitivity levels may be obtained for the photodiodes of the CCD image sensor by applying respective transfer trigger pulses to their associated transfer gate electrodes at different frequencies in the manner described. Because photogenerated charge is accumulated in small amounts in respective vertical shift register stages upon the application of each transfer trigger pulse and the transfer trigger pulses are uniformly distributed over the exposure period, movement in the scene will be integrated in the same manner in the vertical shift register stages accumulating stored photogenerated charge from respective photodiodes. Thus, inconsistency of motion blur in the output images is suppressed by using the foregoing technique for obtaining a predetermined spatially varying sensitivity pattern for the CCD image sensor.

Image Processing Part

Returning to the dataflow diagram of FIG. 2, the image processing part 200 according to an exemplary embodiment of the present invention comprises a captured image memory 20, an off-grid estimator 22, an on-grid resampler 23 and an output image memory 21. The captured image memory 20, which is physically implemented, for example, as part of the frame memory 12 in the block diagram of FIG. 3, stores in digitized form the image captured by the image sensing part 1 of FIG. 1. The off-grid estimator 22 reads the captured image brightness values in the captured image memory 20 and computes brightness values at respective off-grid positions, the off-grid positions being positions which are not on the image (pixel position) array. The on-grid resampler 23 receives the brightness values at respective off-grid positions and computes resampled brightness values at respective pixel positions by resampling the off-grid brightness values at respective off-grid positions. The computed resampled brightness values at respective pixel positions are stored in the output image memory 21 as pixel brightness values of a relatively high dynamic range image of the scene.

Figure 15:
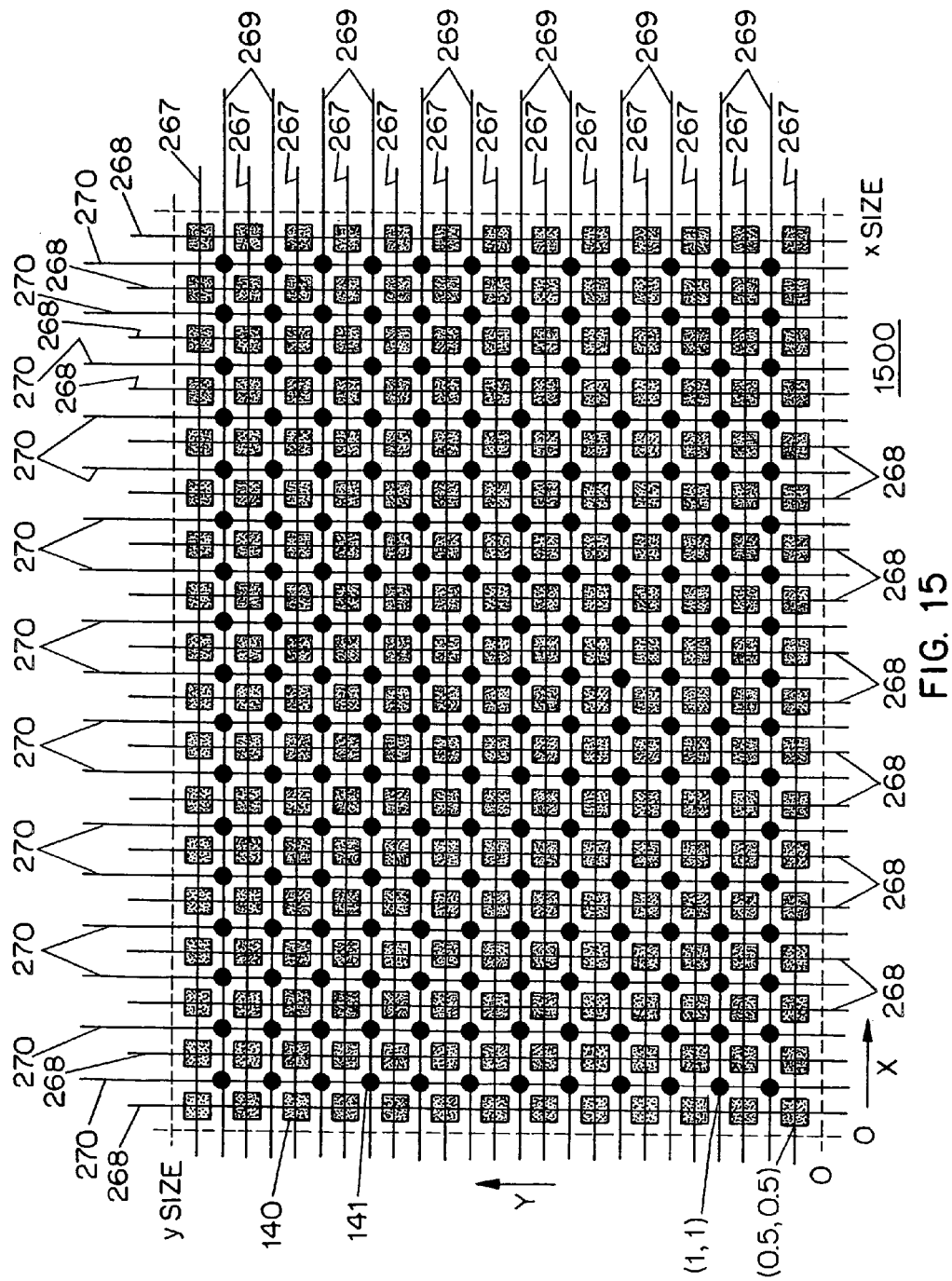
FIG. 15 is a diagram illustratively depicting pixel positions located at respective intersections of a plurality of regularly spaced pixel rows and a plurality of regularly spaced pixel columns orthogonal to the pixel rows, and off-grid positions located at respective intersections of a plurality of regularly spaced intermediate rows and a plurality of regularly spaced intermediate columns.

Referring to FIG. 15, there is shown an exemplary arrangement 1500 of pixel positions represented by rectangles 140 located in a pixel position array defined by respective intersections of a plurality of regularly spaced pixel rows 267 and a plurality of regularly spaced pixel columns 268 orthogonal to the pixel rows 267. The off-grid positions are generally located at respective interstices of the pixel position array form an off-grid position array. In the arrangement of FIG. 15, the off-grid positions, which are represented by black dots 141, form an off-grid position array defined by respective intersections of a plurality of regularly spaced intermediate rows 269 and a plurality of regularly spaced intermediate columns 270 orthogonal to the intermediate rows 269.

Each one of the intermediate rows 269 is parallel to the pixel rows 267 and extends medially between a respective adjacent pair of the pixel rows 267. Each one of the intermediate columns 270 is parallel to the pixel columns 268 and extends medially between a respective adjacent pair of the pixel columns 267. For convenient reference of the pixel positions and off-grid positions, the bottom left corner of the captured image is defined as the origin of a coordinate system (0,0) with the pixel position nearest the origin having coordinates (0.5, 0.5) and the off-grid position nearest the origin having coordinates (1,1). The bottom right corner of the captured image is defined as having coordinates (xSize, 0), where xSize is the dimension of the captured image in the direction (x direction) of the pixel rows 267, and the upper left corner of the image is defined as having coordinates (0,ySize), where ySize is the dimension of the captured image in the direction (y direction) of the pixel columns 268.

Figure 16:
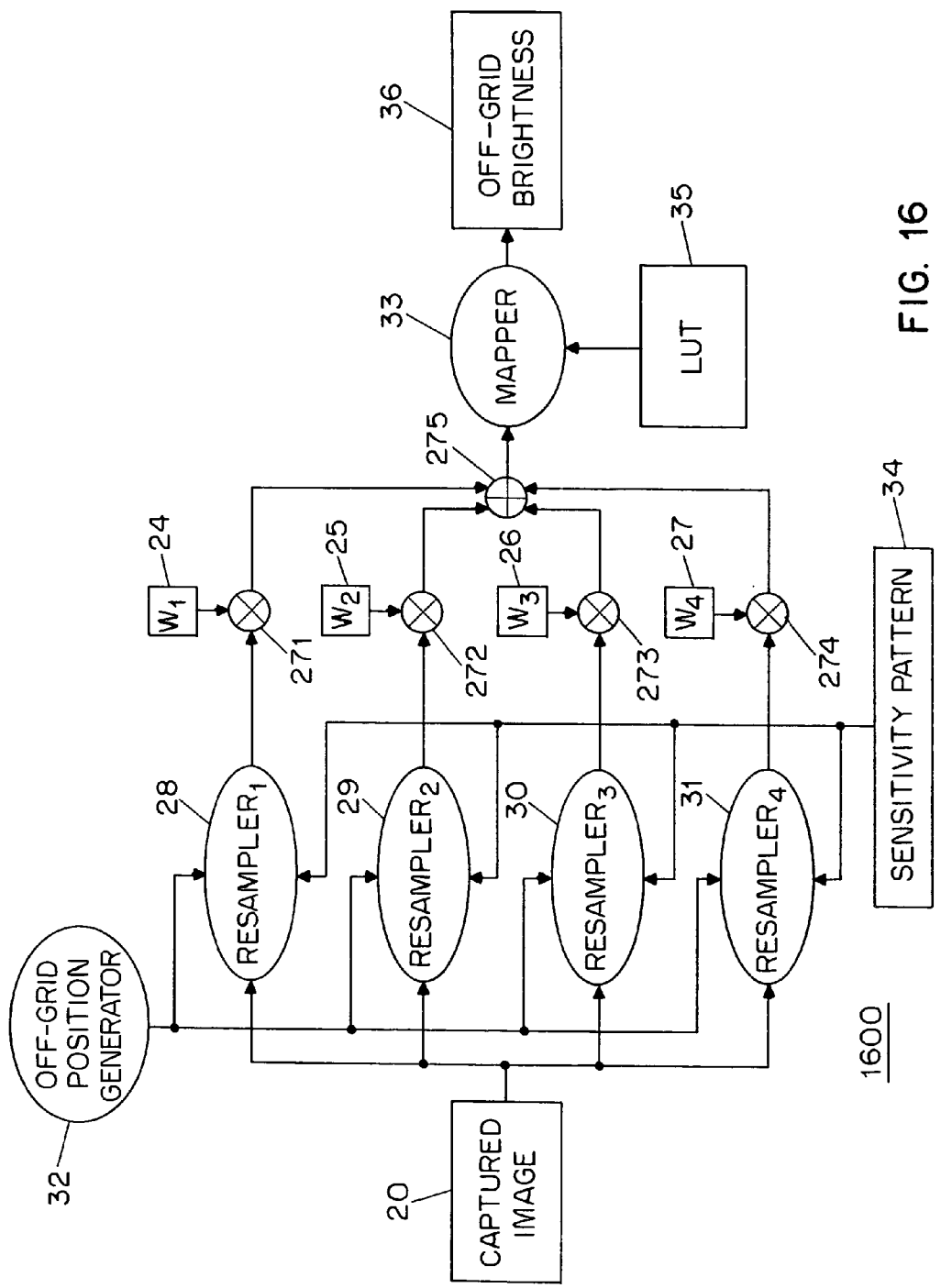
FIG. 16 is a data flow diagram of the off-grid estimator of the diagram of FIG. 2 according to another exemplary embodiment of the present invention.

Turning to FIG. 16, there is shown a dataflow diagram 1600 of the off-grid estimator (22 in the diagram of FIG. 2) according to an exemplary embodiment of the present invention. For this embodiment the light-sensing elements of the image sensor have four different sensitivity levels. The off-grid estimator 1600 has four resamplers 28, 29, 30 and 31, each corresponding to a respective one of the four sensitivity levels, an off-grid position generator 32 for providing the off-grid positions of the off-grid position array as defined by the diagram of FIG. 15, and a sensitivity pattern data memory 34 for storing data indicative of the sensitivity level corresponding to each one of the pixel positions. In addition, the off-grid estimator of 1600 includes weighting factor memories 24, 25, 26 and 27 for storing weighting factors $W_1$, $W_2$, $W_3$ and $W_4$, respectively, each weighting factor corresponding to a respective one of the sensitivity levels of the light-sensing elements, and multipliers 271, 272, 273 and 274, each of which receive the output of a respective one of resamplers 28, 29, 30 or 31 and weighting factors $W_1$, $W_2$, $W_3$, or $W_4$ corresponding to the same sensitivity level as the respective one of the resamplers, and providing the product of the received resampler output and weighting factor. The off-grid estimator 1600 also includes an adder 275 which receives the outputs of multipliers 271, 272, 273 and 274 and provides a sum of the multiplier outputs. Furthermore, the off-grid estimator 1600 has a mapper 33, which receives the output of the adder 275, a lookup table memory 35 associated with the mapper 33. The lookup table memory 35, which stores data representing the inverse of a sensitivity weighted combined response function of light-sensing elements having different ones of the plurality of sensitivity levels, is used by the mapper 33 to compensate the output of the adder 275 for each off-grid position received from the off-grid position generator 32 by the inverse of the combined response function to derive an estimated off-grid brightness value at the received off-grid position. The off-grid estimator 1600 also has an off-grid brightness value memory 36 for receiving the output of the mapper 33.

Referring again to FIG. 3, the sensitivity pattern memory 34 in FIG. 16 is physically implemented, for example, in the ROM 14 and stores the predetermined spatially varying sensitivity pattern of the CCD image sensor 9 in the form of a respective sensitivity level for each one of the pixel positions. The lookup table memory 35 in FIG. 16 is also physically implemented, for example, in the ROM 14 and stores a lookup table for compensating the output of the adder 275 at each one of the off-grid positions by the inverse of a sensitivity weighted combined response function of the light-sensing elements of the image sensor. The off-grid brightness value memory 36 in FIG. 16 is physically implemented, for example, in the frame memory 12 and stores estimated off-grid brightness values at respective off-grid positions as provided by the mapper 33 in FIG. 16.

Turning back to FIG. 16, the captured image memory 20 stores captured image brightness values at respective pixel positions defined in accordance with the diagram of FIG. 15. The brightness value at each pixel position is produced, for example; by a corresponding light-sensing element of the CCD image sensor 9 of the block diagram of FIG. 3. Because each light-sensing element has one of the four sensitivity levels and produces a brightness value at a corresponding pixel position, each pixel position can be considered as having a corresponding sensitivity level. Each one of the resamplers 28, 29, 30 and 31 receives an off-grid position from the off-grid position generator 32 and sensitivity pattern data from the sensitivity pattern memory 34, and derives a sensitivity level off-grid brightness value for its corresponding sensitivity level at the received off-grid position by resampling the captured image brightness values in the captured image memory 20 at pixel positions corresponding to that sensitivity level. The details of the resampling computation are described hereinbelow. After each one of the resamplers 28, 29, 30 and 31 derives a respective sensitivity level off-grid brightness value for its corresponding sensitivity level at an off-grid position received from the off-grid position generator 32, each one of the derived sensitivity level off-grid brightness values is multiplied by a respective one of weighting factors $W_1$, $W_2$, $W_3$, or $W_4$ corresponding to the same sensitivity level as the deriving resampler in one of the multipliers 271, 272, 273 and 274. The sensitivity level off-grid brightness values derived by the four resamplers 28, 29, 30 and 31 at the off-grid position received from off-grid position generator 32 after scaling by respective weighting factors $W_1$, $W_2$, $W_3$, or $W_4$ are then accumulated by the adder 275 to derive a weighted sum sensitivity level off-grid brightness value at the received off-grid position, which is provided to the mapper 33. The mapper 33 rounds off the weighted sum sensitivity level off-grid brightness value from the adder 275 to obtain an integer index for the lookup table memory 35. A combined response function compensated brightness value corresponding to the index is retrieved by the mapper 33 from the lookup table memory 35 and provided to the off-grid brightness value memory 36 as the estimated off-grid brightness value at the off-grid position received from the off-grid generator 32. Since the off-grid position generator 32 sequentially generates off-grid positions from (1,1) to (xSize−1, ySize−1), an off-grid brightness value pattern with dimensions xSize−1 and ySize−1 is generated and stored in the off-grid brightness value memory 36.

Figure 17:
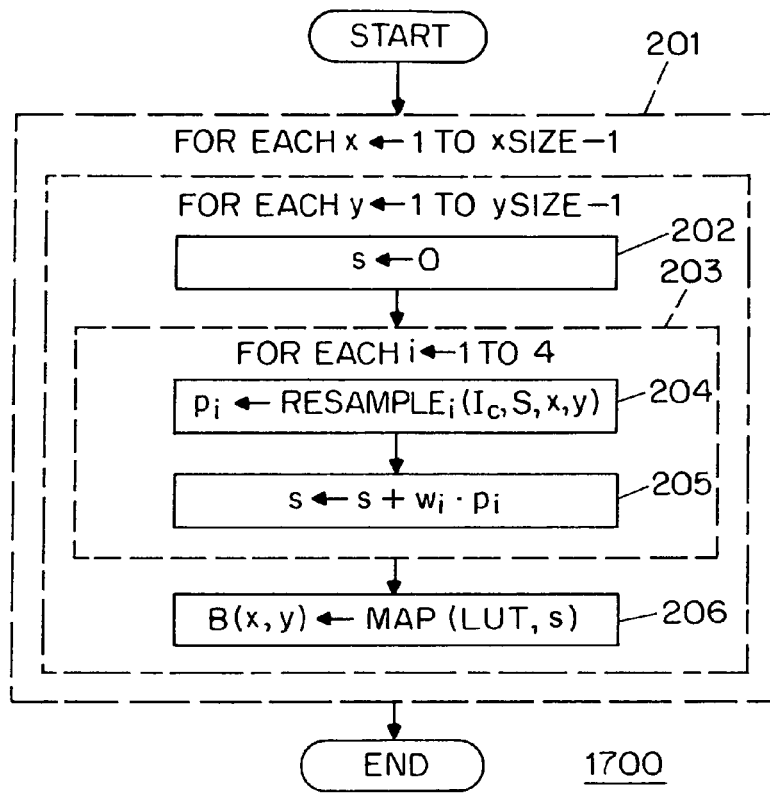
FIG. 17 is a flow diagram describing a computation process that may be carried out by the embodiment of the off-grid estimator of FIG. 16.

Referring to FIG. 17, there is shown a flow diagram of the computation process that may be carried out by the off-grid estimator 1600 of FIG. 16. First, loop 201 is repeated for each off-grid position (x, y) provided by the off-grid position generator 32 of FIG. 16 from (1, 1) to (xSize−1, ySize−1), where x and y are the coordinates of the off-grid position and xSize and ySize are the dimensions of the captured image in the x and y directions, respectively. In the loop 201, steps 202, loop 203 and step 206 are carried out. In step 202 a value s is initialized to 0. In loop 203 steps 204 and 205 are repeated for each i-th sensitivity level. In the present embodiment, the number of sensitivity levels is 4, and, therefore, loop 203 is repeated four times. In step 204, a sensitivity level off-grid brightness value $p_i$ for the i-th sensitivity level at off-grid position (x,y) is computed from the captured image brightness values at respective pixel positions stored in the captured image memory 20 of FIG. 16 by using a resampling function Resample$_i$(I$_c$, S,x,y), where S represents the sensitivity pattern data from the sensitivity pattern memory 34 in the diagram of FIG. 16. The details of the resampling function are described hereinbelow. In step 205, the computed sensitivity level off-grid brightness value for the i-th sensitivity level $p_i$ is multiplied by a predetermined weighting factor $W_i$ corresponding to the i-th sensitivity level, and the product is added to the value s. After loop 203 is repeated for each sensitivity level, step 206 is performed. In step 206 estimated off-grid brightness value B at off-grid position (x,y) is computed by the function Map (LUT,s) using the mapper 33 and the lookup table memory 35 in the diagram of FIG. 16. The details of this function are described hereinbelow. After step 206 is finished, the current repetition of loop 201 is completed. After loop 201 is repeated for each off-grid position received from the off-grid position generator 32 in FIG. 16, the computation process represented by the flow chart 1700 terminates.

Figure 18:
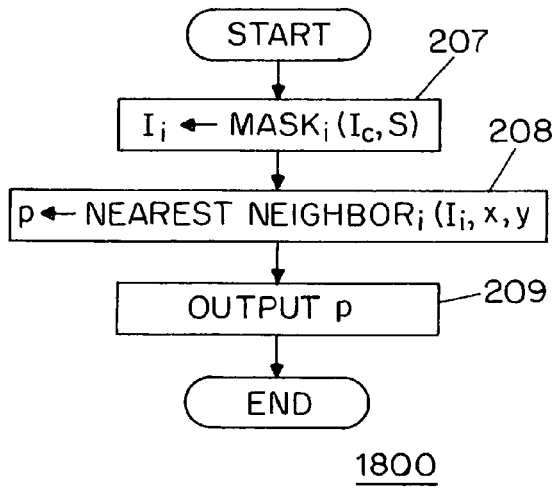
FIG. 18 is a flow diagram describing the computation process for evaluating the Resample$_i$ (I$_c$,S,x,y) function used in the computation process described by the flow diagram of FIG. 17.

Turning to FIG. 18, there is shown a flow diagram 1800 describing the computation of the function Resample$_i$(I$_c$, S,x, y) used in the computation process described by the flow diagram 1700 of FIG. 17. The computation described by the flow diagram 1800 is performed by the i-th resampler in FIG. 16 corresponding to the i-th sensitivity level. In step 207 an image I$_i$ having brightness values only at pixel positions corresponding to the i-th sensitivity level is generated by masking the captured image I$_G$ in accordance with the sensitivity pattern data S. In step 208 an off-grid brightness value p at a pixel position of the masked image I$_i$ which is nearest to the off-grid position (x,y) is determined. Finally, in step 209, the brightness value p is provided as the sensitivity level off-grid brightness value for the i-th sensitivity level at off-grid position (x, y), and the computation process represented by flow diagram 1800 terminates.

Figure 19:
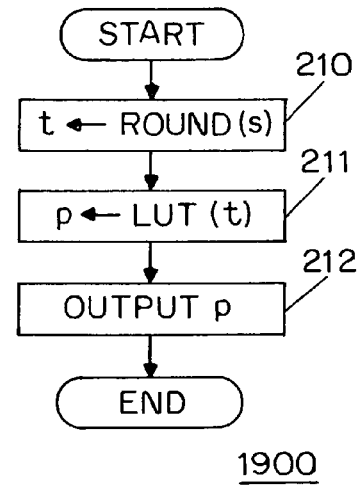
FIG. 19 is a flow diagram of the computation process for evaluating the Map (LUT,s) function used in the computation process described by the flow diagram of FIG. 17.

Turning now to FIG. 19, there is shown a flow diagram 1900 for the computation of the function Map(LUT,s) used in the computation process described by flow diagram 1700 of FIG. 17. The computation of flow diagram 1900 is performed by the mapper 33 and associated lookup table memory 35 in the diagram of FIG. 16. The computation consists of a sequence of steps 210, 211 and 212. In step 210 an integer value index t is computed by rounding off s, as computed in loop 203 of the flow diagram 1700 of FIG. 17. In step 211 a value p is retrieved from the lookup table memory 35 in FIG. 16 using the index t. In step 212, the value p corresponding to index t in the lookup table memory 35 is provided as the output, and the process represented by the flow diagram 1900 terminates. The lookup table data which is used to map the index t to the value p is prepared in advance and stored in the lookup table memory 35 in FIG. 16. As indicated above, the lookup table memory 35 is implemented, for example, in the ROM 14 in FIG. 3.

Figure 20:
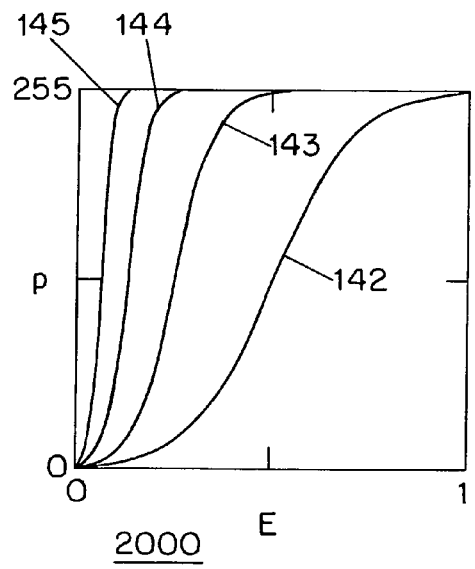
FIG. 20 graphically illustrates examples of radiometric response functions of four light-sensing elements having four different sensitivity levels.

Referring to FIG. 20, there is shown a graph 2000 of exemplary normalized radiometric response functions of light-sensing elements with different ones of the four sensitivity levels. The quantity E represents the radiation intensity incident on the light-sensing element normalized by the maximum radiation intensity that can be sensed by the light-sensing element in order to create the graph 2000 of FIG. 20. The quantity p represents the brightness value at the pixel position corresponding to the light-sensing element. Since the present embodiment has four sensitivity levels, there are four response functions $p_1(E)$ 142, $p_2(E)$ 143, $p_3(E)$ 144 and $p_4(E)$ 145. Since all four response functions are monotonic, a linear combination of these functions s(E) with positive weighting factors is also monotonic. The sensitivity weighted combined response function of the light-sensing elements having the four sensitivity levels s(E) may be expressed as $$s(E)=W_1p_1(E)+W_2p_2(E)+W_3P_3(E)+W_4p_4(E). \quad (1)$$

The combining represented by equation (1) brings about a high dynamic range for sensing the radiation intensity E because the response functions at four sensitivity levels are combined. For example, $p_1(E)$ has sensitivity to a bright range of E and $p_4(E)$ has sensitivity to a dark range of E, while $p_2(E)$ and $p_3(E)$ cover the mid range of E. The combining of equation (1) also results in an increase in the number of grey scale levels. If each of the response functions $p_1(E)$, $p_2(E)$, $p_3(E)$ and $p_4(E)$ has a grey scale of 256 levels, s(E) has a grey scale equivalent to 1021 levels.

Figure 21:
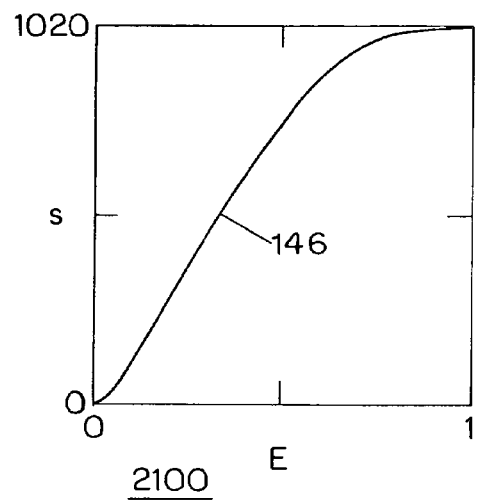
FIG. 21 graphically illustrates an exemplary combined radiometric response function of the light-sensing elements derived by computing the weighted sum of the exemplary radiometric response functions of light-sensing elements having four different sensitivity levels depicted in FIG. 20.
Figure 22:
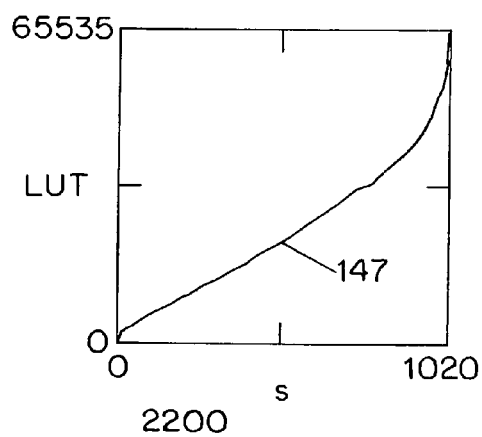
FIG. 22 graphically illustrates lookup table data derived from the inverse of the combined radiometric response function of FIG. 21.
Figure 23:
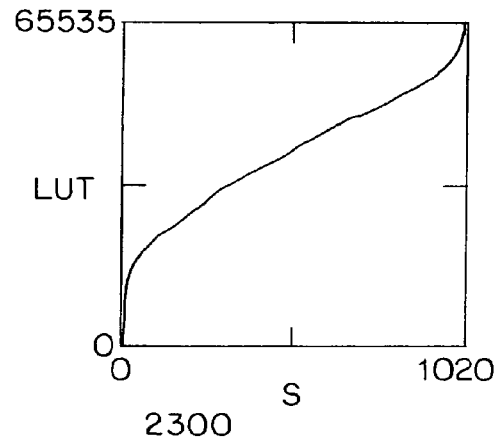
FIG. 23 graphically illustrates lookup table data for an inverse of a combined radiometric response function in which gamma characteristics are included.

Turning to FIG. 21, there is shown a graph 2100 of an exemplary combined response function s(E). To store lookup table data for the combined response function s(E), the inverse of s(E), which is shown as curve 147 in the graph 2200 of FIG. 22, can be used because the inverse of a monotonic function is also monotonic. If the inverse of s(E) is generated as a continuous function, a lookup table having any number of levels can be digitized and stored. For example, a lookup table derived from the graph of FIG. 22 has 65,536 levels. Moreover, data representing any kind of response function can be stored in a lookup table. For example, FIG. 23 shows a graph 2300 of the inverse of a response function in which a gamma characteristic is included. Inclusion of the gamma characteristic may be necessary to provide a standardized video signal output.

It will be apparent to those skilled in the art that the nearest neighbor sampling function carried out by the resamplers 28, 29, 30 and 31 of FIG. 16 may be substituted with other well known sampling functions, such as bi-linear and bi-cubic sampling with interpolation. The weighting factors $W_1$, $W_2$, $W_3$ and $W_4$ can each be any positive value. In most instances, each of the weighting factors can be set to 1/N, where N is the number of sensitivity levels. In the embodiment of the off-grid estimator shown in FIG. 16, if the weighting factors $W_1$, $W_2$, $W_3$ and $W_4$ are all equal, the weighting factor memories 24, 25, 26 and 27, and the multipliers 271, 272, 273 and 274 may be eliminated, in which case the outputs of the resamplers 28, 29, 30 and 31 are provided directly to the adder 275. It is noted that the weighting factors may be selected to obtain a desired shape for the combined response function s(E) defined by equation (1) for purposes of creating the lookup table data stored in the lookup table memory 35 in the diagram of FIG. 4. The lookup table data is derived by digitizing the inverse of the function s(E) as shown in the graph of FIG. 22. To minimize the digitizing error, the inverse of the function s(E) is digitized as uniformly as possible. Where the shape of the inverse of the function s(E) is not well suited for uniform digitization, the shape may be changed by changing the weighting factors.

Figure 24:
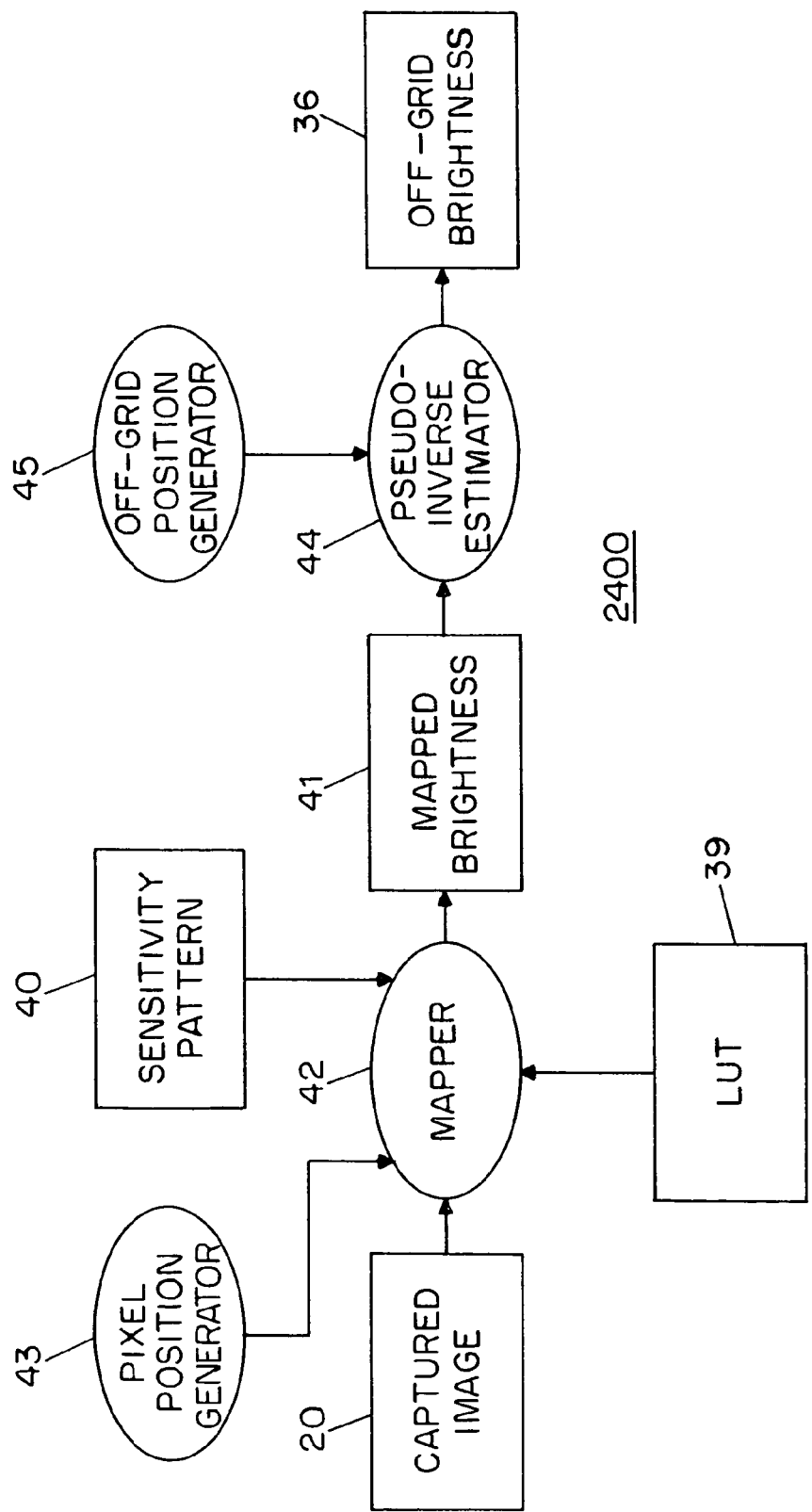
FIG. 24 is a data flow diagram of the off-grid estimator of the diagram of FIG. 2 according to yet another exemplary embodiment of the present invention.

Turning now to FIG. 24, there is shown a data flow diagram 2400 of the off-grid estimator 22 of the diagram of FIG. 2 according to another exemplary embodiment of the present invention. The off-grid estimator of FIG. 24 includes a pixel position generator 43 for sequentially generating pixel positions from (0.5,0.5) to (xSize, ySize), a sensitivity pattern memory 40 for storing a sensitivity level corresponding to each pixel position, a mapper 42 and associated lookup table memory 39 for storing separate lookup table data representing the inverse of the response functions of light-sensing elements having different ones of the sensitivity levels, a mapped pixel position brightness value memory 41 for storing the brightness value at respective pixel positions after compensation of each pixel position brightness value by the inverse of the response function of a light-sensing element having a sensitivity level corresponding to the pixel position, an off-grid position generator 45 for sequentially generating off-grid positions from (1,1) to (xSize−1, ySize−1), a pseudo-inverse estimator for computing from the compensated pixel position brightness values stored in the mapped pixel position brightness value memory 41 an estimated off-grid brightness value at each off-grid position received from the off-grid position generator 45, and an off-grid brightness value memory 36 for storing estimated off-grid brightness values at respective off-grid positions computed by the pseudoinverse estimator 44.

With reference to the block diagram of FIG. 3, the lookup table memory 39 and the sensitivity pattern memory 40 are both physically implemented, for example, in the ROM 14, and the mapped pixel position brightness value memory 41 is physically implemented, for example, in the RAM 15.

Turning back to FIG. 24, the mapper 42 receives from the captured image memory 20 a captured image brightness value at a pixel position received from the pixel position generator 43, and the mapper 42 applies to the captured image brightness value lookup table data stored in the lookup table memory 39 for the sensitivity level corresponding to the received pixel position, as obtained from the sensitivity pattern memory 40, and derives a mapped brightness value at the received pixel position for storage in the mapped pixel position brightness value memory 41. The mapped brightness value is the captured image brightness value compensated by the inverse of the response function of a light-sensing element having the sensitivity of level corresponding to the received pixel position. Then the pseudoinverse estimator 44 computes a brightness value at a off-grid position provided by the off-grid position generator 45 using the mapped brightness values in the mapped pixel position brightness value memory 41. The computed off-grid brightness value at the off-grid position is then stored in an off-grid brightness value storage 36.

Figure 25:
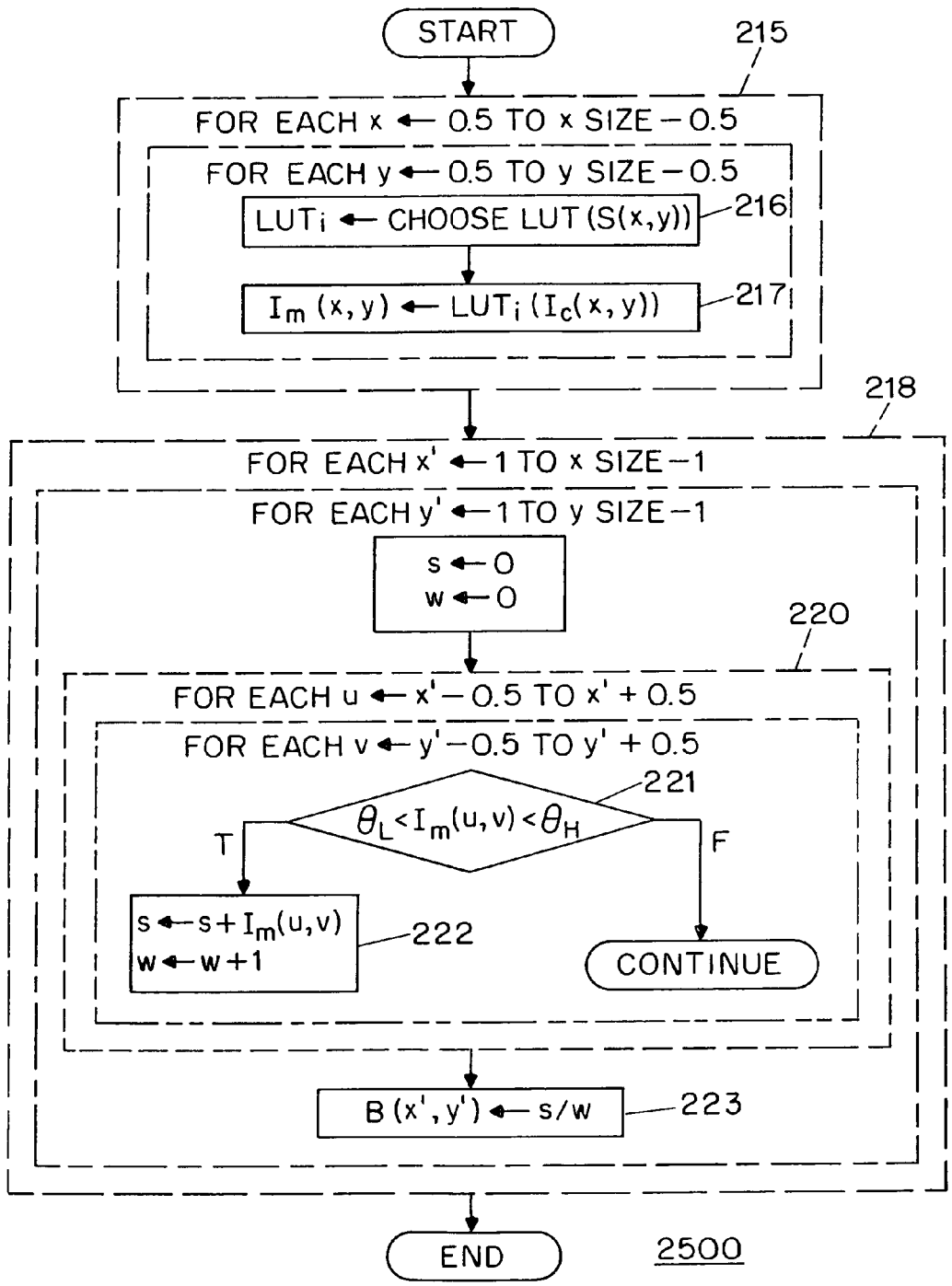
FIG. 25 is a flow diagram describing a computation process that may be carried out by the embodiment of the off-grid estimator represented by the data flow diagram of FIG. 24.

Referring to FIG. 25, there is shown a flow diagram 2500 for a computation process that may be carried out by the off-grid estimator 2400 of the diagram of FIG. 24. First, loop 215 is repeated for each pixel position (x,y) of the captured image from (0.5,0.5) to (xSize−0.5, ySize−0.5), as received from the pixel position generator 43 in FIG. 24. In loop 215 steps 216 and 217 are performed. In step 216, lookup table data $LUT_i$ for the i-th sensitivity level is chosen by referring to the sensitivity level i corresponding to received pixel position (x,y). The sensitivity level corresponding to received pixel position (x,y) is obtained from the sensitivity pattern data S(x,y) stored in the sensitivity pattern memory 40 of FIG. 24. In step 217, the lookup table data $LUT_i$ is applied to a captured image brightness value $I_c(x,y)$ at received pixel position (x,y) from the captured image memory 20. The brightness value compensated by the inverse of the response function of a light-sensing element having sensitivity level i derived from the lookup table data $LUT_i$ is referred to as the mapped brightness value, $I_m(x,y)$, at received pixel position (x,y). After loop 215 is repeated for every pixel position as received from the pixel position generator 43 in FIG. 24, loop 218 is repeated for each off-grid position (x',y') from (1,1) to (xSize−1, ySize−1), as received from the off-grid position generator 45 in FIG. 24. In loop 218, step 219, loop 220 and step 223 are carried out. In step 219 a value s and a value w are each initialized to 0. After step 219, loop 220 is repeated for four pixel positions (u,v) which are the four nearest neighbor pixel positions to the received off-grid position (x',y'). In loop 220, steps 221 and 222 are performed. In step 221a mapped brightness value $I_m(u,v)$ at pixel position (u,v), is compared with a low threshold value $\theta_L$ and a high threshold value $\theta_H$. If $I_m(u,v)$ is greater than $\theta_L$ and less than $\theta_H$, step 222 is performed. Otherwise, step 222 is skipped and the process moves to the next repetition of loop 218. The threshold values $\theta_L$ and $\theta_H$ are predetermined constant values, which generally represent the mapped noise level of a light-sensing element having the sensitivity level corresponding to pixel position (u,v), and the saturation or near saturation brightness value of a light-sensing element having the same sensitivity level, respectively. In step 222 a mapped brightness value $I_m(u,v)$, which is greater than $\theta_L$ and less than $\theta_H$, is added to s and 1 is added to w. After loop 220 is repeated for each nearest neighbor pixel position, step 223 is performed. In step 223, the brightness value B(x',y') at received off-grid position (x', y') is computed by dividing the value s by the value w. After loop 218 is repeated for each off-grid position received from the off-grid position generator 45 in FIG. 24, the computation process represented by the flow diagram 2500 terminates.

Figure 26:
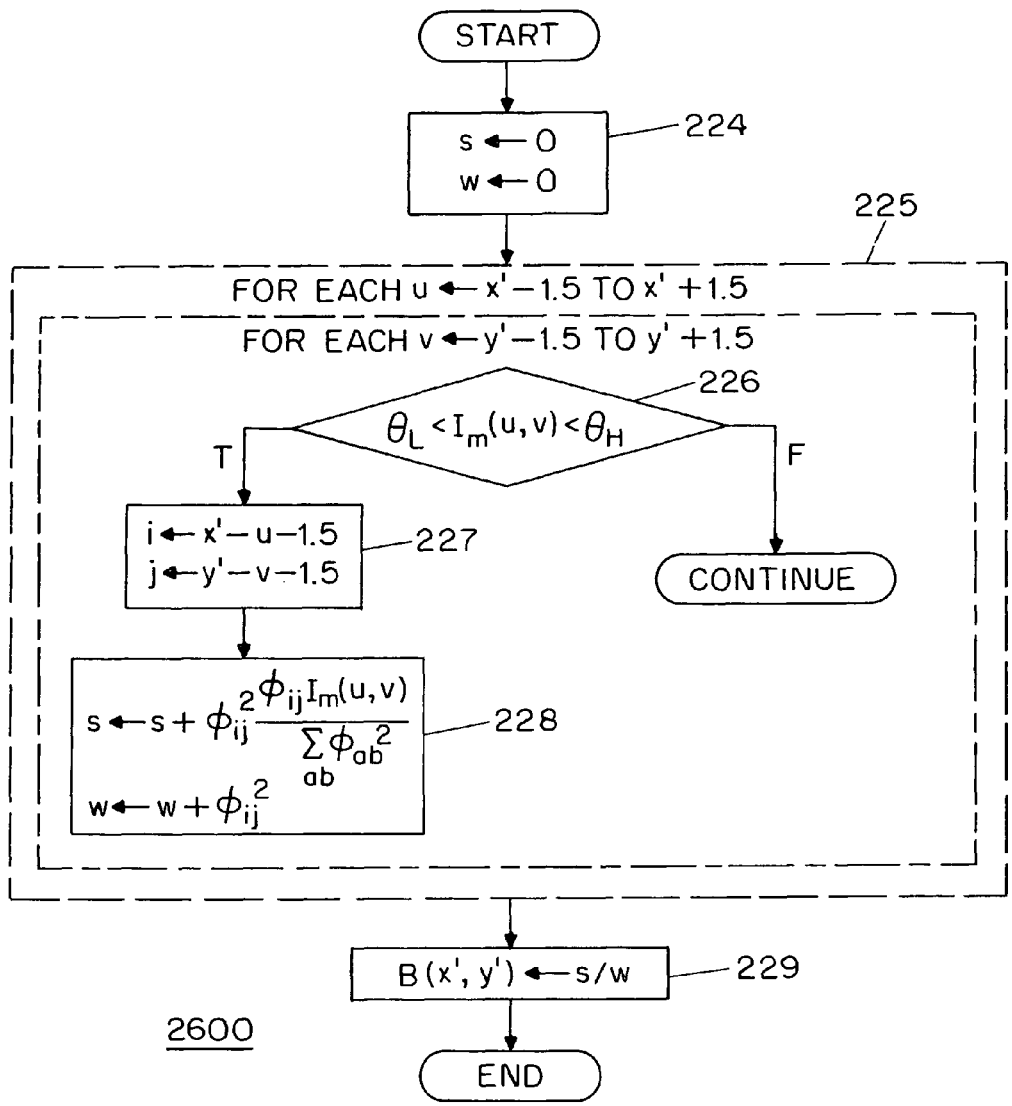
FIG. 26 is a flow diagram describing an alternative computation process that may be carried out by the embodiment of the off-grid estimator represented by the data flow diagram of FIG. 24.
Figures 27, 28:
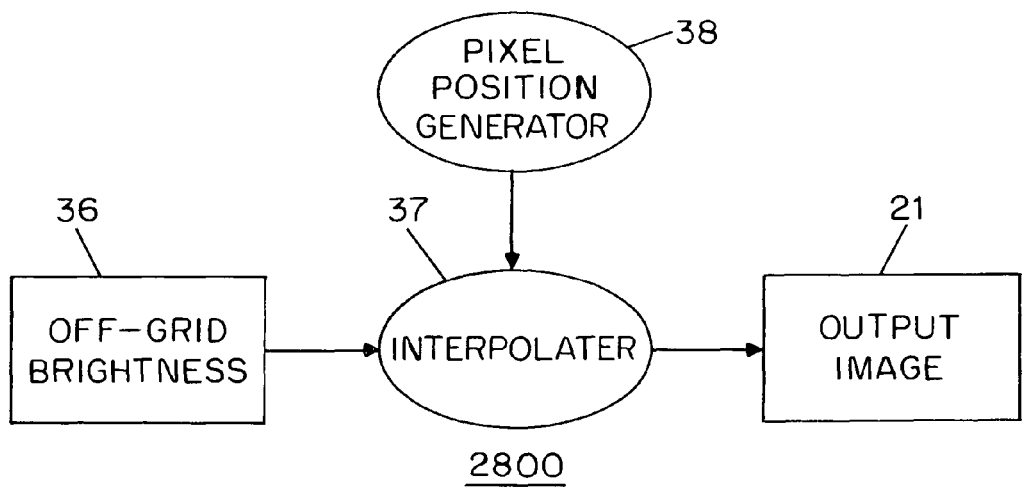
FIG. 27 shows an example of a 4×4 cubic interpolation filter kernel.
FIG. 28 is a data flow diagram of the on-grid resampler of the data flow diagram of FIG. 2 according to still another exemplary embodiment of the present invention.

Referring to FIG. 26, there is shown a flow diagram 2600 of an alternative computation process which may be carried out by the pseudoinverse estimator 44 of the diagram of FIG. 24. The flow diagram 2600 of FIG. 26, which implements a 4×4 cubic pseudoinverse computation, can replace the portion of the flow diagram 2500 of FIG. 25 that includes step 219, loop 220 and step 223. Referring to the flow diagram 2600 of FIG. 26, in step 224 a value s and a value w are each initialized to 0. Then loop 225 is repeated for sixteen pixel positions (u,v) which are the sixteen nearest neighbor pixel positions to an off-grid position (x',y') received from the off-grid position generator 45 in FIG. 24. In loop 225, steps 226, 227 and 228 are performed. In step 226, a mapped brightness value $I_m(u,v)$ at nearest neighbor pixel position (u,v) is compared with a low threshold value $\theta_L$ and with a high threshold value $\theta_F$. If $I_m(u,v)$ is greater than $\theta_L$ and less than $\theta_H$, step 227 is performed. Otherwise, steps 227 and 228 are skipped and the process moves to the next iteration of the loop 225. The threshold values $\theta_L$ and $\theta_H$ are predetermined constant values, generally representing the mapped noise level of a light-sensing element having the sensitivity level corresponding to pixel position (u,v), and the saturation or near saturation brightness value of a light-sensing element having the same sensitivity level, respectively. In step 227 index values i and j are computed from the received off-grid position (x',y') and the nearest neighbor pixel position (u,v), where i and j are used to refer to values of a cubic interpolation kernel which is shown in FIG. 27. In step 228 s and w are each updated in accordance with the equations shown in the block representing step 228. After loop 225 is repeated for each of the sixteen nearest neighbor pixel positions, step 229 is performed. In step 229, a brightness value B at received off-grid position (x',y') is computed as the value s divided by the value w. The computation process represented by flow diagram 2600 is repeated for all off-grid positions received from the off-grid position generator 45 in FIG. 24 from x'+1 to xSize−1 and y'+11 to ySize−1.

Figure 29:
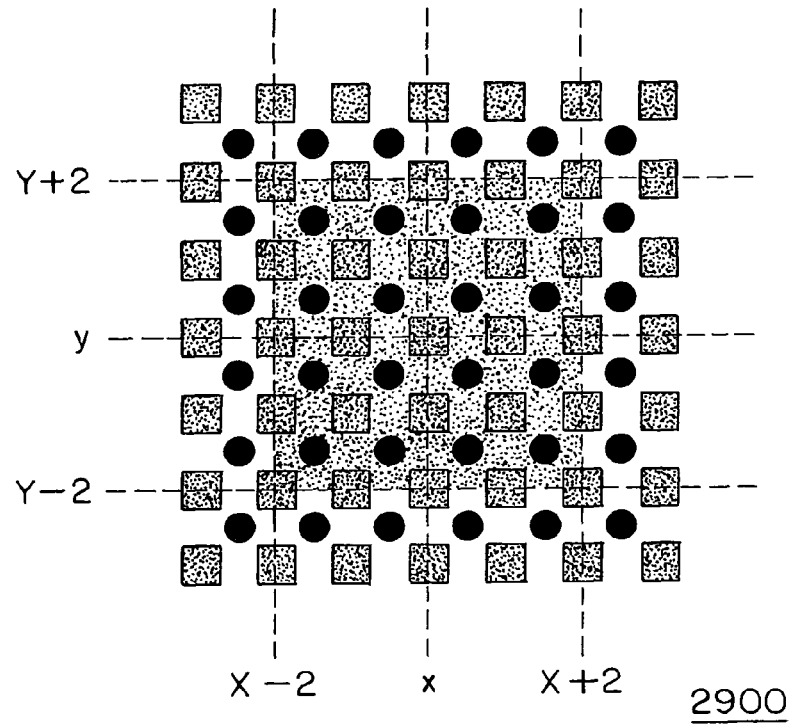
FIG. 29 is a diagram of pixel positions and off-grid positions for explaining on-grid resampling using a 4×4 cubic interpolation filter.

Turning to FIG. 28, there is shown a data flow diagram 2800 of the on-grid resampler 23 in the diagram of FIG. 2 according to an exemplary embodiment of the present invention. The on-grid resampler 2800 includes a pixel position generator 38 for sequentially providing pixel positions from (2.5,2.5) to (xSize−2.5, ySize−2.5), and an interpolator 37 which carries out a cubic interpolation operation that computes an interpolated on-grid brightness value at a pixel position received from the pixel position generator 38 from the estimated off-grid brightness values at 4×4 off-grid positions that are nearest neighbors to the pixel position received from the pixel position generator 38. This is illustrated in FIG. 29 which shows a diagram 2900 of a local area of pixel positions, which are represented as rectangles, and off-grid positions, which are represented by black circles. When the brightness value at a received pixel position (x,y) is computed, the 4×4 cubic interpolation kernel is multiplied by 4×4 off-grid brightness values within the local area from (x−2,y−2) to (x+2,y+2), which is shown as the shaded rectangle in the diagram of FIG. 29. An example of a 4×4 cubic interpolation kernel 2700 is shown in FIG. 27. The pixel position generator 38 in FIG. 28 sequentially generates pixel positions from (2.5, 2.5) to (xSize−2.5, ySize−2.5) and provides the pixel positions to the interpolator 37. In this manner, resampled brightness values for an image having dimensions of (xSize−4, ySize−4) are generated and stored in the output image memory 21 in FIG. 28.

Figure 30:
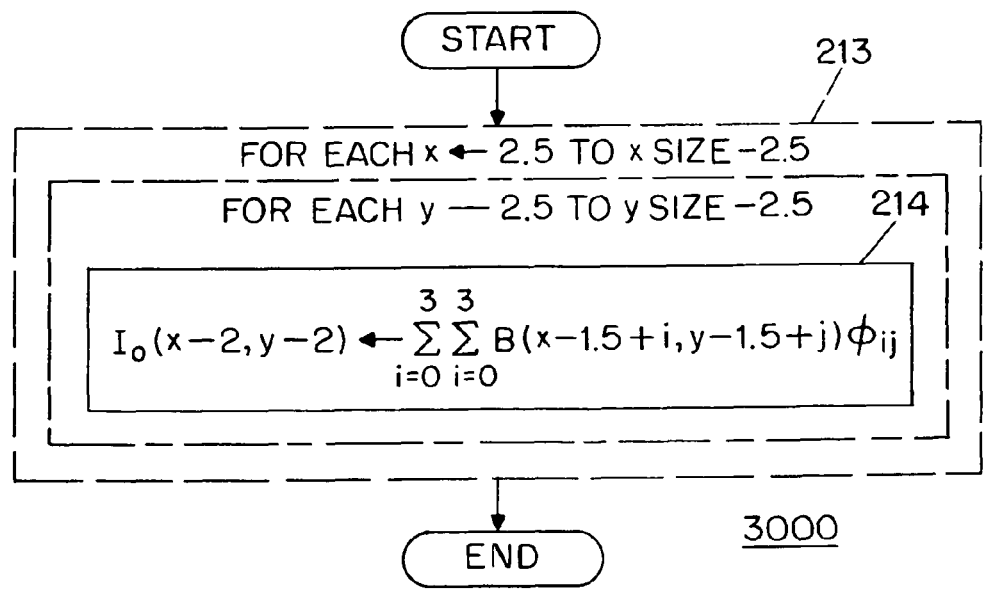
FIG. 30 is a flow diagram describing a computation process that may be carried out by the embodiment of the on-grid resampler represented by the data flow diagram of FIG. 28.
Figure 31:
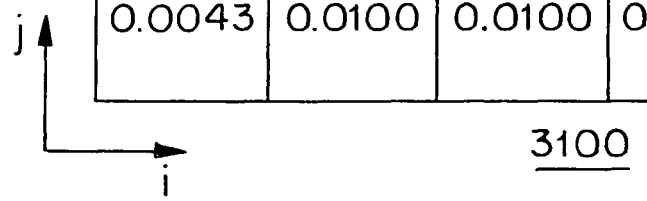
FIG. 31 shows an example of a bi-cubic B-spline interpolation filter kernel.
Figure 32:
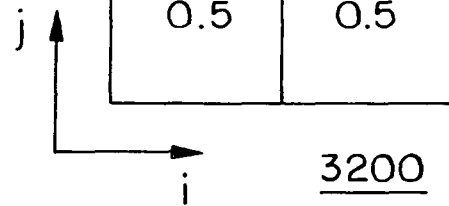
FIG. 32 shows an example of a bi-linear interpolation filter kernel.

Referring to FIG. 30, there is shown a flow diagram 3000 describing computation process that may be performed by the interpolator 37 in FIG. 28. The computation process comprises loop 213, which includes step 214. Loop 213 is repeated for each pixel position (x, y) of the output image from (2.5, 2.5) to (xSize−2.5, ySize−2.5), as received from the pixel position generator 38 in FIG. 28, where x and y are the coordinates of the pixel position and xSize and ySize are the dimensions of the captured image in the x and y directions, respectively. In step 214 a brightness value of the output image $T_o(x-2, y-2)$ at pixel position (x−2, y−2) is derived by computing the product of the brightness values at 4×4 nearest neighbor off-grid positions to the received pixel position at (x,y), and a 4×4 cubic interpolation kernel $\phi$, as shown by the equation in the block representing step 214 in the flow diagram 3000. The computed value is stored as the brightness value at the corresponding pixel position of the output image $I_o(x-2,y-2)$ in the output image memory 21 of the diagram in FIG. 28. After loop 213 is repeated for each pixel position received from the pixel position generator 38 in FIG. 28, the computational process represented by the flow diagram 3000 terminates.

While the interpolator 37 of the diagram in FIG. 28 is described as performing a cubic interpolation, it is to be understood that any interpolation process which computes an interpolated value from two dimensional uniform grid data may be substituted for the cubic interpolation. For example, other cubic kernels, Gaussian kernels, bi-linear interpolation or larger interpolation kernels can be used. Furthermore, shifting the pixel positions to coincide with the off-grid positions and taking the brightness values at the off-grid positions as the brightness values at respective coincident pixel positions can be used to derive resampled brightness values at the pixel positions. Examples of bi-cubic B-spline 3100, bi-linear 3200, 6×6 two dimensional Gaussian 3300 and a simple shift filter kernel 3400 are shown in FIGS. 31, 32, 33 and 34, respectively. Each of these filter kernels may be substituted as $\phi_{ij}$ in the flow diagram 3000 of FIG. 30. It is noted that the range of values for i and j in the flow diagram 3000 of FIG. 30 changes according to the size of the filter kernel. For example, when the 6×6 Gaussian filter 3300 of FIG. 33 is used, both i and j take on values from 0 to 5.

In the embodiments of the present invention described thus far, the light-sensing elements of the image sensor have four different sensitivity levels. It will be understood that the present invention may be readily applied to embodiments where the light-sensing elements of the image sensor have a different number of sensitivity levels with only minor alterations to the four sensitivity level embodiments described hereinabove. For example, the light-sensing elements of the image sensor may have only two sensitivity levels, in which case the modifications to the embodiments are now described.

Figure 35:
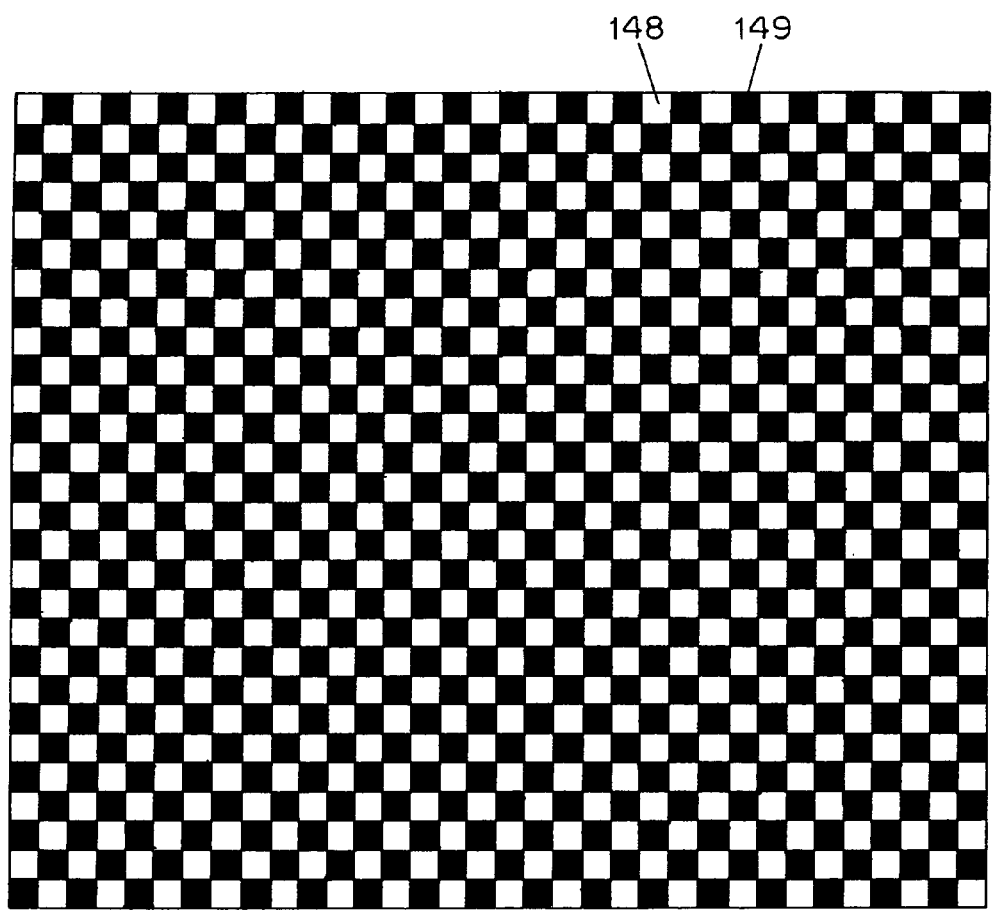
FIG. 35 depicts an illustrative mask having cells with two different transparencies for providing an image sensor with a spatially varying sensitivity pattern with two sensitivity levels.

In the image sensing part where the spatially varying sensitivity pattern is defined by a mask, the mask will have cells with two different transparencies, namely a dark cell and a bright cell. For example, the mask may have a checkerboard pattern in which adjacent cells in a row and adjacent cells in a column will have different ones of the two transparencies. An example of such a mask 3500 is depicted in FIG. 35, in which bright cells are designated by reference numeral 148 and dark cells are designated by reference numeral 149.

Figure 45:
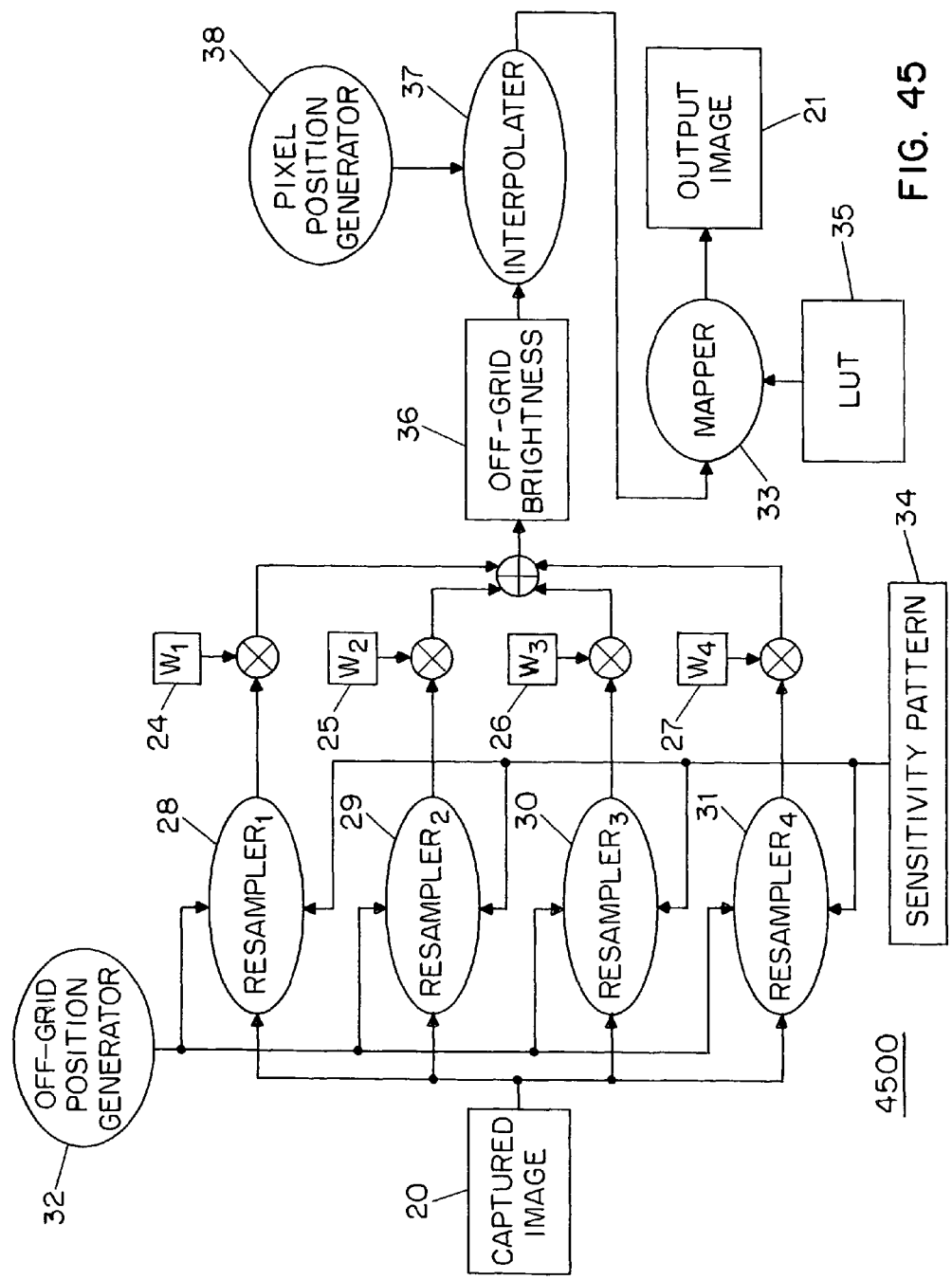
FIG. 45 is a detailed data flow diagram of yet further exemplary embodiment of the image processing part of the data flow diagram of FIG. 1 for four sensitivity levels.

In the image processing part, the off-grid position generators 32 in the diagram of FIGS. 16 and 45 in the diagram of FIG. 24 may generate the same off-grid positions as defined in FIG. 15 for the two sensitivity level case. However, alternative off-grid positions may be defined when there are only two sensitivity levels.

Figure 36:
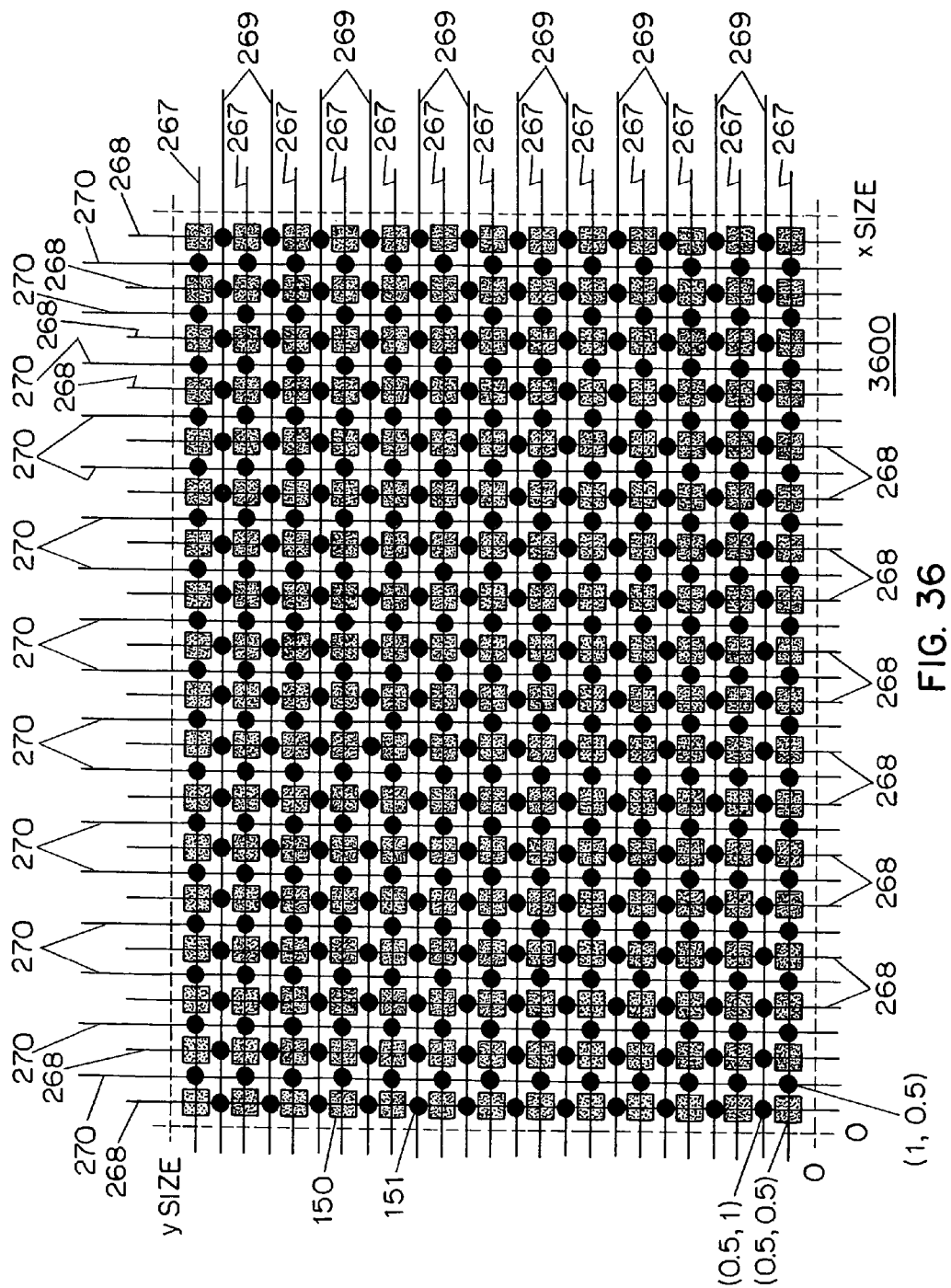
FIG. 36 is a diagram illustratively depicting pixel positions located at respective intersections of a plurality of regularly spaced pixel rows and a plurality of regularly spaced pixel columns orthogonal to the pixel rows, and off-grid positions located at respective intersections of the pixel rows and a plurality of regularly spaced intermediate columns and at respective intersections of the pixel columns and a plurality of regularly spaced intermediate rows.

Referring to FIG. 36, there is shown a diagram 3600 of an alternative off-grid position pattern for the two sensitivity level case. In FIG. 36, pixel positions are represented by squares 150 and off-grid positions are represented by black circles 151. Here the off grid positions 151 are again located at respective interstices of the pixel position array. However, the interstices in the diagram of FIG. 36 are located at respective intersections of the pixel rows 267 and the intermediate columns 270, and at respective intersections of the pixel columns 268 and the intermediate rows 269. As in the diagram of FIG. 15, the pixel rows 267 and the pixel columns 268 are regularly spaced and mutually orthogonal, and each intermediate row 269 is parallel to the pixel rows 267 and extends medially between a respective adjacent pair of pixel rows 267, while each intermediate column 270 is parallel to the pixel columns 268 and extends medially between a respective pair of pixel columns 268. It may be noted in the diagram of FIG. 36 that lines of adjacent off-grid positions are rotated by 45 degrees with respect to lines of adjacent pixel positions.

Figure 37:
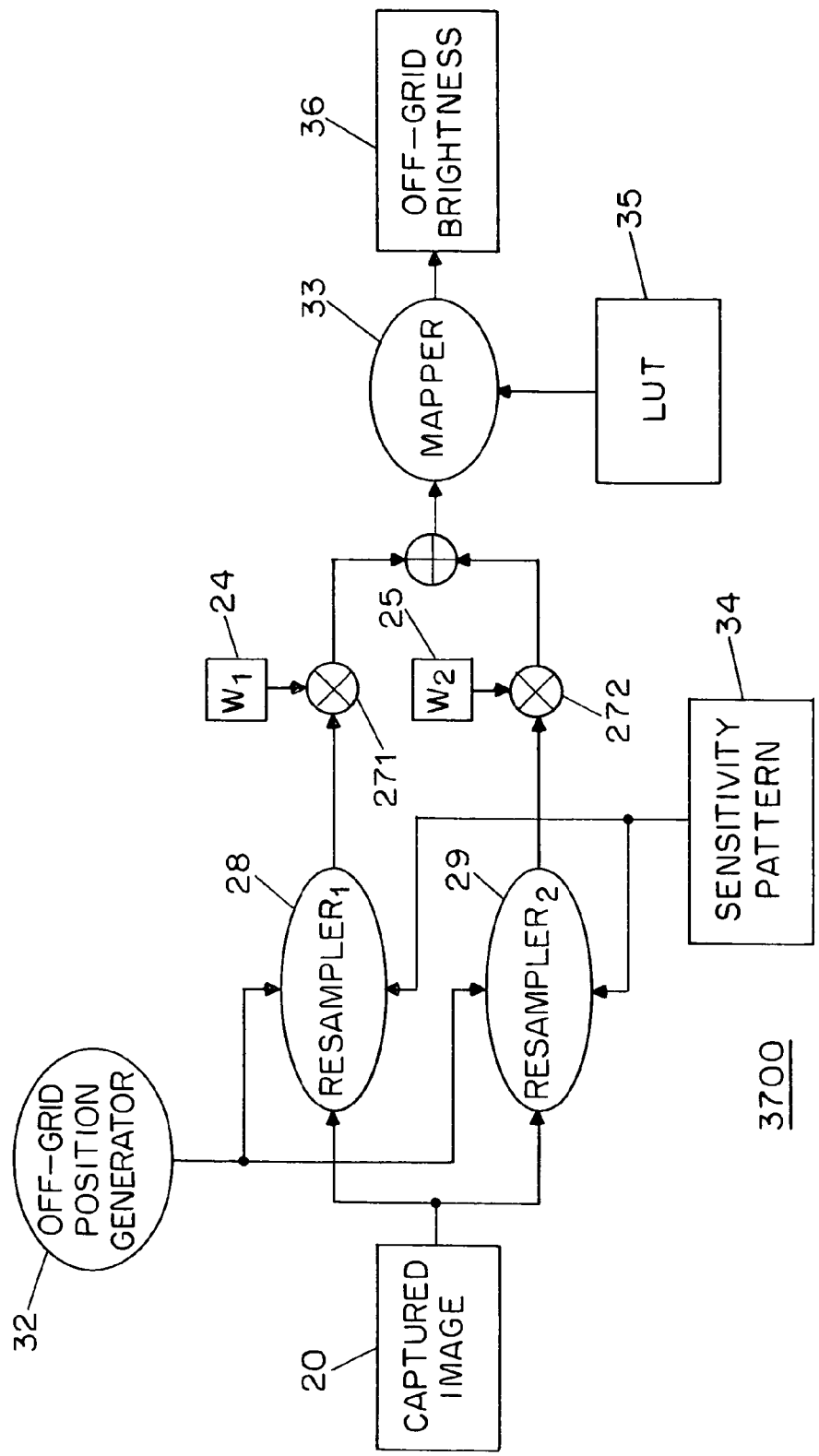
FIG. 37 is a data flow diagram of the off-grid estimator of the data flow diagram of FIG. 2 for an image sensor having two sensitivity levels in accordance with a further exemplary embodiment of the present invention.

Turning to FIG. 37, there is shown a data flow diagram 3700 of the embodiment of the off-grid estimator of FIG. 16 modified for two sensitivity levels. The differences from the four sensitivity level case are in the number of resamplers used, in the number of weighting factor memories and in the number of multipliers. The position generator 32 is modified to generate the off-grid positions defined in FIG. 36. The sensitivity pattern memory 34 stores a predetermined spatially varying sensitivity pattern specifying one of the two sensitivity levels corresponding to each pixel position.

Figure 38:
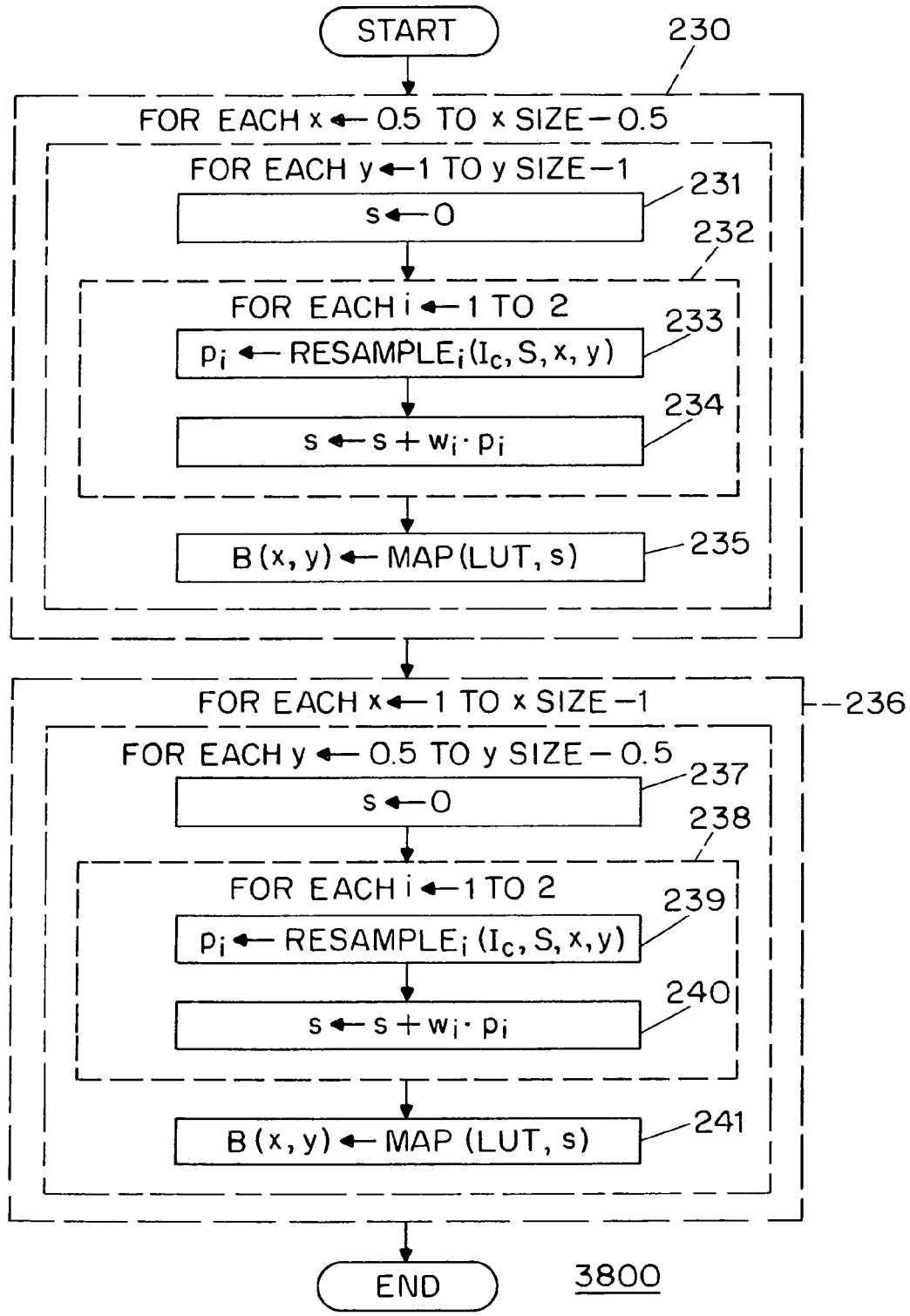
FIG. 38 is a flow diagram describing a computation process that may be carried out by the embodiment of the off-grid estimator for two sensitivity levels represented by the flow diagram of FIG. 37.

Referring to FIG. 38, there is shown a flow diagram 3800 of the computation process that may be performed by the off-grid estimator represented by the data flow diagram 3700 of FIG. 37. First, loop 230 is repeated for each off-grid position (x, y) from (0.5,1) to (xSize−0.5, ySize−1), where x and y are coordinates of the off-grid position and xSize and ySize are the dimensions of the captured image in the x direction and the y direction, respectively. With reference to the diagram 3600 of FIG. 36, the off-grid positions for which Loop 230 is repeated are located at respective intersections of the intermediate rows 269 and the pixel columns 268. In loop 230, step 231, loop 232 and step 235 are carried out. In step 231 a value s is initialized to 0. In loop 232, steps 233 and 234 are repeated for each i-th sensitivity level. In the present embodiment the number of sensitivity levels is two. In step 233 a sensitivity level off-grid brightness value $p_i$ for the i-th sensitivity level at an off-grid position (x,y) received from the off-grid position generator 32 in FIG. 37 is computed from the captured image brightness values at respective pixel positions of the captured image $I_c$ by the resampling function Resample$_i$($I_c$,S,x,y) of the i-th resampler, where S represents the sensitivity pattern data from the sensitivity pattern memory 34 in FIG. 37. The computation of this function is the same as in the four sensitivity level case. In step 234 the sensitivity level off-grid brightness value $p_i$ for the i-th sensitivity level is multiplied by a predetermined weighting factor $W_i$ for the same sensitivity level, and the product is added to s. After loop 232 is repeated for the two sensitivity levels, step 235 is performed. In step 235, brightness value B at the off-grid position (x,y) received from the off-grid position generator 32 in FIG. 37 is computed by applying the function Map(LUT,s) using the mapper 33 and associated lookup table memory 35 in FIG. 37. The application of this function is the same as in the four sensitivity level case. After step 235 is completed, the current repetition of loop 230 is completed. After loop 230 is repeated for all off-grid positions located at respective intersections of the intermediate rows 269 and the pixel columns 268, the computation process proceeds to loop 236. The computation process of loop 236 is identical to that of loop 230 except that loop 236 is repeated for each off-grid position received from this off-grid position generator 32 in FIG. 37 from (1,0.5) to (xSize−4,ySize−0.5). Referring again to the diagram 3600 of FIG. 36, the off-grid positions for which loop 236 is repeated are located at respective intersections of the pixel rows 267 and the intermediate columns 270. After loop 236 is repeated for all such off-grid positions, the computation process represented by the flow diagram 3800 terminates.

Figure 39:
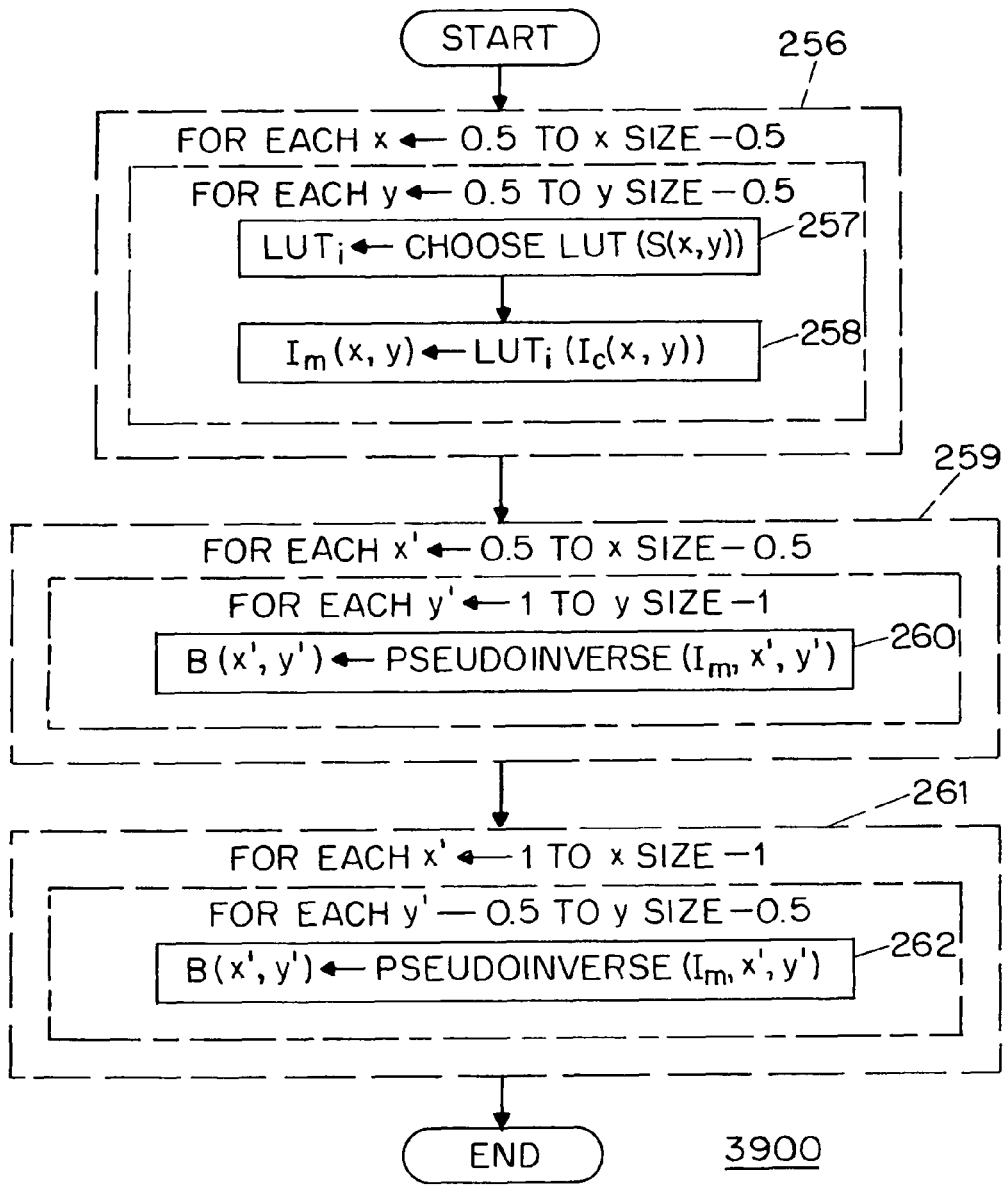
FIG. 39 is a flow diagram describing a computation process that may be carried out by the exemplary embodiment represented by the data flow diagram of FIG. 24 to provide an exemplary embodiment of a two sensitivity level off-grid estimator with a cubic pseudoinverse estimator according to the present invention.

The embodiment of the off-grid estimator represented by the data flow diagram 2400 in FIG. 24 is also readily modified for two sensitivity levels. Turning to FIG. 39, there is shown a flow diagram 3900 describing a computation process that may be carried out by the off-grid estimator represented by data flow diagram 2400 of FIG. 24 for the two sensitivity level case. The first loop 256 is repeated for each pixel position (x, y) of the captured image received from the pixel position generator 43 in FIG. 24 from (0.5, 0.5) to (xSize−0.5, ySize−0.5). In loop 256, steps 257 and 258 are performed. In step 257 lookup table data $LUT_i$ for the i-th sensitivity level is selected by referring to the sensitivity pattern data S(x, y) stored in the sensitivity pattern memory 40 for the sensitivity level corresponding to pixel position (x, y) received from the pixel position generator 43. In step 258 the lookup table data $LUT_i$ is applied to the captured image brightness value $I_c$(x, y) at received pixel position (x, y), and the resulting compensated brightness value at received pixel position (x, y) is designated the mapped brightness value $I_m$(x, y) at that pixel position. After loop 256 is repeated for all pixel positions of the captured image received from pixel position generator 43, the computation process proceeds to loop 259. Loop 259 is repeated for each off-grid position (x',y') from (0.5, 1) to (xSize−0.5, ySize−1) received from the off-grid position generator 45 in FIG. 24. With reference to the diagram 3600 in FIG. 36, the off-grid positions for which loop 259 is repeated are located at respective intersections of the intermediate rows 269 and the pixel columns 268. In loop 259, step 260 is carried out. In step 260 a function Pseudoinverse ($I_m$, x', y') is evaluated to obtain the brightness value B(x', y') at received off-grid position (x', y'). The details of evaluating the function Pseudoinverse ($I_m$, x', y') will be further explained hereinbelow. After loop 259 is repeated for each off-grid position located at respective intersections of the intermediate rows 269 and the pixel columns 268, as received from off-grid position generator 45, the computation process proceeds to loop 261, which is repeated for each off-grid position from (1, 0.5) to (xSize−1, ySize−0.5). With reference to diagram 3600 of FIG. 36, the off-grid positions for which loop 261 is repeated are located at respective intersections of the pixel rows 267 and the intermediate columns 270. Otherwise, the computation process of loop 261 is identical to that of loop 259. After loop 259 is repeated for each of the off-grid positions located at respective intersections of the pixel rows 267 and the intermediate columns 270, as received from off-grid position generator 45, the computation process represented by flow diagram 3900 terminates.

Figure 40:
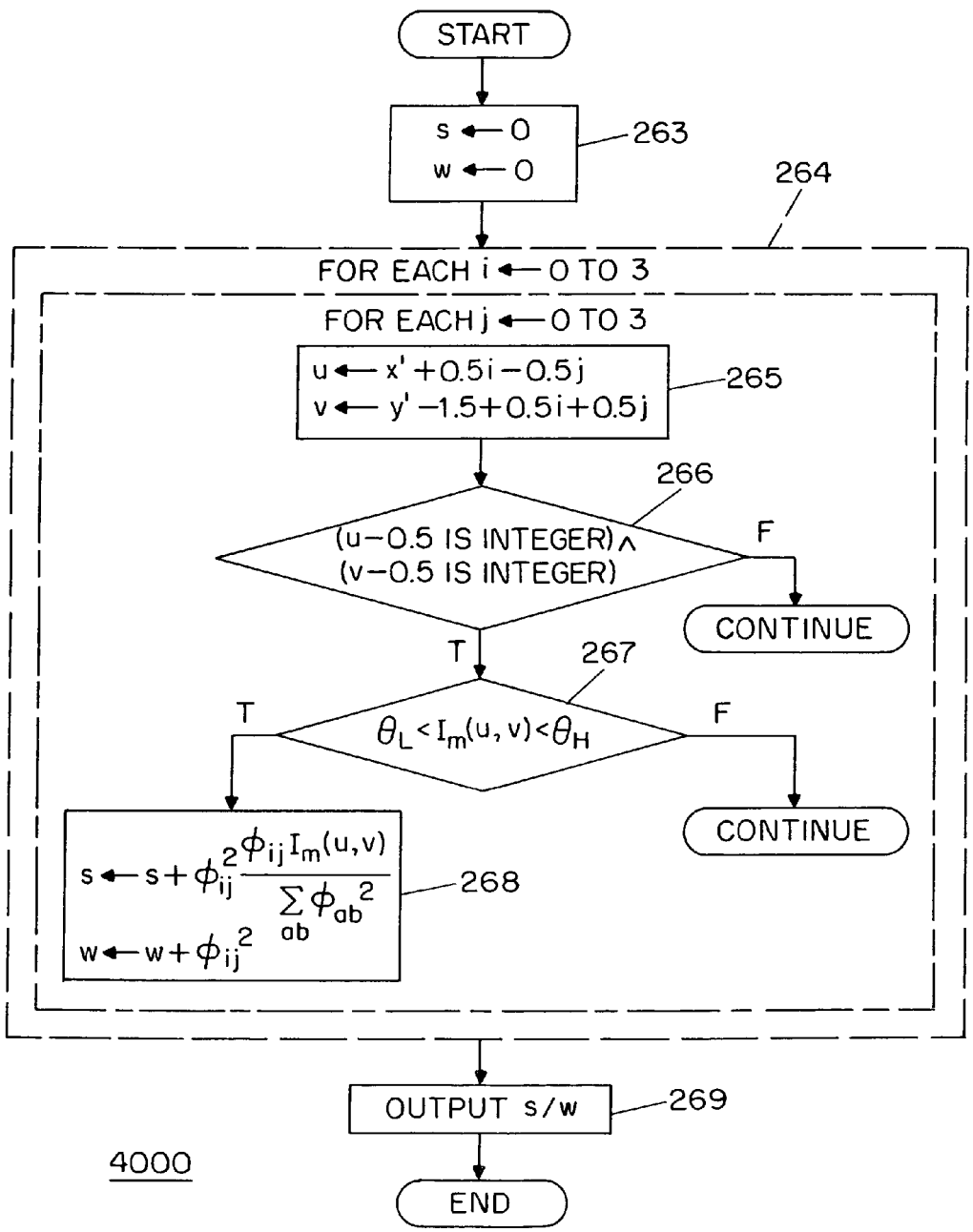
FIG. 40 is a flow diagram describing a computation process for evaluating the function Pseudoinverse (I$_m$,x',y') used in the computation process described in the flow diagram of FIG. 39.

Referring to FIG. 40, there is shown a flow diagram 4000 describing the computation process for the function Pseudoinverse ($I_m$, x', y'), which carries out a 4×4 rotated cubic pseudoinverse operation. First, in step 263 a value s and a value w are each initialized to 0. After step 263, loop 264 is repeated for 16 pixel positions (u, v) which are nearest neighbors to an off-grid position (x', y') received from the off-grid position generator 45 by incrementing indices i and j, which have values from 0 to 3, in each repetition of loop 264. In loop 264, steps 265, 266, 267 and 268 are carried out. In step 265, coordinates u and v are computed from the coordinates of the current received off-grid position (x', y') and indices i and j using the relations shown in the block representing step 265 in the flow diagram 4000. In step 266 a determination is made as to whether the coordinates u and v are those of a pixel position. If coordinates u and v are those of a pixel position, the mapped brightness value $I_m$(u, v) at that pixel position is compared with a low threshold value $\theta_L$ and a high threshold value $\theta_H$ in step 267. Otherwise, steps 267 and 268 are skipped and the computation process moves to the next repetition of loop 264. If in step 267 the mapped brightness value $I_m$(u, v) is determined to be greater than the low threshold value $\theta_L$ and less than the high threshold value $\theta_H$, then step 268 is performed. Otherwise, step 268 is skipped and the computation process moves to the next repetition of loop 264. The threshold values $\theta_L$ and $\theta_H$ are predetermined constants, which generally represent the mapped noise threshold of a light-sensing element of the image sensor having the sensitivity level corresponding to pixel position (u,v), and the saturation or near saturation brightness value of a light-sensing element of the image sensor having the same sensitivity level, respectively. In step 268, the values s and w are updated in the accordance with the equations shown in the block representing step 268 in the flow diagram 4000. In these equations, $\phi_{mn}$ represents the value of a 45° rotated cubic interpolation kernel $\phi$ at indices m and n. An example of a 45° rotated cubic interpolation kernel is shown in diagram 4200 in FIG. 42. After loop 264 is repeated for all values of the indices i and j, step 269 is performed. In step 269 the value of the function Resample ($I_m$, x', y') is obtained by dividing the value s by the value w, and the computation process represented by the flow diagram 4000 is repeated for the next off-grid position (x',y') received from the off-grid position generator 45 in FIG. 24.

Figure 41:
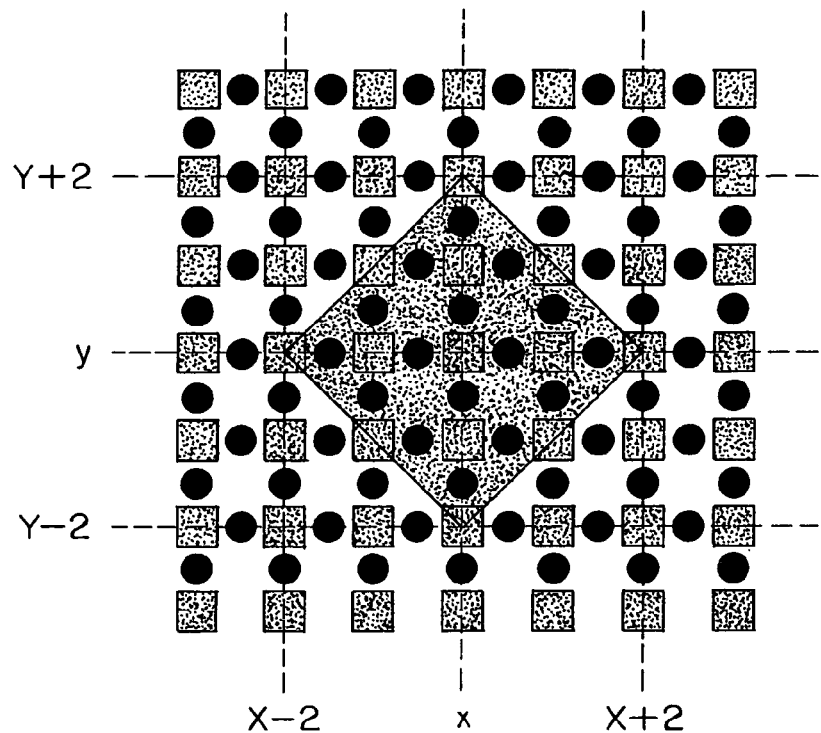
FIG. 41 is a diagram showing a shaded region of pixel positions and off-grid positions for explaining on-grid resampling using a 45° rotated cubic interpolation filter kernel for an exemplary embodiment of the on-grid resampler for two sensitivity levels in accordance with the present invention.
Figure 42:
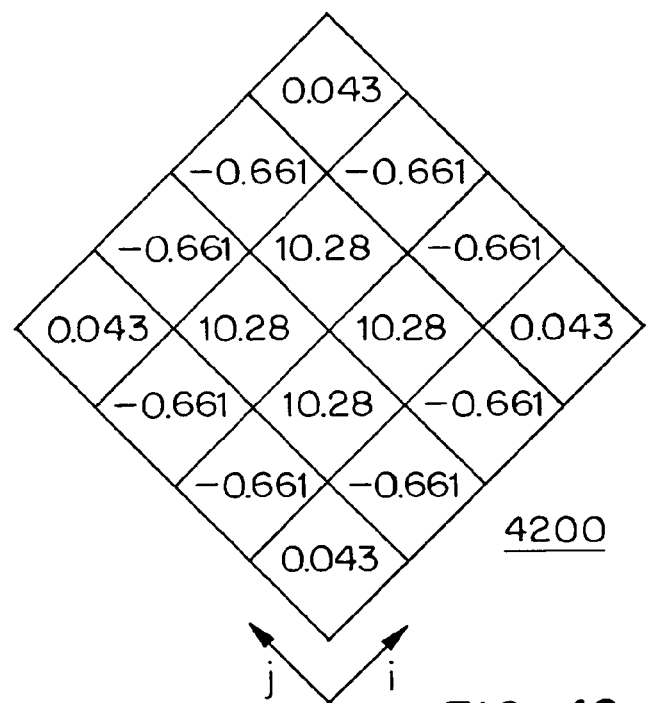
FIG. 42 shows an example of a 45° rotated cubic interpolation filter kernel that may be used in the computation process described by the flow diagram of FIG. 40 for an exemplary embodiment of the on-grid resampler for two sensitivity levels.

The data flow diagram of the on-grid resampler for the two sensitivity level case is the same as that for the four sensitivity level cases, as shown in FIG. 28, However, there are some differences in the computation carried out by the interpolator 37 in the diagram of FIG. 28. As in the four sensitivity level case, the interpolator carries out a cubic interpolation operation which computes an interpolated brightness value at a pixel position received from pixel position generator 38 in FIG. 28 using respective estimated off-grid brightness values at 4×4 off-grid positions that are nearest neighbors to the received pixel position. The shape of the interpolation filter kernel for two sensitivity levels is, however, different. FIG. 41 shows a diagram of a local area of pixel positions represented by squares and off-grid positions represented by black circles. When the brightness value at a received pixel position (x, y) is computed, a 45° rotated 4×4 cubic interpolation kernel is applied to form a product with the brightness values at 4×4 off-grid positions that are nearest neighbors to the received pixel position (x,y) within a diamond shaped area from (x−2, y−2) to (x+2, y+2), which is shown as a shaded diamond shaped region in FIG. 41. An example of a 45° rotated 4×4 cubic interpolation kernel 4200 is shown in FIG. 42. Since the filter kernel for two sensitivity levels is more compact than the kernel for four sensitivity levels, the embodiment for two sensitivity levels results in better spatial frequency characteristics.

Figure 43:
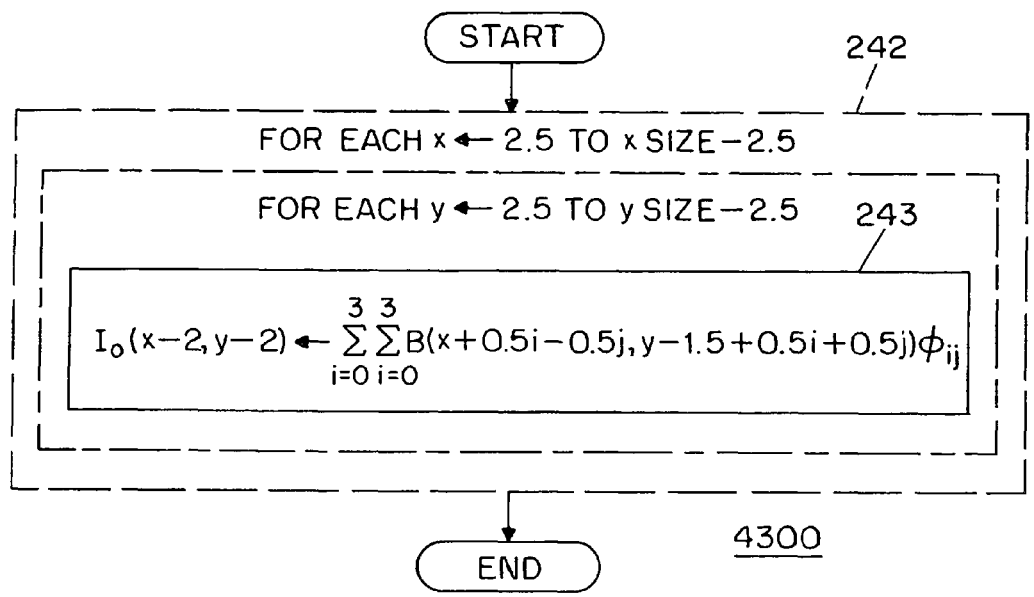
FIG. 43 is a flow diagram describing the computation process that may be carried out by the exemplary embodiment of the on-grid resampler represented by the data flow diagram of FIG. 28 to obtain an exemplary embodiment of the on-grid resampler for two sensitivity levels in accordance with the present invention.

Turning to FIG. 43, there is shown a flow diagram 4300 describing a computation process that may be carried out by the embodiment of the on-grid resampler for two sensitivity levels. The computation process comprises loop 242, which includes step 243. Loop 242 is repeated for each pixel position (x, y) of the output image received from pixel position generator 38 in FIG. 28 from position (2.5, 2.5) to position (xSize−2.5, ySize−2.5), where x and y are the coordinates of the pixel position, and xSize and ySize are the dimensions of the captured image in the x direction and the y direction, respectively. In step 243, a brightness value at a received pixel position (x,y) of the output image $I_o(x,y)$ is derived by computing the product of the brightness value B at the 4×4 off-grid positions that are nearest neighbors to the received pixel position (x,y), and the 45° rotated 4×4 cubic interpolation kernel φ in accordance with the equation shown in the block representing step 243 in the flow diagram 4300. The computed brightness value at the corresponding pixel position of the output image I (x−2,y−2) is stored in the output image memory 21 in FIG. 28. After repetition of loop 242 for every pixel position received from pixel position generator 38 in FIG. 28 is completed, the computation process represented by the flow diagram 4300 terminates.

Figure 44:
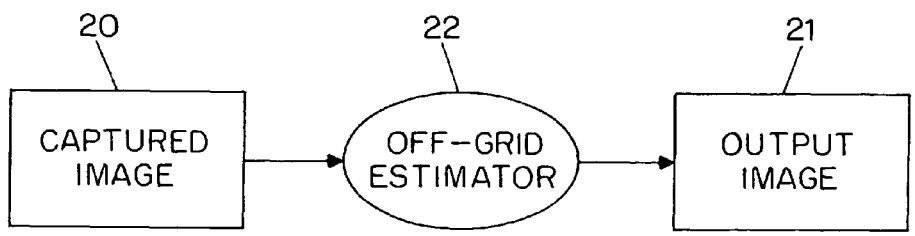
FIG. 44 is a data flow diagram of still further exemplary embodiment of the image processing part of the data flow diagram of FIG. 1.

Referring back to the data flow diagram 200 of FIG. 2, it is noted that where the off-grid estimator 22 derives respective off-grid brightness values at off-grid positions that lie in a regular array such as that shown in FIG. 15 and FIG. 36, the regular array of off-grid brightness values may be directly stored in the output image memory 21 as the pixel brightness values of a high dynamic range output image, without further processing by an on-grid resampler 23. This is shown in the exemplary embodiment of the present invention represented by the data flow diagram of FIG. 44, where the respective estimated off-grid brightness values computed by the off-grid estimator 22 are provided directly to the output image memory 21 for subsequent display or further processing. Although an output image based directly on the estimated off-grid brightness values will generally not have as high a quality as one that has undergone resampling by the on-grid resampler 22, the quality may be sufficient for some applications.

Turning to FIG. 45, there is shown a data flow diagram 4500 according to another exemplary embodiment of the present invention, in which the mapper 33 and associated lookup table memory 35 of the off-grid estimator of FIG. 16 are moved from the location shown in FIG. 16 to after the interpolator 37 of the on-grid resampler of FIG. 28. Approximately the same result is obtained using the arrangement of FIG. 45 as is obtained with the combination of the off-grid estimator of FIG. 16 and the on-grid resampler of FIG. 28.

Figure 46:
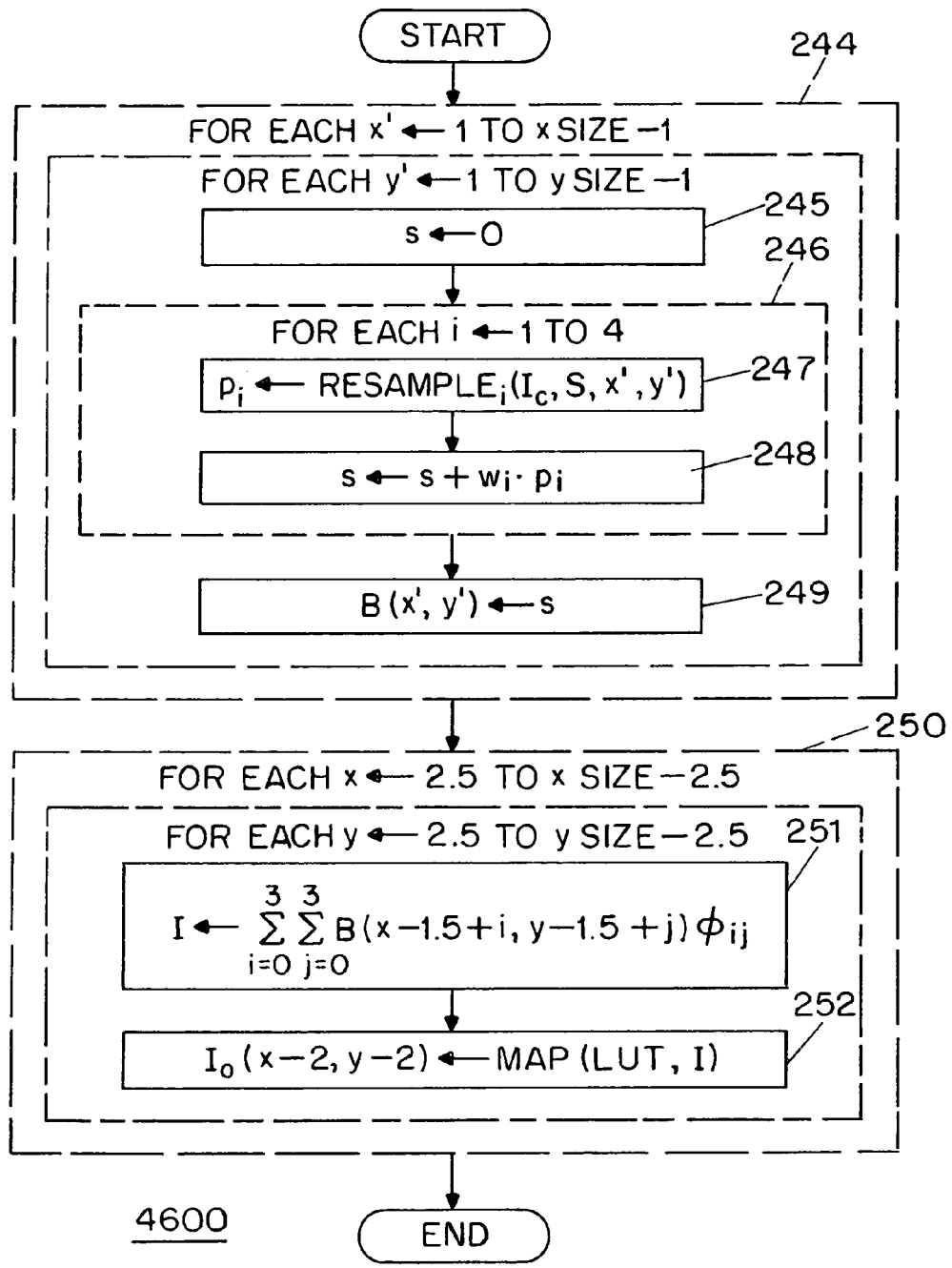
FIG. 46 is a flow diagram describing the computation process that may be carried out by the exemplary embodiment of the image processing part represented by the data flow diagram of FIG. 45.

Turning to FIG. 46, there is shown a flow diagram 4600 of the computational process that may be carried out by the arrangement of FIG. 45. First, loop 244 is repeated for each off-grid position (x', y') received from off-grid position generator 32 in FIG. 45 from (1, 1) to (xSize−1,ySize−1), where x' and y' are the coordinates of the off-grid positions, and xSize and ySize are the dimensions of the captured image in the x direction and y direction, respectively. In loop 244, step 245, loop 246 and step 249 are carried out. In step 245 a value s is initialized to 0. In loop 246, steps 247 and 248 are repeated for each i-th sensitivity level. In the present embodiment, the number of sensitivity levels is 4. In step 247 a sensitivity level off-grid brightness value $p_i$ for the i-th sensitivity level at received off-grid position (x', y') is derived from the captured image brightness values $I_c$ in the captured image memory 20 by the resampling function $Resample_i(I_c, S, x', y')$ of the i-th resampler, where S represents the sensitivity pattern data from the sensitivity pattern memory 34 in FIG. 45. In step 248 the computed sensitivity level off-grid brightness value for the i-th sensitivity level $p_i$ is multiplied by a predetermined weighting factor $W_i$ for the i-th sensitivity level. The product of the multiplication is added to s. After loop 246 is repeated for each sensitivity level, step 249 is performed. In step 249 the value s is assigned to the off-grid brightness value B at off-grid position (x', y') received from off-grid position generator 32 in FIG. 45. After step 249 is performed, the current repetition of loop 244 is completed. After loop 244 is repeated for every off-grid position, as received from off-grid position generator 32, the computation proceeds to loop 250. Loop 250 is repeated for each pixel position (x, y) from (2.5, 2.5) to (xSize−2.5, ySize−2.5), as received from pixel position generator 38 in FIG. 45. In loop 250, steps 251 and 252 are performed. In step 251 an interpolated on-grid brightness value I at pixel position (x,y) is derived by computing the product of the brightness values at 4×4 off-grid positions that are nearest neighbors to a received pixel position (x, y) and a 4×4 cubic interpolation kernel φ using the equation in the block representing step 251 in the flow diagram 4600. In step 252, the function MAP(LUT,I) is evaluated to obtain the pixel brightness value of the output image $T_o(x−2, y−2)$ at pixel position (x−2,y−2). The computation process for evaluating the function MAP(LUT,I) is described by the flow diagram 1900 in FIG. 19. After loop 250 is repeated for every pixel position received from pixel position generator 38 in FIG. 45, the computation process represented by the flow diagram for 4600 terminates.

Figure 47:
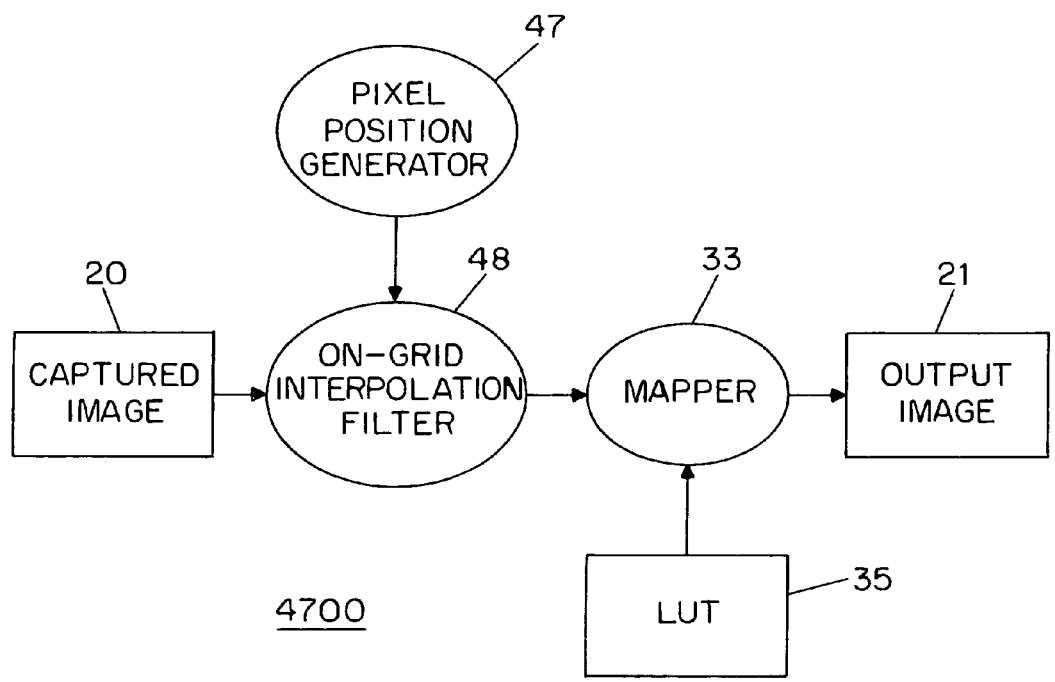
FIG. 47 is a data flow diagram of still another exemplary embodiment of the image processing part of the data flow diagram of FIG. 1.

Referring now to FIG. 47, there is shown a data flow diagram 4700 of another exemplary embodiment of the present invention, which uses an on-grid interpolation filter 46 to implement the image processing part 2 of FIG. 1. Comparing the diagram in FIG. 47 with the diagram in FIG. 45, it is noted that the resamplers 28, 29, 30 and 31, the weighting factor memories 24, 25, 26 and 27, the sensitivity pattern memory 34, the off-grid brightness value memory 36, the interpolator 37, the off-grid position generator 32 and the pixel position generator 38 are replaced by an on-grid interpolation filter 46 and a pixel position generator 47. The derivation of the filter is now explained.

In accordance with the present invention, off-grid brightness values B(x,y) are obtained by applying an off-grid estimating function $f_{off}(*)$ to the captured image brightness values $I_c(x,y)$, i.e.:

$$B(x,y)=f_{off}(I_c(x,y)). \qquad (2)$$

In the embodiment of the off-grid estimator represented by FIGS. 16-19, off-grid brightness values dependent on a monotonic light-sensing element response function s(E) are first derived, and then response function independent off-grid brightness values are recovered by applying a lookup table for the inverse of the response function s(E), i.e.:

$$B(x,y)=s^{-1}(\tilde{s}(I_c(x,y))) \qquad (3)$$

where $\tilde{s}(*)$ is a function for obtaining sensitivity level dependent off-grid brightness values by using a weighted sum of response functions of light-sensing elements having different sensitivity levels such as that computed using equation (1).

To obtain the output image, an on-grid resampling function $f_{on}(*)$ is used to compute brightness values at pixel positions by a conventional resampling function $r(*)$. Therefore, the output image can be expressed as $$I_{(x,y)} = f_{on}(f_{off}(I_c(x, y))) \qquad (4)$$
$$= r(s^{-1}(\tilde{s}(I_c(x, y))))$$

It may be assumed that the same continuous function can be constructed from different resampled data sequences if the original continuous function is sufficiently smooth. Based on this assumption, is equivalent to $\tilde{I}_o(x,y)$ is equivalent to $I_o(x,y)$, where $$\tilde{I}_o(x,y) = s^{-1}(r(\tilde{s}(I_c(x,y)))) \qquad (5)$$

Although $\tilde{I}_o$ and $I_o$ are not equivalent when $\tilde{s}(I_c(x,y))$ is not smooth, $\tilde{I}_o(x,y)$ can nevertheless be used as an approximation of $I_o(x,y)$.

Figures 48, 49:
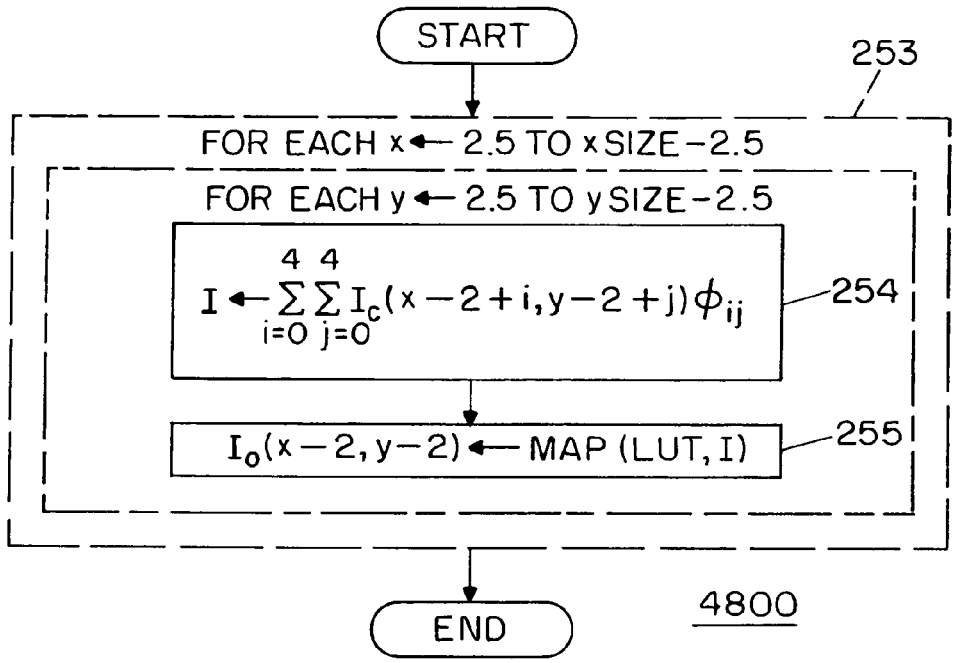
FIG. 48 is a flow diagram describing the computation process that may be carried out by the exemplary embodiment of the image processing part represented by the flow diagram of FIG. 47.
FIG. 49 shows an example of a 5×5 filter kernel that may be used in the computation process described by the flow diagram of FIG. 48.

The functions $\tilde{s}(*)$ and $r(*)$ may be combined into a single filter function because both functions are linear and invariant to phase shift. Therefore the embodiment represented by the diagram of FIG. 47 uses an on-grid interpolation filter that combines $\tilde{s}(*)$ and $r(*)$. The filter is derived by the convolution of $\tilde{s}(*)$ and $r(*)$. An example of the kernel 4900 of such a filter that combines $\tilde{s}(*)$ and $r(*)$ is shown in FIG. 49. The filter kernel 4800 is derived by using simple averaging of four nearest neighbor pixel position brightness value resampling described for the embodiment of the off-grid estimator of FIGS. 16-19 as $\tilde{s}(*)$, and conventional cubic interpolation filtering as $r(*)$.

Referring to FIG. 48, there is shown a flow diagram 4800 describing the computation process carried out by the embodiment of the image processing part represented by the data flow diagram 4700 in FIG. 47. First, loop 253 is repeated for each pixel position (x, y) of the output image, as received from pixel position generator 47 in FIG. 47, from (2.5,2.5) to (xSize−2.5,ySize−2.5), where x and y are the coordinates of the pixel position, and xSize and ySize are the dimensions of the captured image in the x and y directions, respectively. In loop 253, steps 254 and 255 are carried out. In step 254 an interpolated on-grid brightness value I is computed by multiplying the brightness values of the captured image at 5×5 nearest neighbor pixel positions to a received pixel position (x,y) by a 5×5 filter kernel φ. In step 255 the lookup table data, which is stored in the lookup table memory 35 in FIG. 47, is applied by the mapper 33 in FIG. 47 to the computed on-grid brightness value I to obtain the brightness value of the output image $I_0$(x−2,y−2) at pixel position (x−2,y−2). After loop 253 is repeated for every output image pixel position received from the pixel position generator 47 in FIG. 47, the computation process represented by the flow diagram 4800 terminates. Using the process represented by flow diagram 4800, an output image with dimensions of xSize−4 and ySize−4 is obtained.

Figure 50:
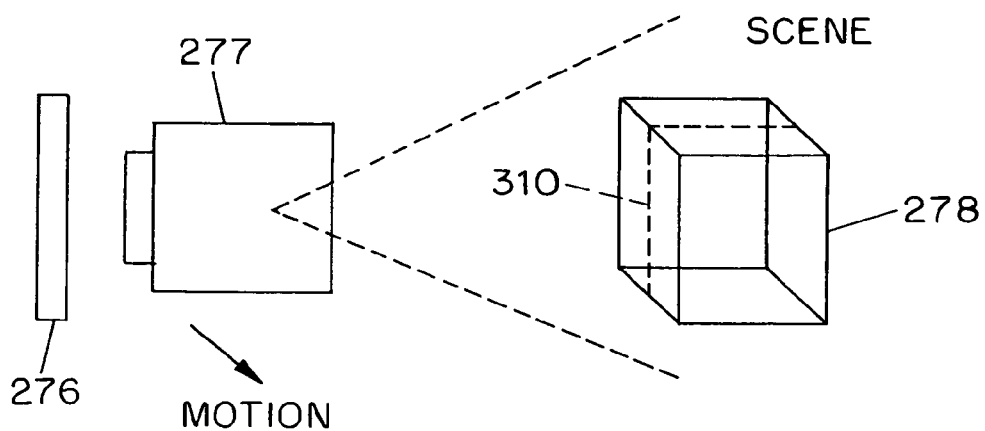
FIG. 50 illustrates the capture of successive line images of a scene by an imaging system having a linear image sensor, the imaging system scanning the scene by moving at constant speed with respect to the scene, the linear image sensor taking sequential exposures of the scene at regular time intervals.
Figure 51:
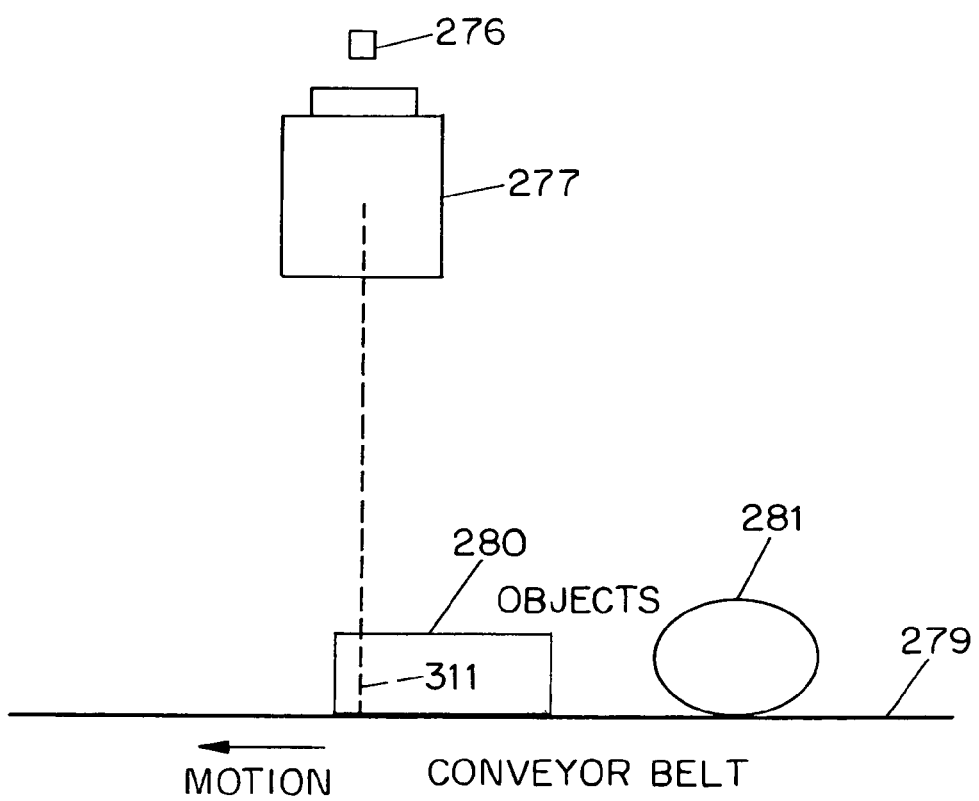
FIG. 51 illustrates the capture of successive line images of objects on a conveyor belt moving at constant speed past a stationary imaging system having a linear image sensor taking sequential exposures of the conveyor belt and objects at regular time intervals.

The present invention may be applied to linear image sensors having linear arrays of light-sensing elements that capture line images. Such linear image sensors, including CCD linear image sensors, are available with a greater number of light-sensing elements along a given direction than two-dimensional image sensors. Accordingly, linear image sensors may be used to provide two-dimensional images of greater resolution in applications where scanning of a scene with the linear image sensor is feasible and sequentially captured line images of successive regularly spaced linear regions of the scene are concatenated. Examples of the ways that a linear image sensor may be used to scan a scene and sequentially capture line images that may be concatenated to for a two-dimension image of the scene are illustrated in FIGS. 50 and 51. Referring to FIG. 50, there is shown an imaging system having a linear image sensor 276 and a lens system 277 for projecting a line image of a linear region 310 of a scene having an object 278 onto the light-sensing elements (not shown) of the linear image sensor. The imaging system is moved (translated and/or rotated) at a constant rate with respect to the scene as shown by the arrow indicating the motion of the imaging system in the figure. Line images of the scene are captured at regular sequential intervals by applying a regular sequence of exposure signals (not shown) to the linear image sensor 276 during the motion. The sequentially captured line images can be concatenated to form a single high resolution two-dimensional image of the scene.

Turning to FIG. 51, there is shown an imaging system comprising a linear image sensor 276 and a lens system 277. The imaging system is held stationary with respect to a scene comprising a conveyor belt 279 carrying objects 280 and 281 moving past the imaging system at a constant speed. Line images of successive regularly spaced linear regions 311 of the scene are sequentially captured at regular intervals by applying a regular sequence of exposure signals (not shown) to the linear image sensor 276. The sequentially captured line images can again be concatenated to form a two-dimensional image of a section of the conveyor belt 279 carrying objects 280 and 281.

Figure 52:
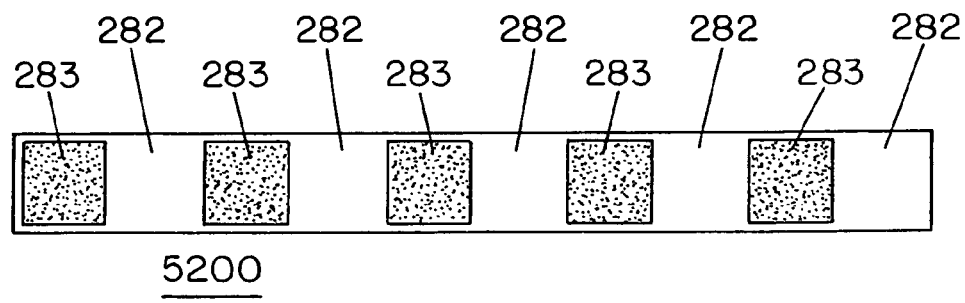
FIG. 52 depicts an illustrative exposure mask having cells with two different transparencies for providing a linear image sensor with a spatially varying sensitivity pattern with two sensitivity levels.

In accordance with the present invention, the linear image sensor 276 has a spatially varying sensitivity pattern. Referring to FIG. 52, there is shown an illustrative linear mask 5200 having cells 282 and 283 with two different transparencies. Each cell of the mask 5200 is placed in front of a respective one of the light-sensing elements of the linear image sensor so as to cause each light-sensing element of the sensor to have a respective one of two sensitivity levels in accordance with the predetermined sensitivity pattern of the linear array of light-sensing elements as defined by the mask 5200.

Each light-sensing element of the linear image sensor in response to incident light from the scene produces a captured image brightness value at a corresponding one of a multiplicity of regularly spaced pixel positions of a linear pixel position array, thereby capturing a line image. When successive line images captured by the linear image sensor are concatenated, there is obtained a two-dimensional array of pixel positions located at respective intersections of a plurality of regularly spaced pixel rows and a plurality of regularly spaced pixel columns orthogonal to the pixel rows, where each pixel position has a respective brightness value produced by a light-sensing element that corresponds to the same pixel position in each one of the concatenated line images, and corresponds to a respective one of the two sensitivity levels of the light-sensing elements in accordance with a two-dimensional sensitivity pattern as defined illustratively by the concatenated exposure mask of FIG. 53. It will be understood that the light-sensing elements of the linear image sensor may have more than two sensitivity levels and that the sensitivity level of each light-sensing element may be established by means other than a mask.

Figure 53:
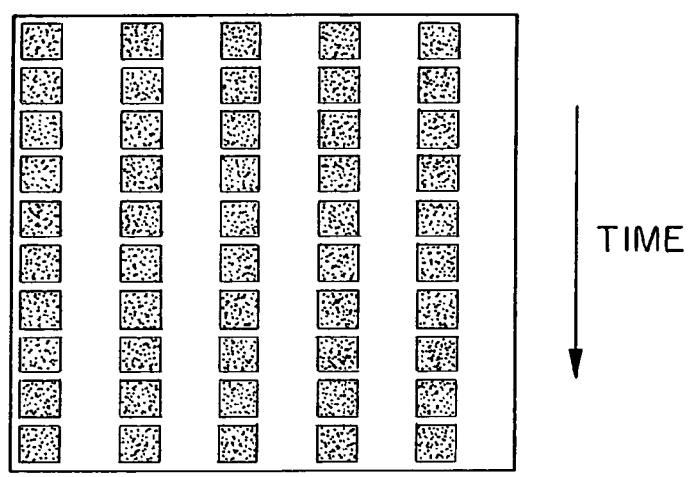
FIG. 53 depicts illustratively a concatenation of the exposure mask of FIG. 52 representing a two-dimensional spatially varying sensitivity pattern of a two-dimensional image formed by concatenating successive line images captured by a linear image sensor having a one-dimensional spatially varying sensitivity pattern defined by the exposure mask of FIG. 52.

Referring back to FIG. 37, the captured image brightness values at respective pixel positions of the concatenated two-dimensional captured image may be stored in captured image memory 20 and the spatially varying sensitivity pattern as represented illustratively by FIG. 53 may be stored in the sensitivity pattern memory 34. The off-grid brightness values may be estimated in accordance with the data flow diagram shown in the figure, and the array of off-grid positions may be a concatenation of the linear off-grid position array shown illustratively in FIG. 54, where each off-grid position 286 is located midway between a respective adjacent pair of pixel positions 285.

The data flow diagram of FIG. 24 and the computational processes described by the flow diagrams 3900 and 4000 of FIGS. 25 and 30 with appropriate modifications to account for a different off-grid position array may also be used to estimate the off-grid position brightness values from the concatenated two-dimensional captured image brightness values in the captured image memory 20. The estimated off-grid brightness values at the respective off-grid positions may be used directly as the pixel brightness values of an output image in accordance with FIG. 44, or on-grid resampling of the estimated off-grid brightness values in accordance with the data flow diagram of FIG. 28 and the computation process described by the flow diagram 3000 of FIG. 30 with appropriate modifications to account for a different off-grid array, may be used to derive the resampled on-grid brightness values at respective pixel positions of the output image, the resampled on-grid brightness values being the pixel brightness values of the output image stored in the output image memory 21.

Referring to FIGS. 45 and 46, the captured image brightness values at respective pixel positions of the concatenated captured line images stored in the captured image memory 20 may be processed in accordance with the data flow diagram 4500 of FIG. 45 using the computation process described by the flow diagram 4600 of FIG. 46 to derive resampled brightness values at respective pixel positions of the output image to be stored in the output image memory 21. To carry out such processing, the data flow diagram 4500 and the computation flow diagram 4600 are modified to take into account the use of an image sensor with light-sensing elements having two sensitivity levels and the use of a different off-grid position array.

Referring to FIGS. 47 and 48, the captured image brightness values at respective pixel positions of the concatenated captured line images stored in the captured image memory 20 may be processed in accordance with the data flow diagram 4700 of FIG. 47 using the computation process described by the flow diagram 4800 of FIG. 48 to derive compensated interpolated brightness values at respective pixel positions of the output image to be stored in the output image memory 21. To carry out such processing, the data flow diagram 4700 and the flow diagram 4800 are modified to take into account the use of an image sensor with light-sensing elements having two sensitivity levels. Aside from changes in the data stored in the lookup table 35 representing the inverse of a combined response function of light-sensing elements having the two sensitivity levels, these modifications will also result in a different filter kernel $\phi$ to be used in the computation process described by the flow diagram 4800.

Figure 54:
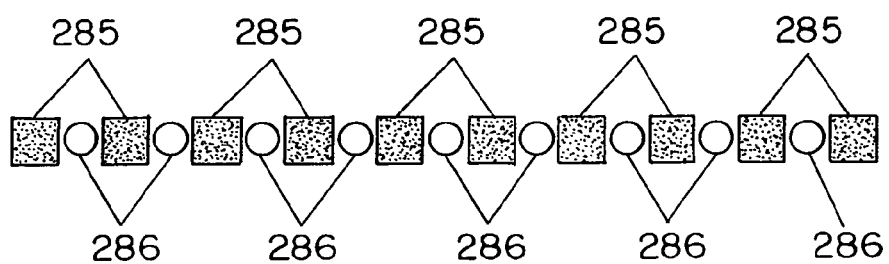
FIG. 54 is a diagram illustratively depicting a linear array of pixel (on-grid) positions and a linear array of off-grid positions.

As an alternative to processing concatenated captured line images, each line image may be separately processed to derive a high dynamic range line image by estimating the brightness values at off-grid positions, which for a linear pixel position array are located between respective adjacent pairs of pixel positions. The processed line images may then be concatenated to obtain a high dynamic range two-dimensional image. Separate processing of each line image is less computationally intensive in comparison to the processing of a two-dimensional image, and therefore can be done in real time as the line images are captured. Turning to FIG. 54, there is shown an illustrative row of pixel positions 285 represented by squares, and "off-grid" positions 286 represented by circles, where each off-grid position 285 is located midway between a respective adjacent pair of pixel positions 285. According to one exemplary embodiment, the brightness value at each one of the off-grid positions 286 may be derived by computing a weighted average of the captured image brightness values at the pixel positions 285 within a predefined neighborhood of the off-grid position. In the case where the linear image sensor has light-sensing elements of two different sensitivity levels, the captured image brightness values at all consecutive adjacent pairs of pixel positions are averaged to obtain the estimated brightness value at the off-grid position between each of the consecutive adjacent pairs of pixel positions. In this manner, the brightness value B(x') at off-grid position x' may be expressed as $$B(x')=W_1 I_c(x'-0.5)+W_2 I_c(x'+0.5), \quad (6)$$

where $W_1$ and $W_2$ are weighting factors assigned to the two different sensitivity levels. The resulting off-grid brightness values represent a one-dimensional image with high dynamic range. The computed off-grid brightness values are each compensated by the inverse of a combined response function of the light-sensing elements. The combined response function may be expressed as $$s(E)=W_1 P_1(E)+W_2 P_2(E), \quad (7)$$

where $P_1(E)$ is the radiometric response function of a light-sensing element of the linear image sensor having one of the two sensitivity levels, $P_2(E)$ is the radiometric response function of a light-sensing element of the linear image sensor having the other of the two sensitivity levels, and $W_1$ and $W_2$ are the weighting factors assigned to the two different sensitivity levels. Compensation of the estimated off-grid brightness values by the inverse of the combined response function of the light-sensing elements using a mapper and a lookup table memory as in the two-dimensional case remaps the off-grid brightness values to ones that are linearly related to scene radiance.

Figure 55:
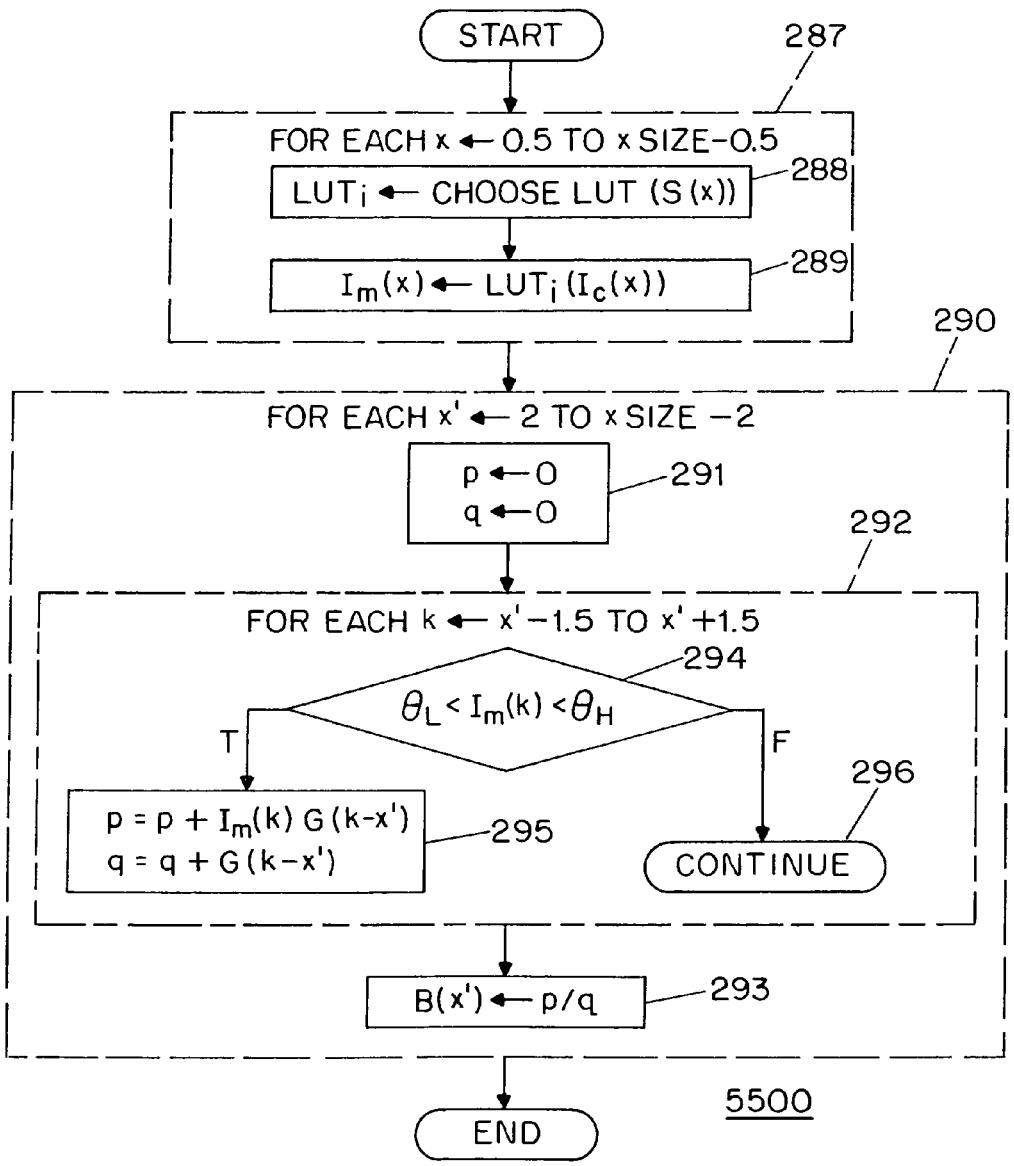
FIG. 55 is a flow diagram describing a computation process that may be carried out by the embodiment of the off-grid estimator represented by the flow diagram of FIG. 24 for a line image captured by a linear image sensor having light-sensing elements of two sensitivity levels.

Referring to FIG. 55, there is shown a flow diagram 5500 describing a computation process for deriving the estimated brightness values at the off-grid positions 286 in FIG. 54. The computation process described by the flow diagram 5500 is carried out by an off-grid estimator represented by the data flow diagram 2400 of FIG. 24. Referring to FIG. 24, the pixel position generator 43 provides the positions of the pixel position 285 of the linear pixel position array shown in FIG. 54. The sensitivity pattern memory 40 stores the sensitivity level corresponding to each pixel position as defined by the illustrative mask 5200 in FIG. 52. The lookup table memory 39 stores data representing respective inverse response function data of light-sensing elements having the two sensitivity levels. The off-grid position generator 46 provides the off-grid positions 286 of the off-grid position array shown in FIG. 54.

Turning back to FIG. 55, loop 287 is first repeated for each pixel position x of the linear pixel position array from 0.5 to xSize−0.5 as received from the pixel position generator 43 in FIG. 24, where xSize is the length of the line image. In loop 287, steps 288 and 289 are performed. In step 288, lookup table data $LUT_i$ for the i-th sensitivity level is chosen by referring to the sensitivity level corresponding to received pixel position x. The sensitivity level corresponding to the received pixel position x is obtained from sensitivity pattern data S(x) stored in the sensitivity pattern memory 40 in FIG. 24. In step 289, the lookup table data $LUT_i$ stored in the lookup table memory 39 in FIG. 24 is applied by the mapper 42 in FIG. 24 to the captured image brightness value $I_c(x)$ at received pixel position x from the captured image memory 20 in FIG. 24. The brightness value at received pixel position x compensated by the inverse of the response function of the light-sensing element having sensitivity level i derived from the lookup table data $LUT_i$ is designated by $I_m(x)$. After loop 287 is repeated for every pixel position received from the pixel position generator 43 in FIG. 24, loop 290 is repeated for each off-grid position x' from 2 to xSize−2 as received from the off-grid position generator 45 in FIG. 24. In loop 290, step 291, loop 292 and step 293 are performed. In step 291, a value p and a value q are each initialized to 0. After step 291, loop 292 is repeated for each pixel position k that is one of a predetermined number of pixel positions that are nearest neighbors to the received off-grid position x'. In the computation process described by the flow diagram 5500 of FIG. 55, the predetermined number of nearest neighbor pixel positions is four and k has values from (x'−1.5) to (x'+1.5). In loop 292, steps 294 and 295 are performed. In step 294, a compensated captured image brightness value at pixel position k, $I_m(k)$, is compared with a low threshold value $\theta_L$ and a high threshold value $\theta_H$. If $I_m(k)$ is greater than $\theta_L$ and less than $\theta_H$, step 295 is performed. Otherwise, loop 292 proceeds to its next repetition. In step 295, $I_m(k)$ is multiplied by the value of a 4×1 Gaussian interpolation kernel G(k−x') at position (k−x'), and the product is added to the quantity p. In addition, the value of the Gaussian interpolation kernel G(k−x') is added to the quantity q. After loop 292 is repeated for each value of k, step 293 is performed. In step 293, the off-grid brightness value B(x') at the received off-grid position x' is computed by dividing the value p by the value q, and loop 290 proceeds to the next off-grid position received from the off-grid position generator 45 in FIG. 24. After loop 290 has been repeated for each off-grid position x' of the off-grid position array, the computation process described by flow diagram 5500 terminates. The threshold values $\theta_L$ and $\theta_H$ are predetermined constant values, which generally represent the noise level of a light-sensing element having the sensitivity level corresponding to pixel position k compensated by the inverse of the response function of the light-sensing element, and the saturation or near saturation value of a light-sensing element having the same sensitivity level, respectively. An example of a 4×1 Gaussian kernel 5600 that may be used in the computation process described by the flow diagram 5500 is shown in FIG. 55, assuming that the center of the Gaussian kernel 5600 is at the center of the 4×1 pixel position array involved in the interpolation.

The respective estimated off-grid brightness values at the off-grid positions may be used directly as the pixel brightness values of an output image and stored in the output image memory 36 in FIG. 24. Alternatively, the off-grid brightness values may be resampled using one of a variety of interpolation techniques to obtain resampled pixel position brightness values that are then stored in the output image memory as pixel brightness values of the output image.

Figures 56, 57, 58, 61:
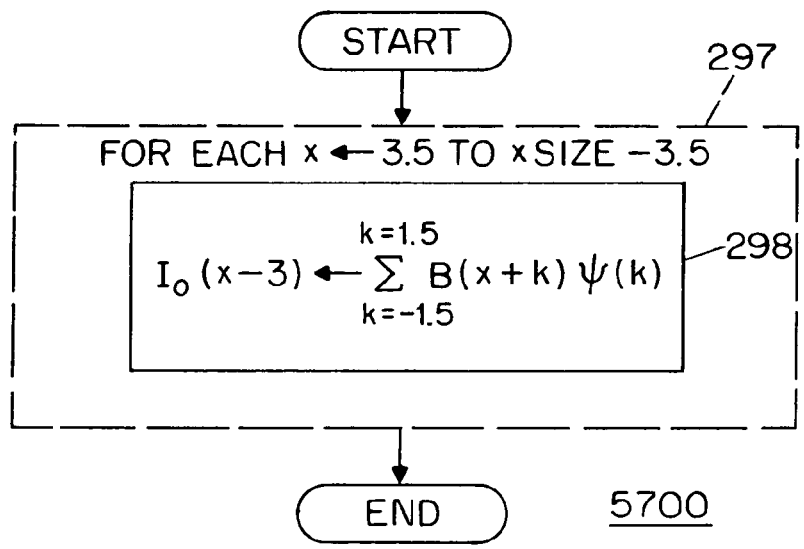
FIG. 56 shows an example of a 4×1, one-dimensional Gaussian interpolation kernel that may be used in the computation process described by the flow diagram of FIG. 55.
FIG. 57 is a flow diagram describing a computation process that may be carried out by the embodiment of the on-grid resampler represented by the data flow diagram of FIG. 28 to derive on-grid pixel brightness values of a one-dimensional output image.
FIG. 58 shows an example of a 4×1 one-dimensional cubic interpolation kernel that may be used in the computation process described by the flow diagram of FIG. 57.
FIG. 61 shows an example of a 5×1 on-grid interpolation filter kernel that may be used in the computation process described by the flow diagram of FIG. 60.

Referring back to FIG. 28, resampling of the estimated off-grid brightness values to derive respective resampled brightness values at the pixel positions may be in accordance with the data flow diagram of 2800. An interpolator 37 receives pixel positions of the linear pixel position array illustrated in FIG. 54 from the pixel position generator 38. For each received pixel position the interpolator 37 derives from the estimated off-grid brightness values stored in the off-grid brightness value memory 36 an interpolated brightness value at the received pixel position, which is then provided to the output image memory 21. Turning to FIG. 57, there is shown a flow diagram 5700 describing the computation process that may be performed by the interpolator 37 in FIG. 28. The computation process comprises loop 297, which includes step 298. Loop 297 is repeated for each pixel position x of the output image from 3.5 to xSize−3.5, as received from the pixel position generator 38 in FIG. 28, where xSize is the length of the captured line image. In step 298 a brightness value of the output image $I_o(x-3)$ is derived by computing the product of the brightness values at four nearest neighbor off-grid positions to the received pixel position x, and a 4×1 cubic interpolation kernel ψ. The computed on-grid brightness value $I_o(x-3)$ at pixel position (x−3) is stored as the brightness value at the corresponding pixel position of the output image in the output image memory 21 of FIG. 28. After loop 297 is repeated for each pixel position from 3.5 to xSize−3.5 received from the pixel position generator 38 in FIG. 28, the computation process described by the flow diagram 5700 terminates. An example of a cubic interpolation kernel ψ(k) 5800 that may be used in the computation process described by the flow diagram 5700 is shown in FIG. 58.

Another embodiment of the present invention for processing captured line images to derive on-grid brightness values of a line output image is represented by the data flow diagram 4700 of FIG. 47. Referring to FIG. 47, the captured image brightness values at respective pixel positions of a linear pixel position array as illustrated in FIG. 54 are stored in the captured image memory 20. An on-grid interpolation filter 46 receives pixel positions of the linear pixel position array from a pixel position generator 47. For each pixel position received from the pixel position generator 47 the filter 46 interpolates the captured image brightness values in the captured image memory 20 to derive an interpolated on-grid brightness value at the received pixel position. The interpolated on-grid brightness value is then compensated by the inverse of a combined response function of the light-sensing elements of the image sensor (not shown), and the compensated interpolated on-grid brightness value is stored in the output image memory 21 as an output line image brightness value at the pixel position received from the pixel position generator 47.

Figure 59:
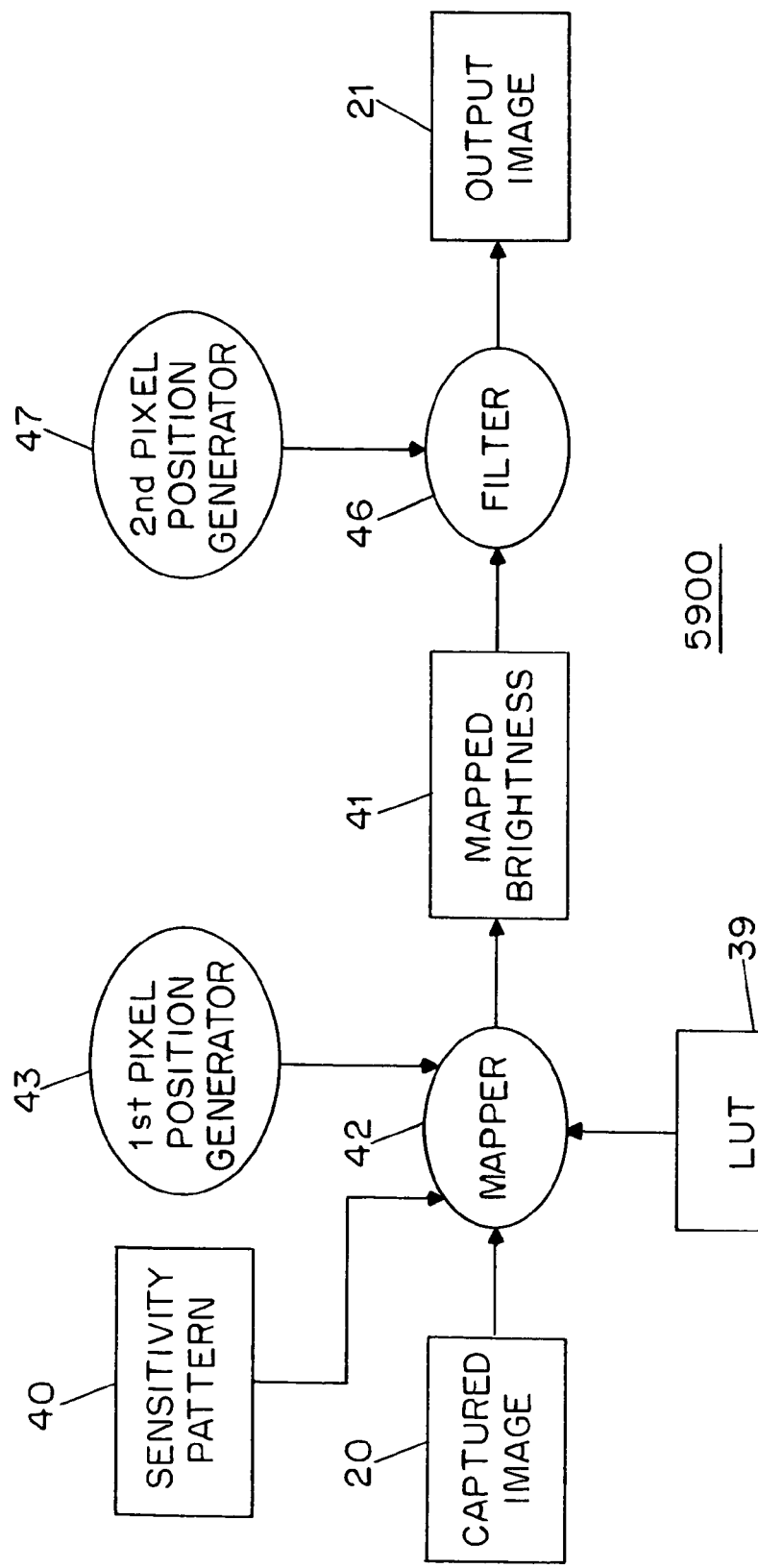
FIG. 59 is a data flow diagram representing still another exemplary embodiment of the image processing part of the data flow diagram of FIG. 1.

Referring to FIG. 59, there is shown a data flow diagram 5900 representing a further embodiment of the image processing part 2 of the data flow diagram of FIG. 1. When used for processing captured line images, the image processing part of FIG. 59 includes a first pixel position generator 43 for sequentially generating pixel positions of the linear pixel position array as illustrated in FIG. 54 from 0.5 to xSize−0.5, where xSize is the length of the line image. The image processing part of FIG. 59 also includes a sensitivity pattern memory 40 for storing the sensitivity level corresponding to each pixel position of the linear pixel position array, a mapper 42 and associated lookup table memory 39 for storing separate lookup table data representing the inverse of the response functions of light-sensing elements having different ones of the sensitivity levels, a mapped pixel position brightness value memory 41 for storing the captured image brightness value at each pixel position after compensation by the inverse of the response function of a light-sensing element having a sensitivity level corresponding to the pixel position, a second pixel position generator 47 for generating pixel positions of the pixel position array from 2.5 to xSize−2.5, an on-grid interpolation filter 46 receiving pixel positions from the second pixel position generator 43 and interpolating the compensated captured image brightness values at respective pixel positions in the mapped pixel position brightness value memory 41 to derive an on-grid interpolated brightness value for each pixel position received from the second pixel position generator 47. The on-grid interpolated brightness values at respective pixel positions of the linear pixel position array are stored in the output image memory 21 as the pixel brightness values of an output line image. It is noted that the embodiment of the image processing part represented by the data flow diagram 5900 of FIG. 59 may be used to process two-dimensional captured images with appropriate changes to take into account a two-dimensional pixel position array, a two-dimensional sensitivity pattern and a two-dimensional on-grid interpolation filter.

Figure 60:
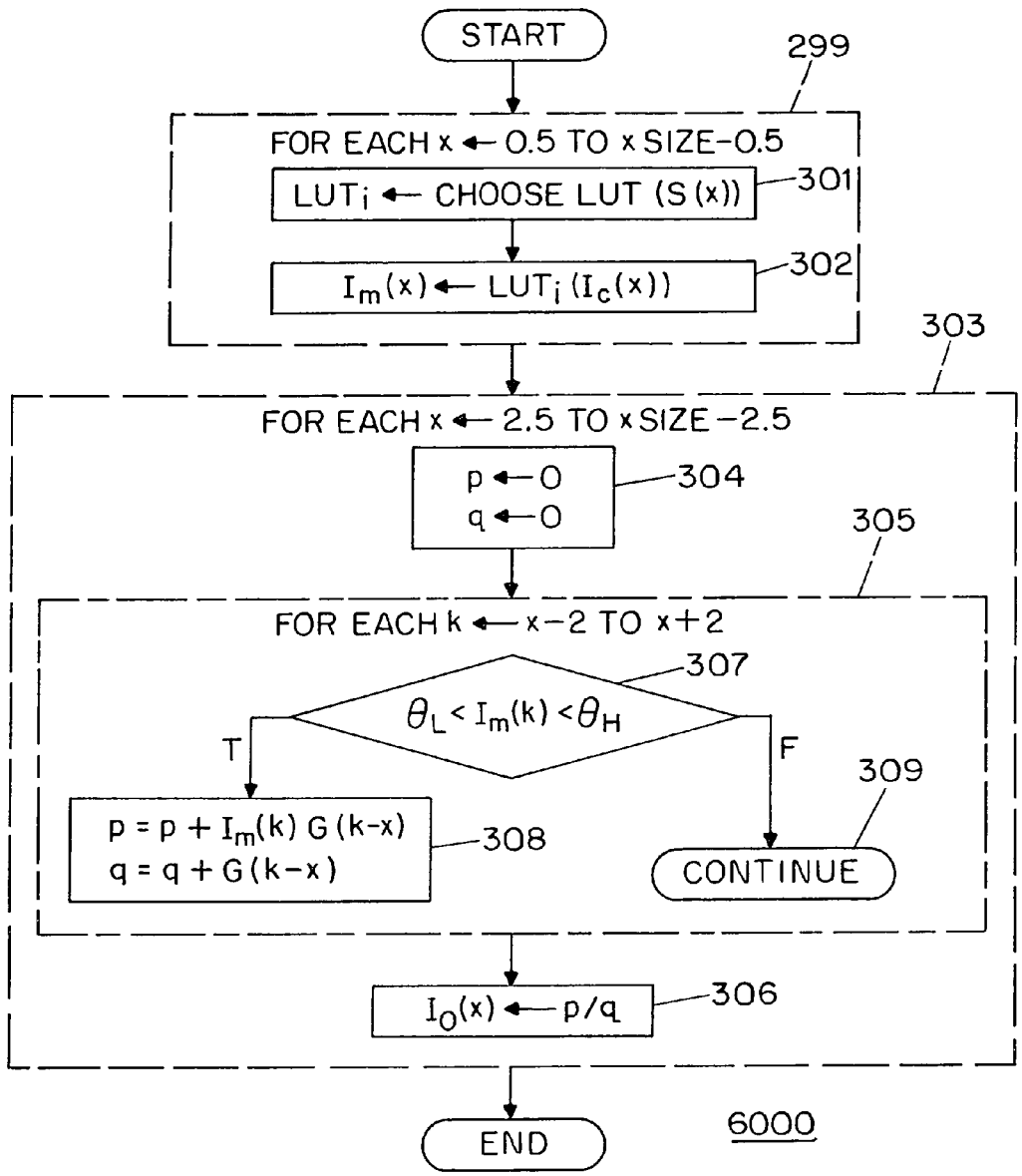
FIG. 60 is a flow diagram describing a computation process that may be carried out by the embodiment of the image processing part represented by the data flow diagram of FIG. 59 to derive on-grid pixel brightness values of a linear output image.

Turning to FIG. 60, there is shown a flow diagram 6000 describing a computation process that may be carried out by the embodiment of the image processing part represented by the data flow diagram 5900 of FIG. 59 for processing a captured line image. First, loop 299 is repeated for each pixel position x received from the first pixel position generator 43 in FIG. 59 from 0.5 to xSize−0.5, where xSize is the length of the captured line image. In loop 299, steps 301 and 302 are performed. In step 301 lookup table data $LUT_i$ for the i-th sensitivity level stored in the lookup table memory 39 in FIG. 59 is selected by referring to the sensitivity pattern data S(x) stored in the sensitivity pattern memory 40 in FIG. 59 for the sensitivity level corresponding to pixel position x received from the first pixel position generator 43 in FIG. 59. In step 302, the lookup table data $LUT_i$ is applied to the captured image brightness value $I_c(x)$ at the received pixel position x by the mapper 42 in FIG. 59, and the resulting compensated captured image brightness value at received pixel position x is designated the mapped brightness value, $I_m(x)$, at that pixel position. After loop 299 is repeated for all pixel positions of the pixel position array received from the first pixel position generator 43, the computation process proceeds to loop 303. Loop 303 is repeated for each pixel position x from 2.5 to xSize−2.5. In loop 303, step 304, loop 305 and step 306 are performed. In step 304, quantities p and q are each set to 0. After step 304, loop 305 is repeated for five pixel positions k which are nearest neighbors to the pixel position x received from the second pixel position generator 47 by incrementing the pixel position k in each repetition of loop 305 from k=x−2 to k=x+2. In loop 305, steps 307, 308 and 309 are carried out. In step 305, a mapped brightness value at pixel position k, $I_m(k)$, is compared with a low threshold value $\theta_L$ and a high threshold value $\theta_H$. If $I_m(k)$ is greater than $\theta_L$ and less than $\theta_H$, step 308 is performed. Otherwise, loop 305 proceeds to the next value of k. In step 308, $I_m(k)$ is multiplied by the value of a linear Gaussian interpolation kernel G(k−x) at position (k−x), and the product is added to the quantity p. In addition, the value of the Gaussian interpolation kernel G(k−x) at position (k−x) is added to the quantity q. After loop 305 is repeated for each value of k from k=x−2 to k=x+2, step 306 is performed. In step 306, the output image brightness value $I_o(x)$ at the pixel position x received from the second pixel position generator 47 is computed by dividing the value p by the value q. The loop 303 then proceeds to the next pixel position received from the second pixel position generator 47. After loop 303 has been repeated for each pixel position x from x=2.5 to x=xSize−2.5, the computation process represented by flow diagram 6000 terminates. The threshold values $\theta_L$ and $\theta_H$ are predetermined constant values, which generally represent the noise level of a light-sensing element having the sensitivity level corresponding to pixel position k compensated by the inverse of the response function of that light-sensing element, and the saturation or near saturation value of the light-sensing element having the same sensitivity level, respectively. An example of a 5×1 Gaussian kernel G(k), which may be used in the computation process described by the flow diagram 6000 is shown in FIG. 61.

While the present invention has been particularly described with reference to exemplary embodiments thereof, it will be understood by those skilled in the art that various modifications and alterations may be made without departing of the spirit and the scope of the invention. For example, the image sensor need not be a charge coupled device, but may be any image sensor having an array of light-sensing elements, such as a CMOS image sensor. Accordingly, the disclosed embodiments of the invention are considered merely illustrative, and the invention is limited in scope only as specified in the appended claims.

We claim:

1. A system for obtaining a relatively high dynamic range image of a scene using a relatively low dynamic range image sensor adapted to be exposed to incident light from the scene for capturing an image thereof comprising:

an image sensor having a multiplicity of light-sensing elements in an array, each light-sensing element having a particular one of a plurality of sensitivity levels to incident light in accordance with a predetermined sensitivity pattern for the array of light-sensing elements and a respective response function, the predetermined sensitivity pattern of the array of light-sensing elements having at least two different predetermined sensitivity levels and corresponding to a repetitive pattern of groups of pixel positions, each one of the pixel positions in each group corresponding to a different one of the at least two predetermined sensitivity levels in a common predetermined positional order, each light-sensing element being responsive to incident light from the scene for producing a captured image brightness value at a corresponding one of a multiplicity of pixel positions of a pixel position array, whereby each one of the multiplicity of pixel positions corresponds to a particular one of the plurality of sensitivity levels of the light-sensing elements;

a captured image memory for storing the captured image brightness values produced by the light-sensing elements at corresponding ones of the multiplicity of pixel positions of the pixel position array;

an off-grid estimator for deriving from the captured image brightness values in the captured image memory respective estimated off-grid brightness values at a multiplicity of off-grid positions located at respective interstices of the pixel position array so as to form a regular off-grid position array; and an output image generator for deriving pixel brightness values of an output image from the estimated off-grid brightness values, comprising:

an off-grid brightness value memory for storing the estimated off-grid brightness values derived by the off-grid estimator;

an on-grid resampler for deriving from the estimated off-grid brightness values in the off-grid brightness value memory respective resampled on-grid brightness values at the pixel positions of the pixel position array; and an output image memory for storing the respective resampled on-grid brightness values derived by the on-grid resampler as the pixel brightness values of the output image.

2. The system of claim 1, wherein the array of light-sensing elements of the image sensor is a linear array for capturing a line image and the pixel position array is a linear array having the multiplicity of pixel positions located at respective regularly spaced positions in a pixel row so as to form a linear captured image brightness value array, the captured image memory for storing the captured image brightness values produced by the light-sensing elements.

3. The system of claim 2, wherein the off-grid positions of the off-grid position array are located between respective adjacent pairs of pixel positions of the linear pixel position array.

4. The system of claim 3, wherein the predetermined sensitivity pattern has a predetermined first sensitivity level and a predetermined second sensitivity level, and adjacent pixel positions of the linear pixel position array correspond to different ones of the predetermined first sensitivity level and the predetermined second sensitivity level.

5. The system of claim 1, wherein the array of light-sensing elements of the image sensor is a linear array and the pixel position array is a two-dimensional array having pixel positions at respective intersections of a plurality of regularly spaced pixel rows and a plurality of regularly spaced pixel columns, the pixel rows being orthogonal to the pixel columns, and wherein the linear array of light-sensing elements of the image sensor is adapted to be sequentially exposed to successive regularly spaced linear regions of the scene in multiple exposures, each one of the exposures producing a respective linear captured image brightness value array, the respective linear captured image brightness value arrays produced by the multiple exposures being concatenated to form a two-dimensional captured image brightness value array having respective captured image brightness values at the pixel positions of the pixel position array, the concatenated linear captured image brightness value arrays being stored in the captured image memory as respective captured image brightness values at the pixel positions of the two-dimensional pixel position array.

6. The system of claim 5, wherein the off-grid positions of the off-grid position array are located at respective intersections of a plurality of regularly spaced intermediate columns and pixel rows, each one of the intermediate columns being parallel to the pixel columns and extending between a respective adjacent pair of the pixel columns.

7. The system of claim 6, wherein the predetermined sensitivity pattern has a first predetermined sensitivity level and a second predetermined sensitivity level, and wherein adjacent pixel positions in each one of the pixel rows correspond to different ones of the first and second predetermined sensitivity levels, and adjacent pixel positions in each one of the pixel columns correspond to the same one of the first and second predetermined sensitivity levels.

8. The system of claim 1, wherein the image sensor has a two-dimensional array of light-sensing elements and the multiplicity of pixel positions are located at respective intersections of a plurality of regularly spaced pixel rows and a plurality of regularly spaced pixel columns, the pixel rows being orthogonal to the pixel columns, the captured image memory for storing the captured image brightness values produced by the light-sensing elements at corresponding ones at the multiplicity of pixel positions of the pixel position array.

9. The system of claim 8 wherein the off-grid positions of the off-grid position array are located at respective intersections of a plurality of regularly spaced intermediate rows and a plurality of regularly spaced intermediate columns, each intermediate row being parallel to the pixel rows and extending between a respective adjacent pair of pixel rows and each intermediate column being parallel to the pixel columns and extending between a respective adjacent pair of pixel columns.

10. The system of claim 8, wherein the off-grid positions of the off-grid position array are located at respective intersections of a plurality of regularly spaced intermediate rows and the plurality of pixel columns, and at respective intersections of a plurality of regularly spaced intermediate columns and the pixel rows, each one of the intermediate rows being parallel to the pixel rows and extending between a respective adjacent pair of the pixel rows, each one of the intermediate columns being parallel to the pixel columns and extending between a respective adjacent pair of pixel columns.

11. The system of claim 10, wherein the predetermined sensitivity pattern of the array of light-sensing elements has first and second predetermined sensitivity levels, and wherein adjacent pixel positions in each one of the pixel rows and adjacent pixel positions in each one of the pixel columns correspond to different ones of the first and second predetermined sensitivity levels.

12. The system of claim 1, wherein the output image generator comprises an output image memory for storing the respective estimated off-grid brightness values derived by the off-grid estimator as the pixel brightness values of the output image.

13. The system of claim 1, wherein the off-grid estimator comprises:
   an off-grid position generator for providing the off-grid positions of the off-grid position array;
   a sensitivity pattern memory for storing data indicative of the sensitivity level corresponding to each one of the pixel positions of the pixel position array;
   a plurality of sensitivity level off-grid brightness value estimators each corresponding to a respective one of the plurality of sensitivity levels of the light-sensing elements, and receiving off-grid positions from the off-grid position generator and sensitivity pattern data from the sensitivity pattern memory, each one of the sensitivity level off-grid brightness value estimators being responsive to an off-grid position received from the off-grid position generator and the sensitivity pattern data from the sensitivity pattern memory for deriving from the captured image brightness values in the captured image memory a respective sensitivity level off-grid brightness value for the corresponding sensitivity level at the received off-grid position; and
   an accumulator for combining the respective sensitivity level off-grid brightness values derived by the plurality of sensitivity level off-grid brightness value estimators for the corresponding sensitivity levels at each off-grid position received from the off-grid position generator to derive a respective estimated off-grid brightness value at each off-grid position received from the off-grid position generator.

14. The system of claim 13, wherein the accumulator comprises an adder for adding the sensitivity level off-grid brightness values derived by the plurality of sensitivity level off-grid brightness value estimator for corresponding sensitivity levels at each received off-grid position to derive the respective estimated off-grid brightness value at each off-grid positions received from the off-grid position generator.

15. The system of claim 13, wherein the accumulator comprises a weighting factor memory for storing a plurality of predetermined weighting factors each corresponding to a different one of the plurality of sensitivity levels of the light-sensing elements, a plurality of multipliers each for multiplying the sensitivity level off-grid brightness value corresponding to a respective one of the sensitivity levels at a received off-grid position by the weighting factor corresponding to the respective one of the sensitivity levels to provide a respective weighted sensitivity level off-grid brightness value for the corresponding sensitivity level at the received off-grid position, and an adder for summing the respective weighted sensitivity level off-grid brightness values provided by the plurality of multipliers to derive a respective estimated off-grid brightness value at the received off-grid position received from the off-grid position generator.

16. The system of claim 1, wherein the on-grid resampler comprises:
   a pixel position generator for providing the pixel positions of the pixel position array;
   an interpolator for receiving pixel positions provided by the pixel position generator and being responsive to a pixel position received from the pixel position generator for deriving from the estimated off-grid brightness values in the off-grid brightness value memory a respective interpolated on-grid brightness value at the received pixel position; and
   a response function compensator for compensating the respective interpolated on-grid brightness value derived by the interpolator at each pixel position received from the pixel position generator by the inverse of a combined response function of the light-sensing elements to derive a respective resampled on-grid brightness value at each pixel position received from the pixel position generator, the combined response function of the light-sensing elements being the sum of weighted response functions of light-sensing elements having different ones of the sensitivity levels, each one of the weighted response functions being a response function of a light-sensing element having a respective one of the sensitivity levels multiplied by a predetermined weighting factor for the respective one of the sensitivity levels.

17. The system of claim 16, wherein the response function compensator comprises a lookup table memory storing data representing the inverse of the combined response function of the light-sensing elements and a mapper for deriving from the respective interpolated on-grid brightness value derived by the interpolator at a received pixel position a respective index for the lookup table memory and providing a data value in the lookup table memory corresponding to the respective index to the output image memory, the data value being the pixel brightness value of the output image at the received pixel position.

18. The system of claim 16, wherein the interpolator is responsive to a pixel position received from the pixel position generator for computing a product of the estimated off-grid brightness values at a predetermined number of off-grid positions that are nearest neighbors to the received pixel position and an interpolation kernel having the same dimensions as the predetermined number of off-grid positions.

19. The system of claim 16, wherein the pixel positions provided by the pixel position generator are located at respective intersections of a plurality of regularly spaced pixel rows and a plurality of regularly spaced pixel columns, the pixel columns being orthogonal to the pixel rows, and the off-grid positions provided by the off-grid position generator are located at respective intersections of a plurality of regularly spaced intermediate rows and a plurality of regularly spaced intermediate columns, each one of the intermediate rows being parallel to the pixel rows and extending medially between a respective adjacent pair of the pixel rows, each intermediate column being parallel to the pixel columns and extending medially between a respective adjacent pair of the pixel columns, and wherein the interpolator derives the interpolated on-grid brightness values at each one of the pixel positions (x,y) received from the pixel position generator using the relation $$I(x-2, y-2) = \sum_{i=0}^{3}\sum_{j=0}^{3} B(x-1.5+i, y-1.5+j)\phi_{ij},$$

where x has values from 2.5 to xSize−2.5, y has values from 2.5 to ySize−2.5, I(x−2, y−2) is the interpolated on-grid brightness value at pixel position (x−2, y−2), B(x−1.5+i, y−1.5+j) is the off grid brightness value at off-grid position (x−1.5+i, y−1.5+j), $\phi_{ij}$ is the value of a 4×4 cubic interpolation kernel φ at indices i and j, indices i and j each has values from 0 to 3, xSize is the dimension of the captured image in the direction of the pixel rows, and ySize is the dimension of the captured image in the direction of the pixel columns.

20. The system of claim 16, wherein the pixel positions provided by the pixel position generator are located at respective intersections of a plurality of regularly spaced pixel columns and a plurality of regularly spaced pixel rows, the pixel rows being orthogonal to the pixel columns, and the off-grid positions provided by the off-grid generator are located at respective intersections of a plurality of regularly spaced intermediate rows and the pixel columns and at respective intersections of a plurality of regularly spaced intermediate columns and the pixel rows, each one of the intermediate rows being parallel to the pixel rows and extending medially between a respective adjacent pair of the pixel rows, each one of the intermediate columns being parallel to the pixel columns and extending medially between a respective adjacent pair of the pixel columns, and wherein the interpolator derives the interpolated on-grid brightness values at each one of the pixel positions (x,y) received from the pixel position generator using the relation $$I(x-2, y-2) = \sum_{i=0}^{3}\sum_{j=0}^{3} B(x-0.5i-0.5j, y-0.5i+0.5j)\phi_{ij},$$

where x has values from 2.5 to xSize−2.5, y has values from 2.5 to ySize−2.5, I(x−2, y−2) is the interpolated on-grid brightness value at pixel, position (x−2, y−2), B(x+0.5i−0.5j, y 1.5+0.5i+0.5j) is the off-grid brightness value at off-grid position (x+0.5i−0.5j, y 1.5+0.5i+0.5j), 4 is the value of a 4×4 cubic interpolation kernel φ at indices i and j, indices i and j each have values from 0 to 3, xSize is the dimension of the captured image in the direction of the pixel rows, and ySize is the dimension of the captured image in the direction of the pixel columns.

21. The system of claim 1, wherein the off-grid estimator comprises:
   an off-grid position generator for providing the off-grid positions of the off-grid position array;
   a sensitivity pattern memory for storing data indicative of the sensitivity level corresponding to each one of the pixel positions of the pixel position array;
   a plurality of sensitivity level off-grid brightness value estimators, each corresponding to a respective one of the sensitivity levels, for receiving off-grid positions from the off-grid position generator and sensitivity pattern data from the sensitivity pattern memory, each one of the plurality of sensitivity level off-grid brightness value estimators being responsive to an off-grid position received from the off-grid position generator and the sensitivity pattern data from the sensitivity pattern memory for deriving from the captured image brightness values in the captured image memory a respective sensitivity level off-grid brightness value for the corresponding sensitivity level at the received off-grid position;

an accumulator for combining the respective sensitivity level off-grid brightness values derived by the plurality of sensitivity level off-grid brightness value estimator for the corresponding sensitivity levels at each off-grid position received from the off-grid position generator to derive a respective combined sensitivity level off-grid brightness value at each off-grid position received from the off-grid position generator; and a response function compensator for compensating the respective combined sensitivity level off-grid brightness value at each off-grid position received from the off-grid position generator by the inverse of a combined response function of the light-sensing elements to derive a respective estimated off-grid brightness value at each off-grid position received from the off-grid position generator, the combined response function being the sum of weighted response functions of light-sensing elements having different ones of the plurality of sensitivity levels, each one of the weighted response functions being a response function of a light-sensing element having a respective one of the sensitivity levels multiplied by a predetermined weighting factor for the respective one of the sensitivity levels.

22. The system of claim 21, wherein the response function compensator comprises a lookup table memory storing lookup table data representing the inverse of the combined response function of the light-sensing elements, and a mapper for deriving from the respective combined sensitivity level off-grid brightness value at each off-grid position received from the off-grid position generator a respective index for the lookup table memory and providing a data value in the lookup table memory corresponding to the respective index as the respective estimated off-grid brightness value at the off-grid position received from the off-grid position generator.

23. The system of claim 21, wherein the output image generator comprises:

an off-grid brightness value memory for storing the respective estimated off-grid brightness value derived by the response function compensator at each off-grid position received from the off-grid position generator;

an on-grid resampler for deriving from the estimated off-grid brightness values in the off-grid brightness value memory respective resampled on-grid brightness values at the pixel positions of the pixel position array; and an output image memory for storing the respective resampled on-grid brightness values derived by the on-grid resampler as the pixel brightness values of the output image, and wherein the on-grid resampler comprises:

a pixel position generator for providing pixel positions of the pixel position array; and an interpolator for receiving pixel positions provided by the pixel position generator and being responsive to a pixel position received from the pixel position generator for deriving from the estimated off-grid brightness values in the off-grid brightness value memory a respective resampled on-grid brightness value at the received pixel position.

24. The system of claim 23, wherein the pixel positions provided by the pixel position generator are located at respective intersections of a plurality of regularly spaced pixel rows and a plurality of regularly spaced pixel columns, the pixel rows being orthogonal to the pixel columns, and the off-grid positions provided by the of grid position generator are located at respective intersections of a plurality of regularly spaced intermediate rows and a plurality of regularly spaced intermediate columns, each one of the intermediate rows being parallel to the pixel rows and extending medially between a respective adjacent pair of the pixel rows, each one of the intermediate columns being parallel to the pixel columns and extending medially between a respective adjacent pair of the pixel columns, and wherein the interpolator derives the resampled on-grid brightness values at each one of the pixel positions (x,y) received from the pixel position generator by the relation $$I(x-2, y-2) = \sum_{i=0}^{3}\sum_{j=0}^{3} B(x-1.5+i, y-1.5+j)\phi_{ij},$$

where x has values from 2.5 to xSize−2.5, y has values from 2.5 to ySize−2.5, I(x−2, y−2) is the resampled on-grid brightness value at pixel position (x−2, y−2), B(x−1.5+i, y−1.5+j) is the off-grid brightness value at off-grid position (x−1.5+i, y−1.5+j), φ is the value of a 4×4 cubic interpolation kernel φ at indices i and j, the indices i and j each have values from 0 to 3, xSize is the dimension of the captured image in the direction of the pixel rows, and ySize is the dimension of the captured image in the direction of the pixel columns.

25. The system of claim 24, wherein the 4×4 cubic interpolation kernel φ has the form:

| 0.043  | -0.66  | -0.661 | 0.043  |
|--------|--------|--------|--------|
| -0.661 | 10.28  | 10.28  | -0.661 |
| -0.661 | 10.28  | 10.28  | -0.661 |
| 0.043  | -0.661 | -0.661 | 0.043  |

26. The system of claim 23, wherein the pixel positions provided by the pixel position generator are located at respective intersections of a plurality of regularly spaced pixel rows and a plurality of regularly spaced pixel columns, the pixel rows being orthogonal to the pixel columns, and the off-grid positions provided by the off-grid position generator are located at respective intersections of a plurality of regularly spaced intermediate rows and the pixel columns and at respective intersections of a plurality of regularly spaced intermediate columns and the pixel rows, each one of the intermediate rows being parallel to the pixel rows and extending medially between a respective adjacent pair of the pixel rows, each one of the intermediate columns being parallel to the pixel columns and extending medially between a respective adjacent pair of the pixel columns, and wherein the interpolator derives the resampled on-grid brightness values at each one of the pixel positions (x,y) received from the pixel position generator using the relation $$I(x-2, y-2) = \sum_{i=0}^{3}\sum_{j=0}^{3} B(x-0.5i-0.5j, y-1.5+0.5i+0.5j)\phi_{ij},$$

where x has values from 2.5 to xSize−2.5, y has values from 2.5 to ySize−2.5, I(x−2,y−2) is the resampled on-grid brightness value at pixel position (x−2,y−2), B(x+0.5i−0.5j, y−1.5+0.5i+0.5j) is the off-grid brightness value at the off-grid position (x+0.5i−0.5j, y−1.5+0.5i+0.5j), $\phi_{ij}$ is the value of a 4×4 cubic interpolation kernel φ at indices i and j, indices i and j each have values from 0 to 3, xSize is the dimension of the captured image in the direction of the pixel rows, and ySize is dimension of the captured image in the direction of the pixel columns.

27. The system of claim 23, wherein the pixel positions provided by the pixel position generator are located at respective regularly spaced pixel positions in a pixel row defining a linear pixel position array and the off-grid positions provided by the off-grid position generator are each located midway between a respective adjacent pair of pixel positions of the pixel position row, and wherein the interpolator derives the resampled on-grid brightness values at each one of the pixel positions x received from the pixel position generator using the relation $$I_o(x-3) = \sum_{k=-1.5}^{k=1.5} B(x+k)\psi(k),$$

where x has values from 3.5 to xSize−3.5, $I_0(x-3)$ is the resampled on-grid brightness value at pixel position (x−3), B(x+k) is the estimated off-grid brightness value at off-grid position (x+k), k is a position of a 4×1 cubic interpolation kernel Ψ, Ψ(k) is the value of the cubic interpolation kernel at position k, the position k has values from −1.5 to 1.5, and xSize is the dimension of the captured line image.

28. The system of claim 27, wherein the 4×1 cubic interpolation kernel x has the form:

| -0.96 | 13.44 | 13.44 | -0.96 |

→ k

29. The system of claim 21, wherein the accumulator of the off-grid estimator comprises an adder for adding the respective sensitivity level off-grid brightness values derived by the plurality of sensitivity level off-grid brightness value estimators for the corresponding sensitivity levels at each off-grid position received from the off-grid position generator to provide the combined sensitivity level off-grid brightness values at each off-grid position received from the off-grid position generator.

30. The system of claim 21, wherein the accumulator of the off-grid estimator comprises a weighting factor memory for storing a plurality of predetermined weighting factors each corresponding to a different one of the plurality of sensitivity levels of the light-sensing elements, a plurality of multipliers each for multiplying the sensitivity level off-grid brightness value corresponding to a respective one of the sensitivity levels at a received off-grid position by the weighting factor corresponding to the respective one of the sensitivity levels to provide a weighted sensitivity level off-grid brightness value for the corresponding sensitivity level at the off-grid position received from the off-grid position generator, and an adder for summing the weighted sensitivity level off-grid brightness values at the received off-grid position provided by the plurality of multipliers to derive the combined sensitivity level off-grid brightness value at the off-grid positions received from the off-grid position generator.

31. The system of claim 30, wherein the array of light-sensing elements of the image sensor is a linear array and the pixel position array is a linear array having a multiplicity of pixel positions at respective regularly spaced pixel positions in a pixel row, and wherein the off-grid positions of the off-grid position array are each located between a respective adjacent pair of pixel positions of the pixel position array and the sensitivity level off-grid brightness values derived by the plurality of sensitivity level off-grid brightness value estimators for an off-grid position received from the off-grid position generator are respective captured image brightness values at a predefined number of pixel positions that are nearest neighbors to the received off-grid position, each one of the predefined number of nearest neighbor pixel positions corresponding to a different one of the plurality of sensitivity levels of the light-sensing elements.

32. The system of claim 31, wherein each one of the off-grid positions of the off-grid position array is located midway between a respective adjacent pair of pixel positions of the linear pixel position array and the predetermined sensitivity pattern of the light-sensing elements has a first and a second predetermined sensitivity level, and wherein the combined sensitivity level off-grid brightness value at an off-grid position x' received from the off-grid position generator is expressed as $$B(x')=W_1 I_c(x'-0.5)+W_2 I_c(x'+0.5),$$

where B(x') is the combined sensitivity level off-grid brightness value at the received off-grid position x', $W_1$ is the weighting factor for the sensitivity level corresponding to pixel position (x'−0.5), $W_2$ is the weighting factor for the sensitivity level corresponding to pixel position (x'+0.5), $I_c$(x'−0.5) is the captured image brightness value at pixel position (x'−0.5) and $I_c$(x'+0.5) is the captured image brightness value at pixel position (x'+0.5), and the combined response function of the light-sensing elements is expressed as $$S(E)=W_1 P_1(E)+W_2 P_2(E),$$

where $P_1$(E) is the radiometric response function of a light-sensing element having the sensitivity level corresponding to pixel position (x'−0.5) and P2(E) is the radiometric response function of a light-sensing element having the sensitivity level corresponding to pixel position (x'+0.5).

33. The system of claim 30, wherein the image sensor has a two-dimensional array of light-sensing elements and the multiplicity of pixel positions are located at respective intersections of a plurality of regularly spaced pixel rows and a plurality of regularly spaced pixel columns defining a two-dimensional pixel position array, the pixel rows being orthogonal to the pixel columns, the multiplicity of off-grid positions are located at respective intersections of a plurality of regularly spaced intermediate rows and a plurality of regularly spaced intermediate columns, each one of the intermediate rows being parallel to the pixel rows and extending between a respective adjacent pair of the pixel rows, each one of the intermediate columns being parallel to the pixel columns and extending between a respective adjacent pair of the pixel columns.

34. The system of claim 33, wherein the predetermined sensitivity pattern of the array of light-sensing elements corresponds to a pixel position array having repetitive disposed groups of four nearest neighbor pixel positions, where each one of the four nearest neighbor pixel positions in each group corresponds to a respective one of four predetermined sensitivity levels in a common predetermined positional order.

35. The system of claim 30, wherein the image sensor has a two-dimensional array of light-sensing elements and the multiplicity of pixel positions are located at respective intersections of a plurality of regularly spaced pixel rows and a plurality of regularly spaced pixel columns defining a two-dimensional pixel position array, the pixel rows being orthogonal to the pixel columns, and wherein the multiplicity of off-grid positions are located at respective intersections of a plurality of regularly spaced intermediate rows and the pixel columns, and at respective intersections of a plurality of regularly spaced intermediate columns and the pixel rows, each one of the intermediate rows being parallel to the pixel rows and extending between a respective adjacent pair of the pixel rows, each one of the intermediate columns being parallel to the pixel columns and extending between a respective adjacent pair of the pixel columns.

36. The system of claim 30, wherein the predetermined sensitivity pattern of the array of light-sensing elements has a first and a second predetermined sensitivity level, and adjacent pixel positions in each one of the pixel rows and adjacent pixel positions in each one of the pixel columns correspond to different ones of the predetermined first and second sensitivity levels.

37. The system of claim 30, wherein the array of light-sensing elements of the image sensor is a linear array and the multiplicity of pixel positions are located at respective regularly spaced pixel positions in a pixel row so as to form a linear captured image brightness value array, and wherein the linear array of light-sensing elements of the image sensor is adapted to be sequentially exposed to successive regularly spaced linear regions of the scene in multiple exposures, each one of the exposures producing a respective linear captured image brightness value array, the respective linear captured image brightness value arrays produced by the multiple exposures being concatenated to form a two-dimensional captured image brightness value array having respective captured image brightness values at pixel positions of a pixel position array located at respective intersections of a plurality of regularly spaced pixel rows and a plurality of regularly spaced pixel columns, the pixel rows being orthogonal to the pixel columns, and wherein the multiplicity of off-grid positions are located at respective intersections of the pixel rows and a plurality of regularly spaced intermediate columns, each one of the intermediate columns being parallel to the pixel columns and extending between a respective adjacent pair of the pixel columns.

38. The system of claim 37, wherein the predetermined sensitivity pattern of the array of light-sensing elements has a first and a second predetermined sensitivity level, and wherein adjacent pixel positions in each pixel row correspond to different ones of the first and the second predetermined sensitivity levels and adjacent pixel positions in each pixel column correspond to the same one of the first and the second predetermined sensitivity levels.

39. The system of claim 21, wherein each one of the sensitivity level off-grid brightness value estimators is responsive to an off-grid position received from the off-grid position generator and the data indicative of the sensitivity level corresponding to each one of the pixel positions from the sensitivity pattern memory for determining a pixel position corresponding to the same sensitivity level as the sensitivity level off-grid brightness value estimator and located nearest the received off-grid position, and for estimating a sensitivity level off-grid brightness value at the received off-grid position to be equal to the captured image brightness value at the nearest pixel position corresponding to the same sensitivity level as the sensitivity level off-grid brightness value estimator.

40. The system of claim 1, wherein the image sensor is an integrated circuit charge coupled device having an array of photodiodes in spaced orthogonal rows and columns, each one of the photodiodes having a light-sensing surface adapted to be exposed to incident light and being operatively biased to store photogenerated charge therein, the charge coupled device having respective integrated lenses formed over the photosensitive surfaces of predetermined ones of the photodiodes, each integrated lens concentrating the incident light onto the respective light-sensing surface, whereby the sensitivity level of each one of the photodiodes is determined by whether or not an integrated lens is formed over the light-sensing surface thereof.

41. The system of claim 1, wherein the image sensor is an integrated circuit charge coupled device having an array of photodiodes arranged in spaced orthogonal rows and columns, each one of the photodiodes having a light-sensing surface adapted to be exposed to incident light and being operatively biased to store photogenerated charge therein, each one of the photodiodes having an integrated light filter formed above the light-sensing surface thereof, the transparency of each integrated light filter being fixed during fabrication of the charge coupled device, whereby the sensitivity level of each one of the photodiodes in the array is determined by the transparency of the integrated light filter above the light-sensing surface thereof.

42. The system of claim 1, wherein the image sensor is an integrated circuit charge coupled device having an array of photodiodes arranged in spaced orthogonal rows and columns, each one of the photodiodes having a light-sensing surface adapted to be exposed to incident light and being operatively biased to store photogenerated charge therein, the charge coupled device being formed with an opaque layer overlying the array of photodiodes with a respective aperture formed in the opaque layer above the light-sensing surface of each one of the photodiodes, the respective size of the aperture above the light-sensing surface of each one of the photodiodes being fixed during fabrication of the charge coupled device, whereby the sensitivity level of each one of the photodiodes in the array is determined by the size of the aperture above the light-sensing surface thereof.

43. The system of claim 1, wherein the image sensor is an integrated circuit charge coupled device having a multiplicity of photodiodes in an array of spaced orthogonal rows and columns, each one of the photodiodes having a light-sensing surface adapted to be exposed to incident light and being operatively biased to store photogenerated charge therein, the charge coupled device having an interline structure in which the columns of photodiodes are each disposed adjacent a corresponding vertical shift register, each photodiode having an associated transfer gate electrode for controlling the transfer of stored photogenerated charge from the photodiode to the corresponding vertical shift register, the stored photogenerated charge in each one of the photodiodes being operatively periodically removed by the application of a periodic reset pulse to the device, the photogenerated charge stored in each one of the photodiodes being operatively transferred to a respective stage of the corresponding vertical shift register by the application of a transfer trigger pulse to the associated transfer gate electrode and being accumulated therein for an exposure interval, the transfer trigger pulse being applied immediately preceding a reset pulse, the respective transfer trigger pulses being operatively applied to the transfer gate electrodes associated with the photodiodes in the array at predetermined frequencies, whereby the sensitivity level of each one of the photodiodes in the array is determined by the frequency of transfer trigger pulses applied to the transfer gate electrode associated therewith.

44. The system of claim 1, wherein the off-grid estimator comprises:
- a pixel position generator for providing the pixel positions of the pixel position array;
- a sensitivity pattern memory for storing the sensitivity level corresponding to each one of the pixel positions;
- a response function compensator receiving pixel positions of the pixel position array from the pixel position generator, data indicative of the sensitivity levels corresponding to the received pixel positions from the sensitivity pattern memory and captured image brightness values at the received pixel positions from the captured image memory, and being responsive to a pixel position received from the pixel position generator and data indicative of the sensitivity level corresponding to the received pixel position for retrieving from the captured image memory the captured image brightness value at the received pixel position and for compensating the retrieved captured imaged brightness value at the received pixel positions by the inverse of a response function of a light-sensing element having the sensitivity level corresponding to the received pixel position to provide a respective compensated brightness value at the pixel position received from the pixel position generator;
- a compensated on-grid brightness value memory for storing respective compensated captured image brightness values derived by the response function compensator;
- an off-grid position generator for providing the off-grid positions of the off-grid position array;
- a pseudoinverse estimator receiving off-grid positions from the off-grid position generator and being responsive to an off-grid position received from the off-grid position generator for deriving from the compensated captured image brightness values in the compensated on-grid brightness value memory a respective estimated off-grid brightness value at the off-grid positions received from the off-grid position generator.

45. The system of claim 44, wherein the output image generator comprises
- an off-grid brightness value memory for storing the respective estimated off-grid brightness values derived by the pseudoinverse estimator;
- an on-grid resampler for deriving from the estimated off-grid brightness values in the off-grid brightness value memory respective on-grid resampled brightness values at the pixel positions of the pixel position array; and
- an output image memory for storing the respective resampled on-grid brightness values derived by the on-grid resampler as pixel brightness values of the output image, and wherein the on-grid resampler comprises:
  - a second pixel position generator for providing the pixel positions of the pixel position array; and
  - an interpolator receiving pixel positions from the pixel position generator and being responsive to a pixel position received from the second pixel position generator for deriving from the estimated off-grid brightness values in the off-grid brightness value memory the resampled on-grid brightness value at the pixel position received from the second pixel position generator.

46. The system of claim 45, wherein the pixel positions of the pixel position array provided by the second pixel position generator are located at respective regularly spaced pixel positions of a linear pixel position array, and the off-grid positions of the off-grid position array provided by the off-grid position generator are each located between a respective adjacent pair of pixel positions of the linear pixel position array.

47. The system of claim 46, wherein the off-grid positions provided by the off-grid position generator are each located midway between a respective adjacent pair of pixel positions of the linear pixel position array, the pixel positions provided by the second pixel position generator having coordinate x, where x has values from 3.5 to xSize−3.5 and xSize is the dimension of the captured line image.

48. The system of claim 47, wherein the interpolator is responsive to a pixel position received from the second pixel position generator for deriving a respective resampled on-grid position brightness value in accordance with the relation $$I_o(x-3) = \sum_{k=-1.5}^{k=1.5} B(x+k)\psi(k),$$

where $I_o(x-3)$ is the resampled on-grid brightness value at pixel position $(x-3)$, $B(x+k)$ is the estimated off-grid brightness value at off-grid position $(x+k)$, k is a position of a 4×1 cubic interpolation kernel $\Psi$, $\Psi(k)$ is the value of the cubic interpolation kernel at position k, and the position k has values from −1.5 to 1.5.

49. The system of claim 48, wherein the 4×1 cubic interpolation kernel $\Psi$ has the form:

| -0.96 | 13.44 | 13.44 | -0.96 |

50. The system of claim 45, wherein the pixel positions of the pixel position array provided by the second pixel position generator are located at respective intersections of a plurality of regularly spaced pixel rows and a plurality of regularly spaced pixel columns, the pixel rows being orthogonal to the pixel columns, and wherein the off-grid positions of the off-grid position array provided by the off-grid position generator are located at respective intersections of a plurality of regularly spaced intelluediate rows and a plurality of regularly spaced intermediate columns, each intermediate row being parallel to the pixel rows and extending between a respective adjacent pair of the pixel rows and each intermediate column being parallel to the pixel columns and extending between a respective adjacent pair of the pixel columns.

51. The system of claim 50, wherein the interpolator derives a respective resampled on-grid brightness value at a pixel position received from the second pixel position generator by computing the product of respective estimated off-grid brightness values at a predetermined number of off-grid positions that are nearest neighbors to the received pixel position and an interpolation kernel having the same dimensions as the predetermined number of off-grid positions.

52. The system of claim 51, wherein the plurality of intermediate rows each extend medially between a respective adjacent pair of pixel rows and the plurality of regularly spaced intermediate columns each extend medially between a respective adjacent pair of pixel columns, and wherein the pixel positions provided by the second pixel position generator have coordinates (x,y) where x has values from 2.5 to xSize−2.5 and, y has values from 2.5 to ySize 2.5, xSize is the dimension of the captured image in the direction of the pixel rows and ySize is the dimension of the captured image in the direction of the pixel columns.

53. The system of claim 52, wherein the interpolator is responsive to a pixel position (x,y) received from the second pixel position generator for deriving a respective resampled on-grid brightness value in accordance with the relation $$I(x-2, y-2) = \sum_{i=0}^{3} \sum_{j=0}^{3} B(x-1.5+i, y-1.5+j)\phi_{ij},$$

where I(x−2, y−2) is the resampled on-grid brightness value at pixel position (x−2, y−2), B(x−1.5+i, y−1.5+j) is the estimated off-grid brightness value at off-grid position (x−1.5+i, y 1.5+j), $\phi_{ij}$ is the value of a 4×4 cubic interpolation kernel $\phi$ at indices i and j, and indices i and j each has values from 0 to 3.

54. The method of claim 53, wherein the 4×4 cubic interpolation kernel $\phi$ has the form:

| 0.043 | -0.66 | -0.661 | 0.043 |
|---|---|---|---|
| -0.661 | 10.28 | 10.28 | -0.661 |
| -0.661 | 10.28 | 10.28 | -0.661 |
| 0.043 | -0.661 | -0.661 | 0.043 |

55. The system of claim 51, wherein the interpolation kernel is a 2-dimensional Gaussian kernel.

56. The system of claim 55, wherein the 2-dimensional Gaussian kernel has the form:

| 0.0037 | 0.0101 | 0.0166 | 0.0166 | 0.0101 | 0.0037 |
|---|---|---|---|---|---|
| 0.0101 | 0.0275 | 0.0452 | 0.0452 | 0.0275 | 0.0101 |
| 0.0166 | 0.0452 | 0.0743 | 0.0743 | 0.0452 | 0.0166 |
| 0.0166 | 0.0452 | 0.0743 | 0.0743 | 0.0452 | 0.0166 |
| 0.0101 | 0.0275 | 0.0452 | 0.0452 | 0.0275 | 0.0101 |
| 0.0037 | 0.0101 | 0.0166 | 0.0166 | 0.0101 | 0.0037 |

57. The system of claim 51, wherein the interpolation kernel is a bi-cubic B-spline interpolation filter kernel.

58. The system of claim 57, wherein the bi-cubic B-spline interpolation filter kernel has the form:

| 0.0043 | 0.0100 | 0.0100 | 0.0043 |
|---|---|---|---|
| 0.0100 | 0.2296 | 0.2296 | 0.0100 |
| 0.0100 | 0.2296 | 0.2296 | 0.0100 |
| 0.0043 | 0.0100 | 0.0100 | 0.0043 |

59. The system of claim 51, wherein the interpolation kernel is a bi-linear interpolation filter kernel.

60. The system of claim 59, wherein the bi-linear interpolation kernel has the form:

| 0.5 | 0.5 |
|---|---|
| 0.5 | 0.5 |

61. The system of claim 45, wherein the pixel positions of the pixel position array provided by the second pixel position generator are located at respective intersections of a plurality of regularly spaced pixel rows and a plurality of regularly spaced pixel columns, the pixel rows being orthogonal to the pixel columns, and wherein the off-grid positions of the off-grid position array provided by the off-grid position generator are located at respective intersections of a plurality of regularly spaced intermediate columns and the pixel rows, each one of the intermediate pixel columns being parallel to the pixel columns and extending between a respective adjacent pair of pixel columns.

62. The system of claim 61, wherein the interpolator includes means for shifting the off-grid position array to coincide with the pixel position array, whereby the resampled on-grid brightness value at each pixel position of the pixel position array is equal to the estimated off-grid brightness value at a coincident off-grid position of the shifted off-grid position array.

63. The system of claim 45, wherein the pixel positions provided by the second pixel position generator are located at respective intersections of a plurality of regularly spaced pixel rows and a plurality of regularly spaced pixel columns, the pixel rows being orthogonal to the pixel columns, and wherein the off-grid positions provided by the off-grid position generator are located at respective intersections of a plurality of regularly spaced intermediate rows and the pixel columns, and at respective intersections of a plurality of regularly spaced intermediate columns and the pixel rows, each one of the intermediate rows being parallel to the pixel rows and extending medially between a respective adjacent pair of the pixel rows, each intermediate column being parallel to the pixel columns and extending medially between a respective adjacent pair of the pixel columns, the pixel positions provided by the second pixel position generator having coordinates (x,y) where x has values from 2.5 to xSize−2.5, y has values from 2.5 to ySize−2.5, xSize is the dimension of the captured image in the direction of the pixel rows and ySize is the dimension of the captured image in the direction of the pixel columns.

64. The system of claim 63, wherein the interpolator is responsive to a pixel position received from the second pixel position generator for deriving a respective resampled on-grid brightness value in accordance with the relation $$I(x-2, y-2) = \sum_{i=0}^{3} \sum_{j=0}^{3} B(x-0.5i-0.5j, y-1.5+0.5i+0.5j)\phi_{ij},$$

where I(x−2,y−2) is the resampled brightness value at pixel position (x−2, y−2), B(x+0.5i−0.5j, y 1.5+0.5i+0.5j) is the off-grid brightness value at off-grid position (x+0.5i−0.5j, y 1.5+0.5i+0.5j), $\phi_{ij}$ is the value of a 4×4 cubic interpolation kernel $\phi$ at indices i and j, and the indices i and j each have values from 0 to 3.

65. The system of claim 44, wherein the response function compensator comprises a lookup table memory storing separate lookup table data representing the inverse of respective response functions of light-sensing elements having different ones of the plurality of sensitivity levels, and a mapper receiving from the captured image memory the captured image brightness value at the pixel position received from the first pixel position generator for deriving therefrom a respective index for the lookup table data representing the inverse of the response function of a light-sensing element having the sensitivity level corresponding to the received pixel position, and providing a compensated on-grid brightness value corresponding to the index to the compensated on-grid brightness value memory.

66. The system of claim 44, wherein the pseudoinverse estimator comprises means responsive to an off-grid positions received from the off-grid position generator for retrieving from the compensated on-grid brightness value memory respective compensated on-grid brightness values at a predetermined number of pixel positions that are nearest neighbors to the received off-grid position, a comparator for comparing each one of the respective compensated on-grid brightness values at the nearest neighbor pixel positions to a predetermined low threshold value and a predetermined high threshold value, an adder means for computing a sum of compensated on-grid brightness values at the nearest neighbor pixel positions that are greater than the predetermined low threshold value and less than the predetermined high threshold value, and a divider for deriving the estimated off-grid brightness value at the received off-grid position by dividing the sum computed by the adder by the number of compensated on-grid brightness values included in the sum.

67. The system of claim 44, wherein the pixel positions provided by the pixel position generator are located at respective intersections of a plurality of regularly spaced pixel rows and a plurality of regularly spaced pixel columns, the pixel rows being orthogonal to the pixel columns, and the off-grid positions provided by the off-grid position generator are located at respective intersections of a plurality of regularly spaced intermediate rows and a plurality of regularly spaced intermediate columns, each one of the intermediate rows being parallel to the pixel rows and extending medially between a respective adjacent pair of the pixel rows, each intermediate column being parallel to the pixel columns and extending medially between a respective adjacent pair of pixel columns, and wherein the off-grid positions provided by the off-grid position generator have coordinates (x',y') where x' has values from 1 to xSize−1 and y' has values from 1 to ySize−1, xSize being the dimension of the captured image in the direction of the pixel rows and ySize being the dimension of the captured image in the direction of the pixel columns.

68. The system of claim 67, wherein the predetermined sensitivity pattern of the array of light-sensing elements corresponds to a pixel position array having repetitively disposed groups of four nearest neighbor pixel positions, where each of the four nearest neighbor pixel positions in each group corresponds to a respective one of four predetermined sensitivity levels in a common predetermined positional order.

69. The system of claim 67, wherein the pseudoinverse estimator for estimating the respective brightness value at an off-grid position (x',y') received from the off-grid position generator comprises:
    a memory for storing a 4×4 cubic interpolator kernel $\phi$;
    a comparator for comparing the compensated on-grid brightness value at each one of sixteen pixel positions (u,v) that are nearest neighbors to the received off-grid position (x',y') with a predetermined low threshold value and a predetermined high threshold value;
    a first computing means for calculating the indices i and j of the 4×4 cubic interpolation kernel $\phi$ using the relations i=x'−u−1.5 and j=y'−v−1.5 for each one of the sixteen nearest neighbor pixel positions (u,v) having a compensated on-grid brightness value I(u,v) that is greater than the predetermined low threshold value and less than the predetermined high threshold value, where u has values from x'−1.5 to x'+1.5 and v has values from y'−1.5 to y'+1.5;
    a second computing means for calculating the quantity $$\phi_{ij}^2 \frac{\phi_{ji} I(u,v)}{\sum_{ab} \phi_{ab}^2}$$

for each compensated on-grid brightness value I(u,v) at the sixteen nearest neighbor pixel positions (u,v) that is greater than the predetermined threshold value and less than the predetermined threshold value using the indices i and j calculated by the first computing means, where $\phi_{mn}$ is the value of the 4×4 interpolating kernel $\phi$ at indices m and n;
    a third computing means for calculating the quantities, for values of i and j calculated by the first computing means;
    a first adder for adding the quantities $$\phi_{ij}^2 \frac{\phi_{ji} I(u,v)}{\sum_{ab} \phi_{ab}^2}$$

calculated by the second computing means to derive a first sum s;
    a second adder for adding the quantities calculated by the third computing means to derive a second sum w; and
    a divider for deriving the estimated off-grid brightness value at the received off-grid position (x',y') by dividing the first sum s by the second sum w.

70. The system of claim 44, wherein the pixel positions provided by the pixel position generator are located at respective intersections of a plurality of regularly spaced pixel rows and a plurality of regularly spaced pixel columns, and the off-grid positions provided by the off-grid position generator are located at respective intersections of a plurality of regularly spaced intermediate rows and the pixel columns, and at respective intersections of a plurality of regularly spaced intermediate columns and the pixel rows, each one of the intermediate rows being parallel to the pixel rows and extending medially between a respective adjacent pair of the pixel rows, each intermediate column being parallel to the pixel columns and extending medially between a respective adjacent pair of the pixel columns, the off-grid positions provided by the off-grid position generator having coordinates (x',y') where x' has values from 1 to xSize−1 and y' has values from 0.5 to ySize−0.5 for off-grid positions located at respective intersections of the pixel rows and the intermediate columns, and where x' has values from 0.5 to ySize−0.5 and y' has values from 1 to ySize−1 for off-grid positions located at respective intersections of the pixel columns and the intermediate rows, xSize being the dimension of the captured image in the direction of the pixel rows and ySize being the dimension of the captured image in the direction of the pixel columns.

71. The system of claim 70, wherein the predetermined sensitivity pattern of the array of light-sensing elements has first and second predetermined sensitivity levels, and adjacent pixel positions in each pixel row and adjacent pixel positions in each pixel column correspond to different ones of the first and second predetermined sensitivity levels.

72. The system of claim 70, wherein the pseudoinverse estimator for estimating the respective off-grid brightness value at an off-grid position (x',y') received from the off-grid position generator comprises:
- a memory for storing a 4×4 cubic interpolation kernel φ;
- a first computing means responsive to an off-grid position (x',y') received from the off-grid position generator for computing coordinates (u,v) using the relations u=x'+ 0.5 i−0.5j and v=y'−1.5+0.5i+0.5j, where i and j are indices of the 4×4 cubic interpolation kernel dφ, and each one of the indices i and j has values from 0 to 3;
- means responsive to each pair of coordinates (u,v) computed by the first computing means for determining whether the coordinates (u,v) are those of a pixel position;
- a comparator responsive to the coordinates (uv) being coordinates of a pixel position for comparing the compensated on-grid brightness value I(u,v) at the pixel position (u,v) with a predetermined low threshold value and a predetermined high threshold value;
- a second computing means responsive to the coordinates (u,v) being the coordinates of a pixel position and the compensated on-grid brightness value I(uv) at the pixel position (u,v) being greater than a predetermined low threshold value and less than a predetermined high threshold value for calculating the quantity $$\phi_{ij}^2 \frac{\phi_{ji} I(u,v)}{\sum_{ab} \phi_{ab}^2},$$

where the values of i and j are those used by the first computing means to calculate the coordinate (u,v), and $\phi_{mn}$ is the value of the 4×4 cubic interpolation kernel φ at indices m and n;
- a third computing means for calculating the quantity $\phi_{ij}^2$ for values of i and j used by the first computing means to calculate pixel position coordinates (uv) at which the compensated on-grid brightness value I(u,v) is greater than the predetermined low threshold value and less than the predetermined high threshold value;
- a first adder for adding the quantities $$\phi_{ij}^2 \frac{\phi_{ji} I(u,v)}{\sum_{ab} \phi_{ab}^2}$$

calculated by the second computing means to derive a first sum s;
- a second adder for adding the quantities calculated by the third computing means to derive a second sum w; and
- a divider for deriving the estimated off-grid brightness value at the off grid position (x',y') received from the off-grid position generator by dividing the first sum s by the second sum w.

73. The system of claim 72, wherein the 4×4 cubic interpolation kernel φ has the form:

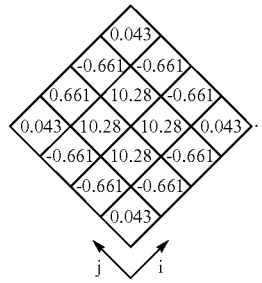 [SMILES: C1C2C3C4CC5C6C7CC8C9C%10CC%11C%12C1C21C32C45C63C78C94C%11%10C%121C234]

74. The system of claim 44, wherein the pixel positions provided by the pixel position generator are located at respective regularly spaced pixel positions in a linear pixel position array and the off-grid positions provided by the off-grid position generator are each located midway between a respective adjacent pair of pixel positions of the linear pixel position array, and wherein the predetermined sensitivity pattern of the light-sensing elements has a first and a second predetermined sensitivity level, and adjacent pixel positions of the linear pixel position array correspond to different ones of the first and second predetermined sensitivity levels.

75. The system of claim 74, wherein the pixel positions provided by the pixel position generator has values from 0.5 to xSize−0.5, where xSize is the dimension of the captured line image, and the off-grid positions provided by the off-grid position generator have values from 2 to xSize−2.

76. The system of claim 75, wherein the pseudoinverse estimator for estimating the respective brightness values at an off-grid position x' received from the off-grid position generator comprises:
- a memory for storing a 4□1 Gaussian interpolation kernel G;
- a comparator for comparing the compensated on-grid brightness value I(k) at each one of four pixel positions k that are nearest neighbors to the received off-grid position x' with a predetermined low threshold value and a predetermined high threshold value, where k has values from x'−1.5 to x'+1.5;
- a first computing means for calculating the quantity I(k)G (kW−x') for each one of the compensated on-grid brightness values I(k) at the four nearest neighbor pixel positions k that is greater than the predetermined low threshold value and less than the predetermined high threshold value, where G(k−x') is the value of the Gaussian interpolation kernel G at position (k' x');
- a first adder for adding the quantities I(k)G(k−x') for all values of I(k) greater than the predetermined low threshold value and less than the predetermined high threshold value to derive a first sum p;
- a second adder for adding the Gaussian interpolation kernel values G(k−x') for all values of k where I(k) is greater than the predetermined low threshold value and less than the predetermined high threshold value to derive a second sum q; and
- a divider for deriving the estimated off-grid brightness value B(x') at the off-grid position x' received from the off-grid position generator.

77. The system of claim 76, wherein the predetermined low threshold value is the noise level of a light-sensing element having a sensitivity level corresponding to the pixel position of the compensated on-grid brightness value being compared therewith compensated by the inverse of the response function of the light-sensing element, and the predetermined high threshold value is the saturation or near saturation brightness value of a light-sensing element having the sensitivity level corresponding to the pixel position of the compensated on-grid brightness value being compared therewith.

* * * * *